(12) United States Patent
Zhou et al.

(10) Patent No.: US 10,772,151 B2
(45) Date of Patent: Sep. 8, 2020

(54) BEAM MANAGEMENT IN DISCONTINUOUS RECEPTION

(71) Applicants: Hua Zhou, Herndon, VA (US); Esmael Dinan, McLean, VA (US); Alireza Babaei, Fairfax, VA (US); Hyoungsuk Jeon, Centreville, VA (US); Kyungmin Park, Herndon, VA (US)

(72) Inventors: Hua Zhou, Herndon, VA (US); Esmael Dinan, McLean, VA (US); Alireza Babaei, Fairfax, VA (US); Hyoungsuk Jeon, Centreville, VA (US); Kyungmin Park, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 16/241,178

(22) Filed: Jan. 7, 2019

(65) Prior Publication Data

US 2019/0215896 A1    Jul. 11, 2019

Related U.S. Application Data

(60) Provisional application No. 62/614,258, filed on Jan. 5, 2018, provisional application No. 62/627,254, filed on Feb. 7, 2018.

(51) Int. Cl.
*H04L 5/12* (2006.01)
*H04W 76/28* (2018.01)
(Continued)

(52) U.S. Cl.
CPC .......... *H04W 76/28* (2018.02); *H04B 7/0426* (2013.01); *H04B 7/0456* (2013.01);
(Continued)

(58) Field of Classification Search
CPC ... H04W 76/28; H04B 17/318; H04B 7/0456; H04B 7/0626; H04B 7/063; H04B 7/0632; H04L 1/1812
(Continued)

(56) References Cited

U.S. PATENT DOCUMENTS 9,467,971 B2    10/2016   Suzuki
2016/0044605 A1*  2/2016   Vajapeyam ......... H04W 52/322
                                                          370/311
(Continued)

FOREIGN PATENT DOCUMENTS

EP    2782409 A1 *  9/2014   ............ H04W 76/28
EP    3 217 701       11/2015
(Continued)

OTHER PUBLICATIONS

3GPP TS 36.212 V14.3.0 (Jun. 2017); Technical Specification; 3rd Generation Partnership Project; Technical Specification Group Radio Access Network; Evolved Universal Terrestrial Radio Access (E-UTRA); Multiplexing and channel coding; (Release 14).
(Continued)

*Primary Examiner* — Helene E Tayong
(74) *Attorney, Agent, or Firm* — David Grossman; Kavon Nasabzadeh; Philip Smith

(57) ABSTRACT

A wireless device receives a timer value of a DRX on duration timer for a DRX operation; radio resources of a reference signals for a transmission of a layer 1 reference signal received power report; and a report indicator indicating the transmission of the layer 1 reference signal received power report is limited to a time period when the DRX on duration timer is running. The layer 1 reference signal received power report is transmitted at a first time based on the DRX on duration timer running at a predefined time period before the first time. The layer 1 reference signal
(Continued)

received power report includes a layer 1 reference signal received power value and a reference signal resource index associated with one of the reference signal(s). Based on the report indicator, transmitting of the layer 1 reference signal received power report at a second time is skipped in response to the DRX on duration timer not running at the predefined time period before the second time.

20 Claims, 46 Drawing Sheets

(51) Int. Cl.
   *H04B 7/0426* (2017.01)
   *H04B 7/06* (2006.01)
   *H04L 1/18* (2006.01)
   *H04B 17/318* (2015.01)
   *H04B 7/0456* (2017.01)
(52) U.S. Cl.
   CPC ........... *H04B 7/063* (2013.01); *H04B 7/0626* (2013.01); *H04B 7/0632* (2013.01); *H04B 17/318* (2015.01); *H04L 1/1812* (2013.01)
(58) Field of Classification Search
   USPC ......................................................... 375/262
   See application file for complete search history.

(56) References Cited

U.S. PATENT DOCUMENTS

| | | | |
|---|---|---|---|
| 2016/0277983 | A1 | 9/2016 | Kim et al. |
| 2016/0344489 | A1* | 11/2016 | Kim ..................... H04W 24/10 |
| 2017/0105179 | A1 | 4/2017 | Kusashima et al. |
| 2017/0195028 | A1* | 7/2017 | Shimezawa ............ H04L 69/22 |
| 2017/0202025 | A1 | 7/2017 | Ouchi et al. |
| 2017/0273022 | A1* | 9/2017 | Kazmi ............... H04W 72/0446 |
| 2017/0273135 | A1* | 9/2017 | Siomina ................ H04W 76/28 |
| 2017/0273136 | A1 | 9/2017 | Siomina et al. |
| 2017/0311113 | A1 | 10/2017 | Abraham et al. |
| 2017/0347270 | A1 | 11/2017 | Iouchi et al. |
| 2018/0014322 | A1 | 1/2018 | Loehr et al. |
| 2018/0048452 | A1 | 2/2018 | Loehr et al. |
| 2018/0084602 | A1 | 3/2018 | Lee et al. |
| 2018/0110084 | A1 | 4/2018 | Dinan et al. |
| 2018/0145798 | A1 | 5/2018 | Suzuki et al. |

FOREIGN PATENT DOCUMENTS

| | | | |
|---|---|---|---|
| EP | 3 291 597 | 4/2016 | |
| EP | 3 313 121 | 6/2016 | |
| EP | 3 151 622 | 4/2017 | |
| EP | 3 154 295 | 4/2017 | |
| EP | 3 337 055 | 11/2017 | |
| WO | WO-2014146736 A1 * | 9/2014 | ............ H04W 76/28 |
| WO | 2016119981 | 8/2016 | |
| WO | 2016163065 | 10/2016 | |
| WO | 2017065671 | 4/2017 | |

OTHER PUBLICATIONS

3GPP TS 36.321 V14.4.0 (Sep. 2017); Technical Specification; 3rd Generation Partnership Project; Technical Specification Group Radio Access Network; Evolved Universal Terrestrial Radio Access (E-UTRA); Medium Access Control (MAC) protocol specification; (Release 14).
3GPP TS 36.331 V14.3.0 (Jun. 2017); Technical Specification; 3rd Generation Partnership Project; Technical Specification Group Radio Access Network; Evolved Universal Terrestrial Radio Access (E-UTRA); Radio Resource Control (RRC);; Protocol specification.
3GPP TS 38.321 V2.0.0 (Dec. 2017); Technical Specification; 3rd Generation Partnership Project; Technical Specification Group Radio Access Network; NR; Medium Access Control (MAC) protocol specification; (Release 15).
3GPP TSG RAN WG1 Meeting 90bis; Prague, CZ, Oct. 9-13, 2017; Title: RAN1 Chairman's Notes ; 1 Opening of the Meeting (Day 1: 9.00 AM) 3.
3GPP TS 38.213 V1.2.1 (Dec. 2017); Technical Specification; 3rd Generation Partnership Project; Technical Specification Group Radio Access Network; NR;Physical layer procedures for control (Release 15).
3GPP TS 38.331 V0.4.0 (Dec. 2017); Technical Specification; 3rd Generation Partnership Project Technical Specification Group Radio Access Network NR Radio Resource Control (RRC); Protocol specification.
R1-1721510; 3GPP TSG RAN WG1 Meeting #91; Reno, USA, Nov. 27-Dec. 1, 2017 ; ; Source:NTT DOCOMO, Inc.; Title:Offline summary for AI 7.3.3.4 UL data transmission procedure ; Agenda Item:7.3.3.4.
R1-1709907 Discussion on Beam Failure Recovery_v2; 3GPP TSG RAN WG1 NR Ad-Hoc#2R1-1709907 Qingdao, P.R. China, Jun. 27-30, 2017; ; Source:Xinwei; Title:Discussion on Beam Failure Recovery; Agenda Item:5.1.2.2.2.
R1-1709929; 3GPP TSG RAN WG1 NR Ad Hoc MeetingR1-1709929 Qingdao, China, Jun. 27-30, 2017; ; Agenda Item:5.1.2.2.2; Source:Huawei, HiSilicon; Title:General views on beam failure recovery.
R1-1710058; 3GPP TSG RAN WG1 NR Ad-Hoc#2 R1-1710058 Qingdao, P.R. China, Jun. 27-30, 2017; ; Source:CATT; Title:Considerations on DL beam failure and recovery; Agenda Item:5.1.2.2.2.
R1-1710283 Discussion on beam failure recovery_final; 3GPP TSG RAN WG1 NR Ad-Hoc#2 R1-1710283 Qingdao, P.R. China Jun. 27-30, 2017; ; Agenda Item:5.1.2.2.2; Source: LG Electronics; Title: Discussion on beam failure recovery.
R1-1710400 Beam failure recovery procedure; 3GPP TSG RAN WG1 Meeting NR Ad-Hoc#2R1-1710400 Qingdao, P. R. China, Jun. 27-30, 2017; ; Source:vivo; Title:Beam failure recovery procedure; Agenda Item:5.1.2.2.2.
R1-1710596; 3GPP TSG RAN WG1 NR Ad-Hoc#2 ; Qingdao, P.R. China Jun. 27-30, 2017; ; Agenda Item:5.1.2.2.2; Source:Lenovo, Motorola Mobility; Title: Discussion of beam recovery procedure.
R1-1710810 BeamRecovery_final; 3GPP TSG RAN WG1 AH_NR MeetingR1-1710810 Qingdao, China Jun. 27-30, 2017; Agenda Item: 5.1.2.2. Source: MediaTek Inc.; Title:Mechanism for flexible beam failure recovery; Document for: Discussion.
R1-1710926 On Remaining Details of Beam Failure Recovery; 3GPP TSG RAN WG1 NR Ad-Hoc#2 R1-1710926 Qingdao, P.R. China Jun. 27-30, 2017; Agenda Item:5.1.2.2.2; Source:InterDigital, Inc. ; Title:On Remaining Details of Beam Failure Recovery.
R1-1711017 Mechanism to recover from beam failure; 3GPP TSG-RAN WG1 #89ah-NRR1-1711017 Qingdao, China, Jun. 27-30, 2017; Source:Ericsson; Title:Mechanism to recover from beam failure; Agenda Item:5.1.2.2.2.
R1-1711291; 3GPP TSG RAN WG1 NR Ad-Hoc#2 R1-1711291; Qingdao, P.R. China, Jun. 27-30, 2017; Agenda item:5.1.2.2.2.
R1-1715439 Remaining details on CSI reporting; 3GPP TSG RAN WG1 Meeting NR #3R1-1715439 Nagoya, Japan, Sep. 18-21, 2017; Source: ZTE, Sanechips; Title:Remaining details on CSI reporting; Agenda Item:6.2.2.2; Document for: Discussion and Decision.
R1-1715858_CSI reporting_v2; 3GPP TSG RAN WG1 Meeting NR#3R1-1715858 Nagoya, Japan, Sep. 18-21, 2017; Agenda Item:6.2.2.2; Source: LG Electronics; Title: Discussions on CSI reporting; Document for:Discussion/Decision.
R1-1715939 CSI reporting and UCI multiplexing_r3; 3GPP TSG RAN WG1 Meeting NR#3R1-1715939 Nagoya, Japan, Sep. 18-21, 2017; Agenda item:6.2.2.2; Source: Samsung; Title: CSI reporting and UCI multiplexing; Document for:Discussion and Decision.
R1-1716349 On CSI reporting; 3GPP TSG-RAN WG1 NR Ad Hoc #3R1-1716349 Nagoya, Japan, Sep. 18-21, 2017; Source:Ericsson; Title:On CSI reporting; Agenda Item:6.2.2.2.
R1-1717604 CSI reporting and UCI multiplexing_r1; 3GPP TSG RAN WG1 Meeting 90bisR1-1717604 Prague, CZ, Oct. 9-13, 2017; Agenda item:7.2.2.2; Source: Samsung; Title: CSI reporting and UCI multiplexing; Document for:Discussion and Decision.
R1-1717940_CSI reporting_v3; 3GPP TSG RAN WG1 Meeting #90bisR1-1717940 Prague, Czech Republic, Oct. 9-13, 2017; Agenda

(56) References Cited

OTHER PUBLICATIONS

Item:7.2.2.2; Source: LG Electronics; Title: Discussions on CSI reporting; Document for:Discussion/Decision.
R1-1718432 On remaining detailsof CSI reporting; 3GPP TSG RAN WG1 Meeting 90bisR1-1718432 Prague, CZ, Oct. 9-13, 2017;Source:Ericsson; Title:On remaining details of CSI reporting; Agenda Item:7.2.2.2.
R1-1718442 On semi-persistent CSI reporting on PUSCH; 3GPP TSG-RAN WG1 #90bisR1-1718442 Prague, Czech Republic, Oct. 9-13, 2017;Source:Ericsson; Title:On semi-persistent CSI reporting on PUSCH; Agenda Item:7.2.2.6.
R1-1719932 Remaining issues on UL data transmission procedure; 3GPP TSG RAN WG1 Meeting 91 R1-1719932 Reno, USA, Nov. 27-Dec. 1, 2017; Agenda Item:7.3.3.4; Source: LG Electronics; Title: Remaining ssues on UL data transmission procedure; Document for:Discussion and decision.
R1-1720289 CSI reporting and UCI multiplexing_r1; 3GPP TSG RAN WG1 Meeting #91R1-1720289 Reno, USA Nov. 27-Dec. 1, 2017; Agenda item:7.2.2.2; Source: Samsung; Title: CSI reporting and UCI multiplexing; Document for:Discussion and Decision.
R1-1720661; 3GPP TSG RAN WG1 Meeting #91 ; Nov. 27-Dec. 1, 2017; Reno, Nevada, USA; Agenda item:7.2.2.2; Source: Qualcomm Incorporated.
R1-1720734 On remaining details of CSI reporting; 3GPP TSG-RAN WG1 #91R1-1720734 Reno, USA, Nov. 27-Dec. 1, 2017; Source:Ericsson; Title:On remaining details of CSI reporting; Agenda Item:7.2.2.2.
R1-1721342 cl; 3GPP TS 38.212 V1.2.1 (Dec. 2017) Technical Specification; 3rd Generation Partnership Project;; Technical Specification Group Radio Access Network;; NR;; Multiplexing and channel coding.
R1-1721371 Summary of remaining issues on CSI measurement; 3GPP TSG RAN WG1 Meeting #91 R1-1721371 Reno, USA, Nov. 27-Dec. 1, 2017; Source: ZTE, Sanechips; Title:Summary of remaining issues on CSI measurement; Agenda Item:7.2.2.1; Document for: Discussion and Decision.
R1-1721451 Summary of views on CSI reporting v4 with offline notes; 3GPP TSG-RAN WG1 #91R1-1721451 Reno, USA, Nov. 27-Dec. 1, 2017; Source:Ericsson; Title:Summary of views on CSI reporting; 4genda Item:7.2.2.2.
R2-1706680—Beam Failure Recovery Mechanism and RLF ; 3GPP TSG-RAN WG2 NR-Adhoc R2-1706680 Qingdao, China, Jun. 27-29, 2017; Source: AT&T; Title:Beam Failure Recovery Mechanism and RLF ; Agenda Item:10.2.9.
RAN2-NR-AH2-Qingdao-chairman-notes-2017-06-29-2025-eom; 3GPP TSG-RAN WG2 NR Ad Hoc Quingdao, China, Jun. 27-29, 2017; Source: RAN2 Chairman (Intel); Object:Chairman notes.
3GPP TS 36.213 V14.3.0 (Jun. 2017) Random Access Procedure (Release 14).
3GPP TSG-RAN WG1 NR-AH3 R1-1716901; Nagoya, Japan, Sep. 18-21, 2017; Agenda: 6.2.2.2; WF for Open Issues on CSI Reporting.
3GPP TS 38.214 V1.2.1 (Dec. 2017); Technical Specification; 3rd Generation Partnership Project; Technical Specification Group Radio Access Network; NR;Physical layer procedures for data (Release 15).

* cited by examiner

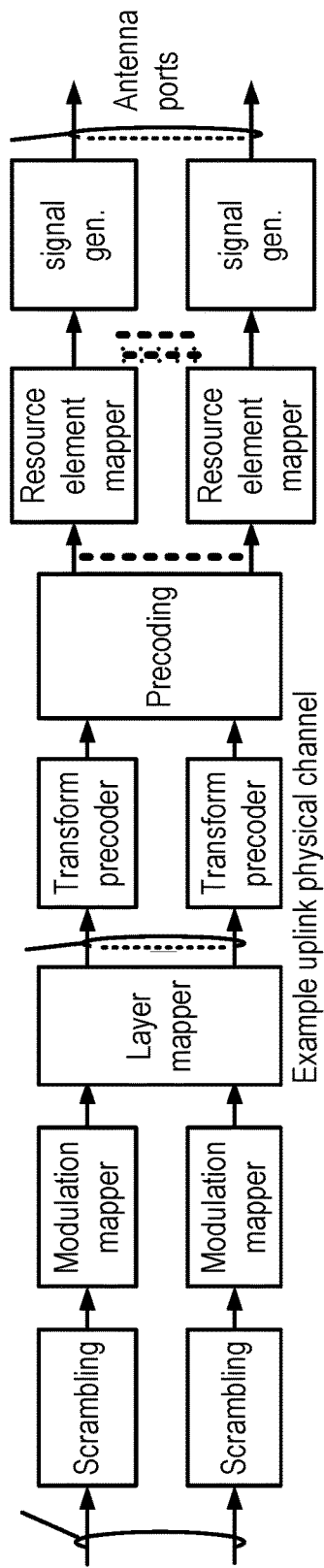
FIG. 5A
Example uplink physical channel
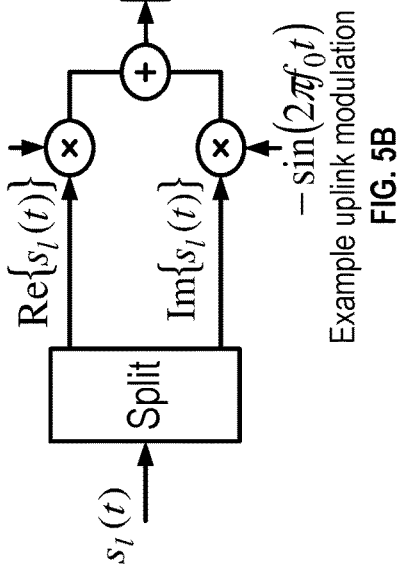
FIG. 5B
Example uplink modulation
FIG. 5D
Example downlink modulation
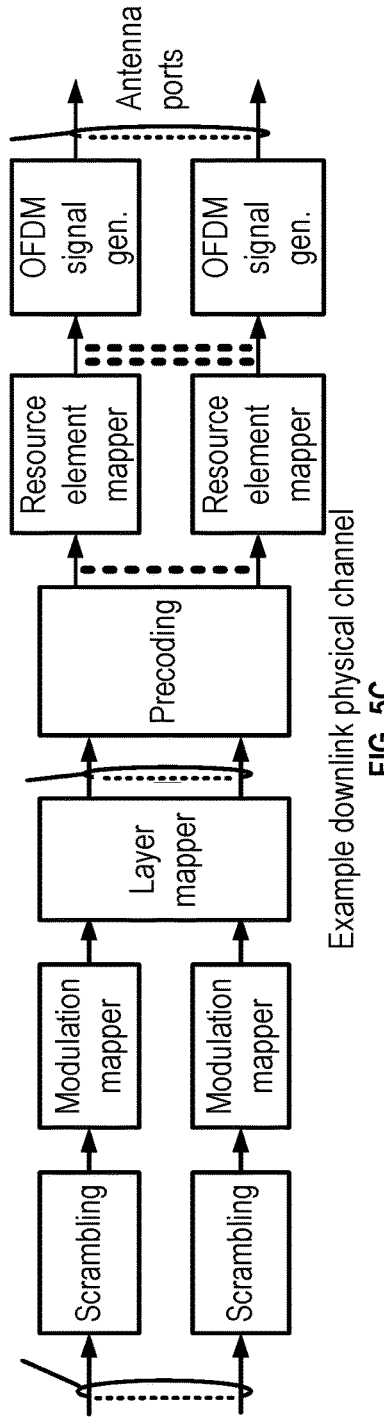
FIG. 5C
Example downlink physical channel Dual-Connectivity- two MAC entities at UE side Example 1: 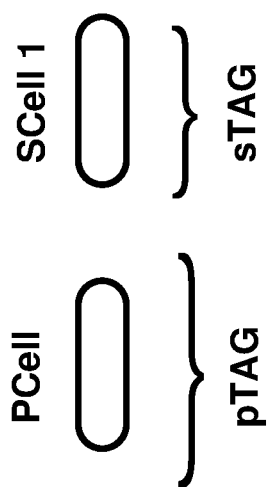
Example 2: 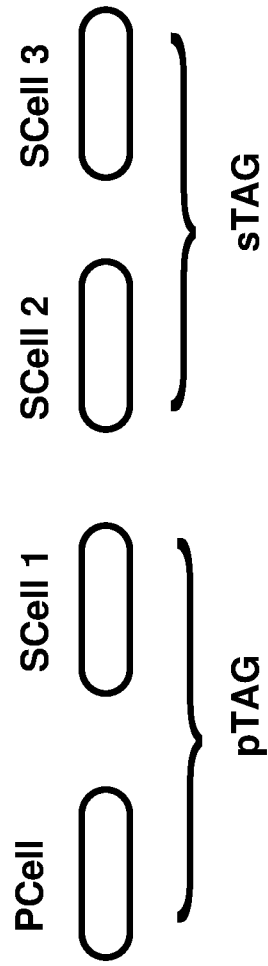
Example 3: 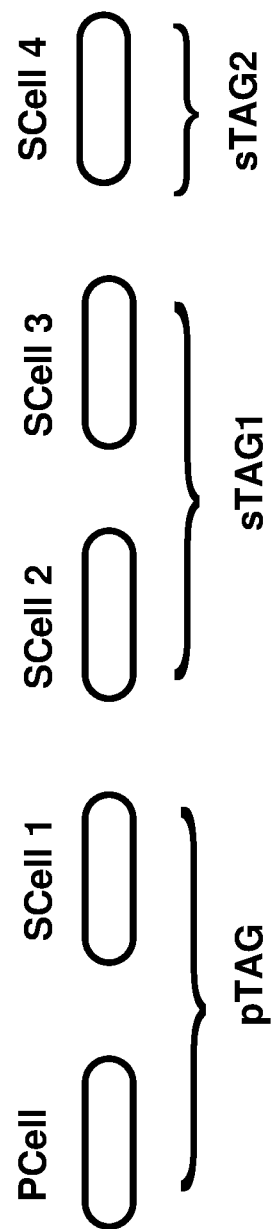
FIG. 8 gNB connected to NGC eLTE eNB connected to NGC

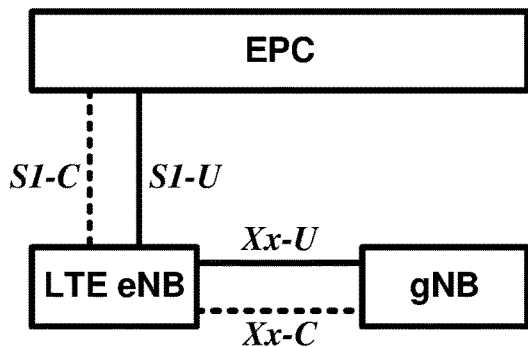

LTE eNB connected to EPC with non-standalone gNB. gNB user plane connected to EPC via LTE eNB.
FIG. 11A

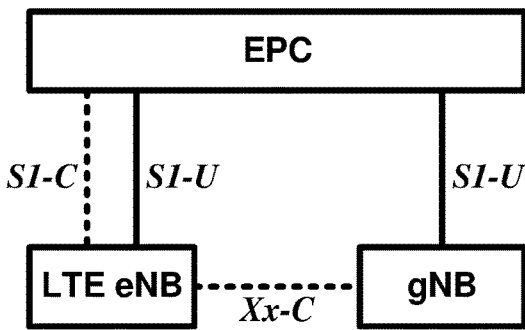

LTE eNB connected to EPC with non-standalone gNB. gNB user plane connected to EPC directly.
FIG. 11B

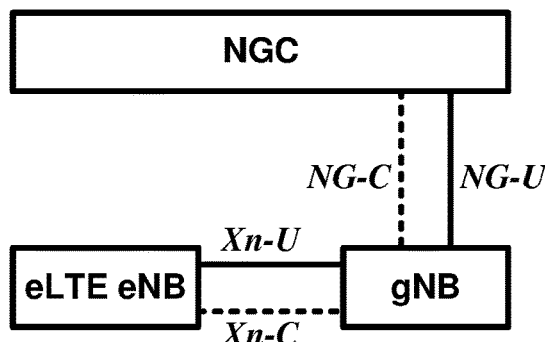

gNB connected to NGC with non-standalone eLTE eNB. eLTE eNB user plane connected to NGC via gNB.
FIG. 11C

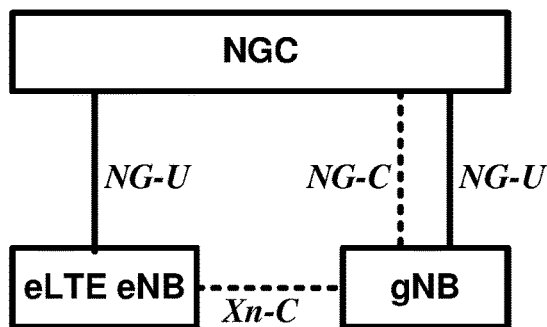

gNB connected to NGC with non-standalone eLTE eNB. eLTE eNB user plane connected to NGC directly.
FIG. 11D

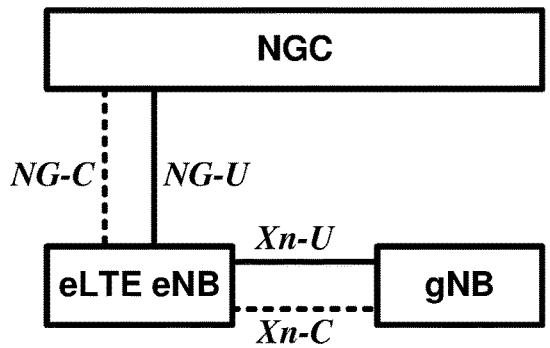

eLTE eNB connected to NGC with non-standalone gNB. gNB user plane connected to NGC via eLTE eNB.
FIG. 11E

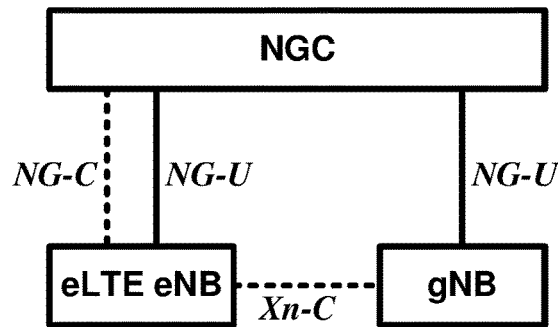

eLTE eNB connected to NGC with non-standalone gNB. gNB user plane connected to NGC directly.
FIG. 11F Radio protocol architecture for split bearer and SCG bearer. LTE eNB connected to EPC with non-standalone gNB.

Radio protocol architecture for split bearer and SCG bearer. gNB connected to NGC with non-standalone eLTE eNB.

Radio protocol architecture for split bearer and SCG bearer. eLTE eNB connected to NGC with non-standalone gNB.

Non-centralized deployment

Centralized deployment

Beam failure in one TRP

Beam failure in multiple TRPs

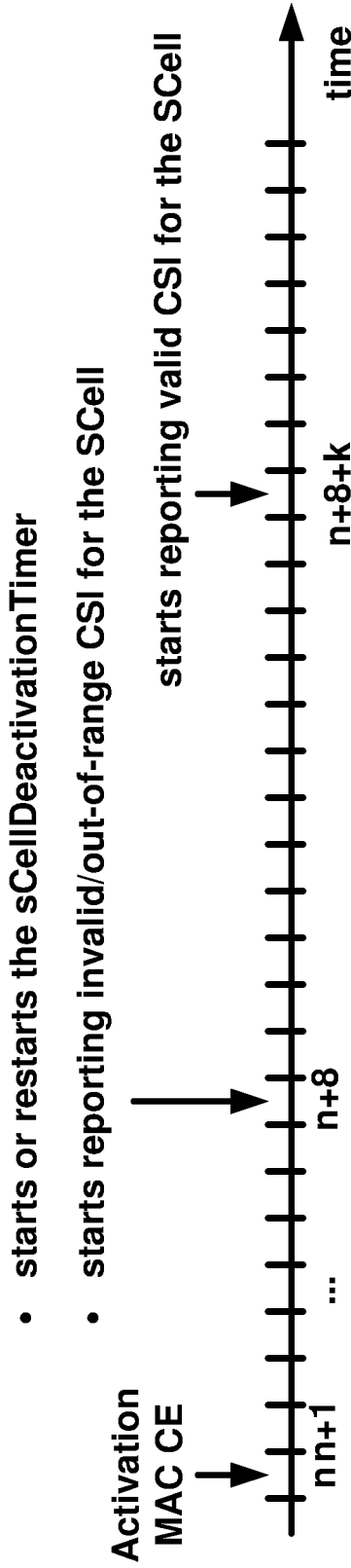
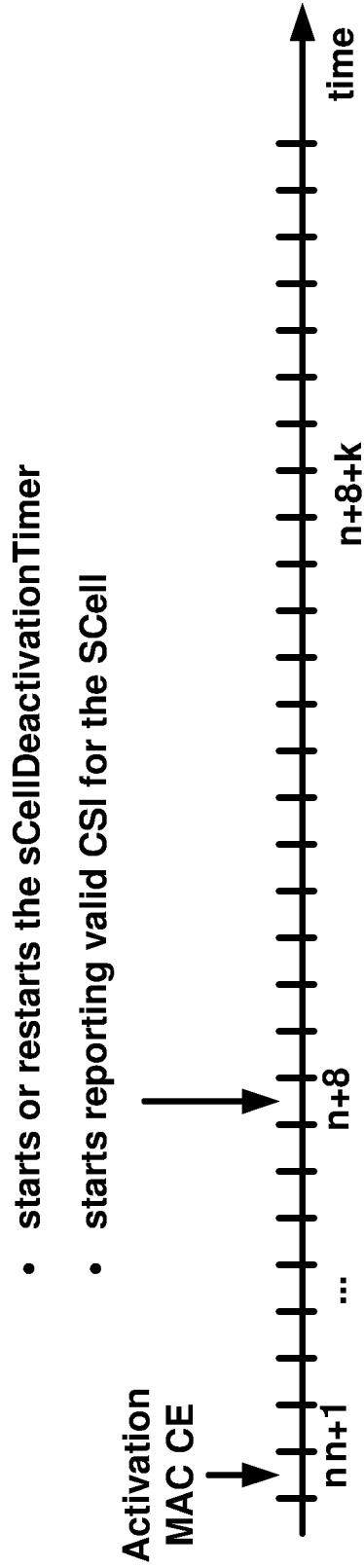
FIG. 25A
FIG. 25B

|  | DCI format | Example size (Bits) | Usage |
|---|---|---|---|
| Uplink | 0 | 45 | Uplink scheduling grant |
|  | 4 | 53 | Uplink scheduling grant with spatial multiplexing |
|  | 6-0A, 6-0B | 46, 36 | Uplink scheduling grant for eMTC devices |
| Downlink | 1C | 31 | Special purpose compact assignment |
|  | 1A | 45 | Contiguous allocation only |
|  | 1B | 46 | Codebook-based beamforming using CRS |
|  | 1D | 46 | MU-MIMO using CRS |
|  | 1 | 55 | Flexible allocations |
|  | 2A | 64 | Open-loop spatial multiplexing using CRS |
|  | 2B | 64 | Dual-layer transmission using DM-RS (TM8) |
|  | 2C | 66 | Multi-layer transmission using DM-RS (TM9) |
|  | 2D | 68 | Multi-layer transmission using DM-RS (TM9) |
|  | 2 | 67 | Closed-loop spatial multiplexing using CRS |
|  | 6-1A, 6-1B | 46, 36 | Downlink scheduling grants for eMTC devices |
| Special | 3, 3A | 45 | Power control commands |
|  | 5 |  | Sidelink operation |
|  | 6-2 |  | Paging/direct indication for eMTC devices |

FIG. 26

| CSI-RS configuration | P-CSI reporting | SP-CSI reporting | Ap-CSI reporting |
|---|---|---|---|
| P CSI-RS | Higher layers (e.g., RRC) | MAC CE and/or DCI | DCI |
| SP CSI-RS | Not supported | MAC CE and/or DCI | DCI |
| Ap. CSI-RS | Not supported | Not supported | DCI |

FIG. 29

```
┌─────────────────────────────────────────────────────────┐
│  Receive, by a wireless device from a base station,      │
│  message(s) comprising: a timer value of a               │
│  discontinuous reception (DRX) on duration timer for     │
│  a DRX operation; and a report indicator indicating      │
│  whether a transmission of a beam report is limited to   │
│  when the DRX on duration timer is running               │
│                         4310                             │
└─────────────────────────────────────────────────────────┘
                              │
                              ▼
     ⬡ Report indicator indicate the transmission of the beam report ⬡
     ⬡ is not limited to when the DRX on duration timer is running?  ⬡
                              4320
                              │ Yes
                              ▼
         ⬡ DRX on duration timer not running at a predefined time period ⬡
         ⬡ before the 1st time?                                          ⬡
                              4330
                              │ Yes
                              ▼
         ⬡ MAC entity of the wireless device in active time of the DRX   ⬡
         ⬡ operation at a predefined time period before the 1st time?    ⬡
                              4340
                              │ Yes
                              ▼
            ┌─────────────────────────────────────┐
            │  Transmit the beam report at a 1st time │
            │                 4350                    │
            └─────────────────────────────────────┘
```

FIG. 43

Receive, by a wireless device from a base station, message(s) comprising: a timer value of a DRX on duration timer for a DRX operation; and a report indicator indicating whether a transmission of a beam report is limited to when the DRX on duration timer is running
4410

↓

Report indicator indicate the transmission of the beam report is not limited to when the DRX on duration timer is running?
4420

↓ Yes

DRX on duration timer not running at a predefined time period before the 1st time?
4430

↓ Yes

Transmit the beam report at a 1st time
4440

↓

Report indicator indicate the transmission of the beam report is limited to when the DRX on duration timer is running?
4450

↓ Yes

DRX on duration timer not running at a predefined time period before the 1st time?
4460

↓ Yes

Skip the transmission of the beam report at the 1st time
4470

FIG. 44

BEAM MANAGEMENT IN DISCONTINUOUS RECEPTION

CROSS-REFERENCE TO RELATED APPLICATIONS

This application claims the benefit of U.S. Provisional Application No. 62/614,258, filed Jan. 5, 2018, and U.S. Provisional Application No. 62/627,254, filed Feb. 7, 2018, which are hereby incorporated by reference in its entirety.

BRIEF DESCRIPTION OF THE SEVERAL VIEWS OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present disclosure.

FIG. 8 shows example TAG configurations as per an aspect of an embodiment of the present disclosure.

FIG. 11A, FIG. 11B, FIG. 11C, FIG. 11D, FIG. 11E, and FIG. 11F are example diagrams for architectures of tight interworking between 5G RAN (e.g. gNB) and LTE RAN (e.g. (e)LTE eNB) as per an aspect of an embodiment of the present disclosure.

FIG. 25A is an example diagram for timing for CSI report when activation of a secondary cell as per an aspect of an embodiment of the present disclosure.

FIG. 25B is an example diagram for timing for CSI report when activation of a secondary cell as per an aspect of an embodiment of the present disclosure.

FIG. 26 is an example diagram for downlink control information (DCI) formats as per an aspect of an embodiment of the present disclosure.

FIG. 29 is an example diagram for various CSI reporting mechanisms as per an aspect of an embodiment of the present disclosure.

FIG. 43 is a flow diagram of an aspect of an embodiment of the present disclosure.

FIG. 44 is a flow diagram of an aspect of an embodiment of the present disclosure.

DETAILED DESCRIPTION OF EMBODIMENTS

Figure 1:
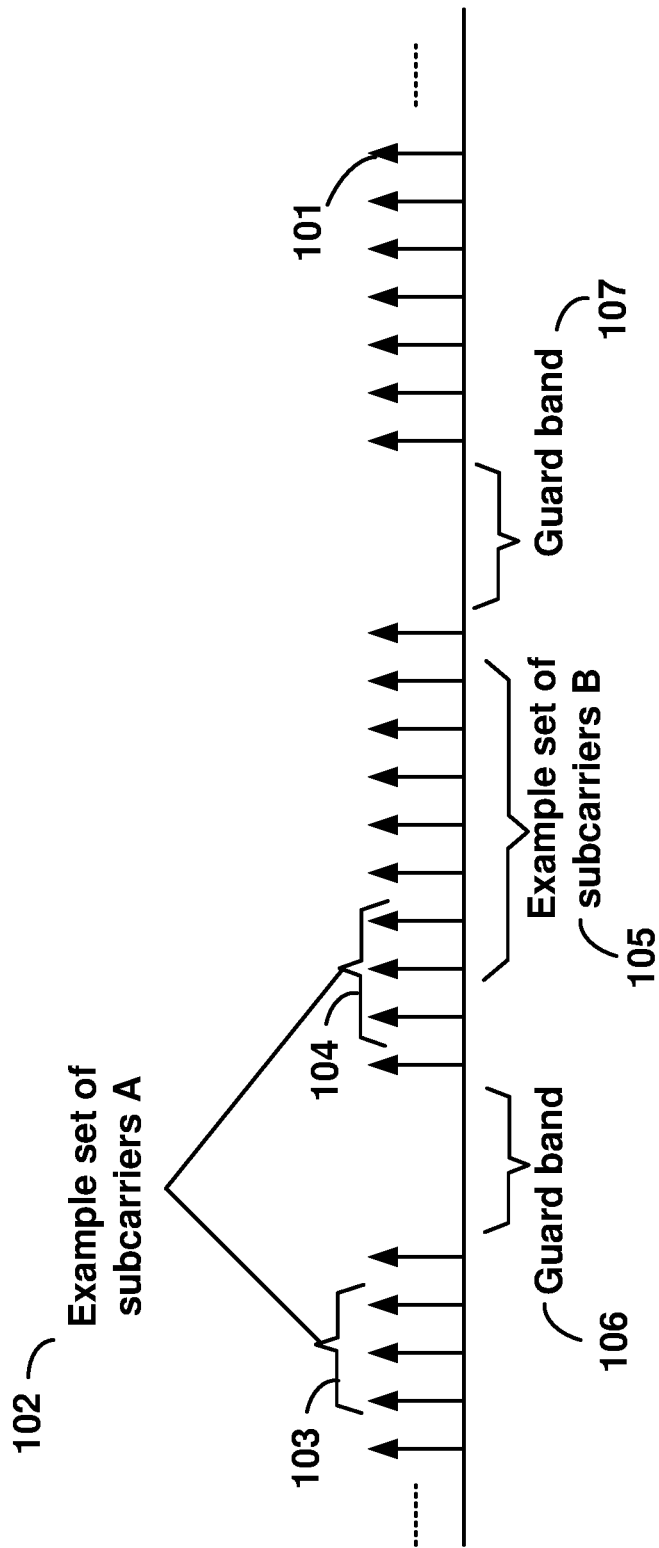
FIG. 1 is a diagram depicting example sets of OFDM subcarriers as per an aspect of an embodiment of the present disclosure.

Example embodiments of the present invention enable operation of carrier aggregation. Embodiments of the technology disclosed herein may be employed in the technical field of multicarrier communication systems. More particularly, the embodiments of the technology disclosed herein may relate to signal transmission in a multicarrier communication system.

The following Acronyms are used throughout the present disclosure:
  ASIC application-specific integrated circuit
  BPSK binary phase shift keying
  CA carrier aggregation
  CC component carrier
  CDMA code division multiple access
  CP cyclic prefix
  CPLD complex programmable logic devices
  CSI channel state information
  CSS common search space
  CU central unit
  DC dual connectivity
  DCI downlink control information
  DL downlink
  DU distributed unit
  eMBB enhanced mobile broadband
  EPC evolved packet core
  E-UTRAN evolved-universal terrestrial radio access network
  FDD frequency division multiplexing
  FPGA field programmable gate arrays
  Fs-C Fs-control plane
  Fs-U Fs-user plane
  gNB next generation node B
  HDL hardware description languages
  HARQ hybrid automatic repeat request
  IE information element
  LTE long term evolution
  MAC media access control
  MCG master cell group
  MeNB master evolved node B
  MIB master information block
  MME mobility management entity
  mMTC massive machine type communications
  NAS non-access stratum
  NGC next generation core
  NG CP next generation control plane core
  NG-C NG-control plane
  NG-U NG-user plane
  NR new radio
  NR MAC new radio MAC
  NR PHY new radio physical
  NR PDCP new radio PDCP
  NR RLC new radio RLC
  NR RRC new radio RRC
  NSSAI network slice selection assistance information
  OFDM orthogonal frequency division multiplexing
  PCC primary component carrier
  PCell primary cell
  PDCCH physical downlink control channel
  PDCP packet data convergence protocol
  PDU packet data unit
  PHICH physical HARQ indicator channel
  PHY physical
  PLMN public land mobile network
  PSCell primary secondary cell
  pTAG primary timing advance group
  PUCCH physical uplink control channel
  PUSCH physical uplink shared channel
  QAM quadrature amplitude modulation
  QPSK quadrature phase shift keying
  RA random access
  RB resource blocks
  RBG resource block groups
  RLC radio link control
  RRC radio resource control
  SCC secondary component carrier
  SCell secondary cell
  SCG secondary cell group
  SC-OFDM single carrier-OFDM
  SDU service data unit
  SeNB secondary evolved node B
  SIB system information block
  SFN system frame number
  sTAGs secondary timing advance group
  S-GW serving gateway
  SRB signaling radio bearer
  TA timing advance
  TAG timing advance group
  TAI tracking area identifier
  TAT time alignment timer
  TB transport block
  TDD time division duplexing
  TDMA time division multiple access
  TTI transmission time interval
  UE user equipment
  UL uplink
  UPGW user plane gateway
  URLLC ultra-reliable low-latency communications
  VHDL VHSIC hardware description language
  Xn-C Xn-control plane
  Xn-U Xn-user plane Xx-C Xx-control plane
Xx-U Xx-user plane Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, 1024-QAM and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present disclosure. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
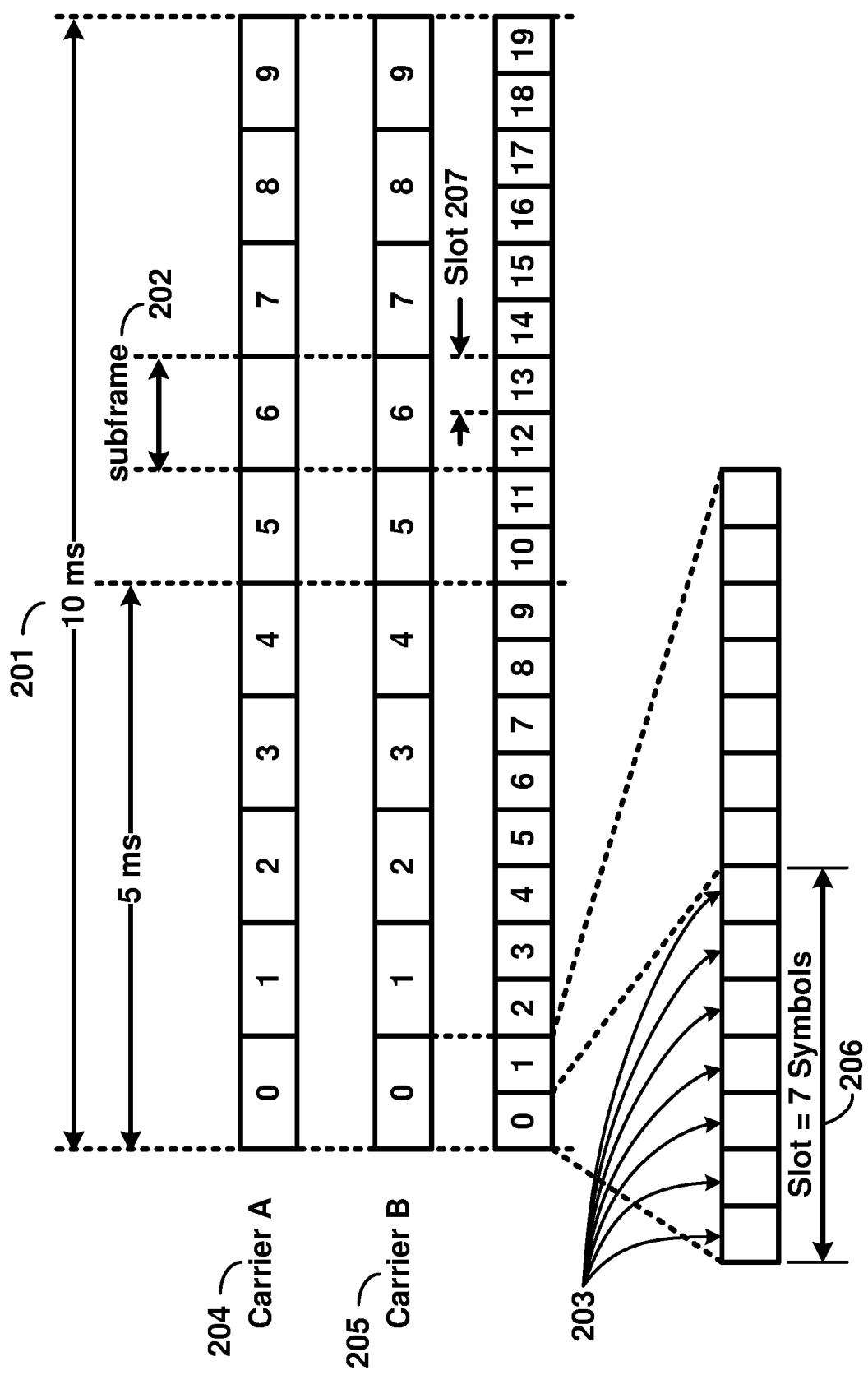
FIG. 2 is a diagram depicting an example transmission time and reception time for two carriers in a carrier group as per an aspect of an embodiment of the present disclosure.

FIG. 2 is a diagram depicting an example transmission time and reception time for two carriers as per an aspect of an embodiment of the present disclosure. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may comprise of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may contain all downlink, all uplink, or a downlink part and an uplink part and/or alike. Slot aggregation may be supported, e.g., data transmission may be scheduled to span one or multiple slots. In an example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
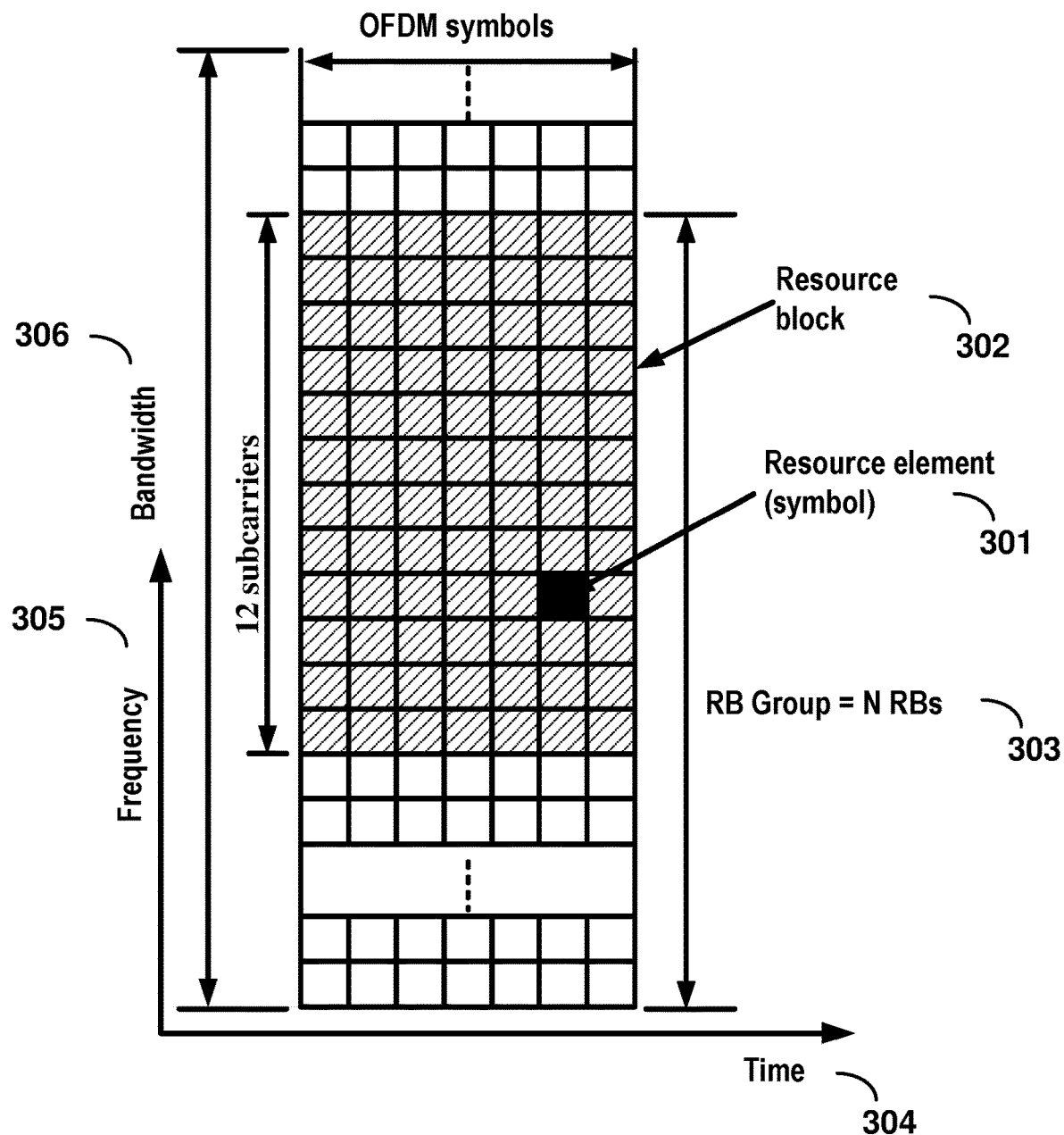
FIG. 3 is a diagram depicting OFDM radio resources as per an aspect of an embodiment of the present disclosure.

FIG. 3 is a diagram depicting OFDM radio resources as per an aspect of an embodiment of the present disclosure. The resource grid structure in time 304 and frequency 305 is illustrated in FIG. 3. The quantity of downlink subcarriers or RBs may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

In an example embodiment, multiple numerologies may be supported. In an example, a numerology may be derived by scaling a basic subcarrier spacing by an integer N. In an example, scalable numerology may allow at least from 15 kHz to 480 kHz subcarrier spacing. The numerology with 15 kHz and scaled numerology with different subcarrier spacing with the same CP overhead may align at a symbol boundary every 1 ms in a NR carrier.

FIG. 5A, FIG. 5B, FIG. 5C and FIG. 5D are example diagrams for uplink and downlink signal transmission as per an aspect of an embodiment of the present disclosure. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for an antenna port, and/or the like.

Example modulation and up-conversion to the carrier frequency of the complex-valued DFTS-OFDM/SC-FDMA baseband signal for an antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in codewords to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port, and/or the like.

Example modulation and up-conversion to the carrier frequency of the complex-valued OFDM baseband signal for an antenna port is shown in FIG. 5D. Filtering may be employed prior to transmission.

Figure 4:
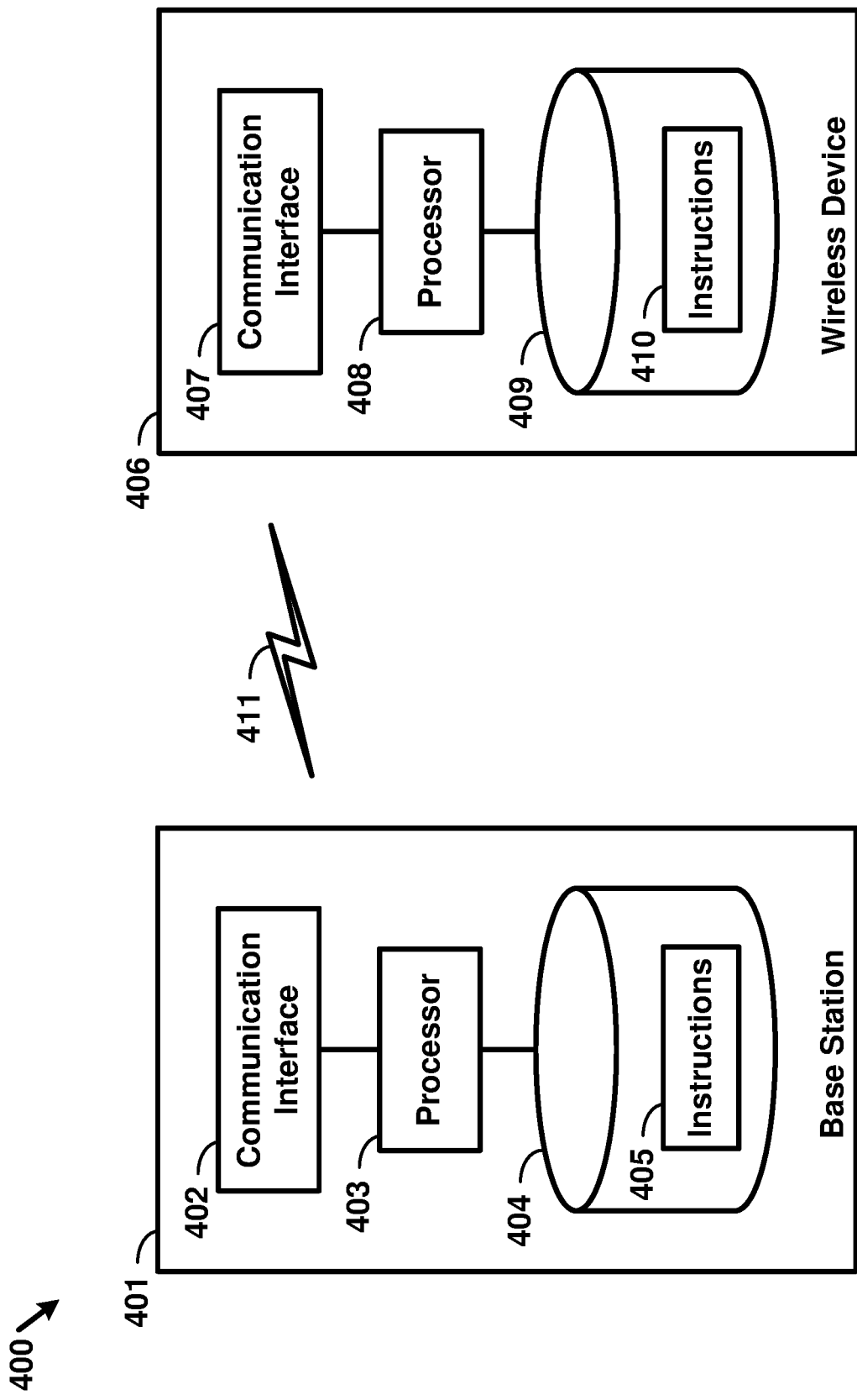
FIG. 4 is a block diagram of a base station and a wireless device as per an aspect of an embodiment of the present disclosure.

FIG. 4 is an example block diagram of a base station 401 and a wireless device 406, as per an aspect of an embodiment of the present disclosure. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

Figure 10A:
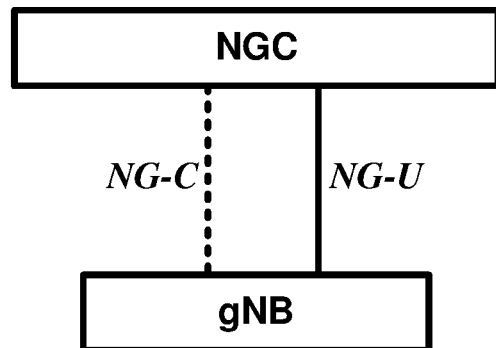
FIG. 10A and FIG. 10B are example diagrams for interfaces between a 5G core network (e.g. NGC) and base stations (e.g. gNB and eLTE eNB) as per an aspect of an embodiment of the present disclosure.
Figure 10B:
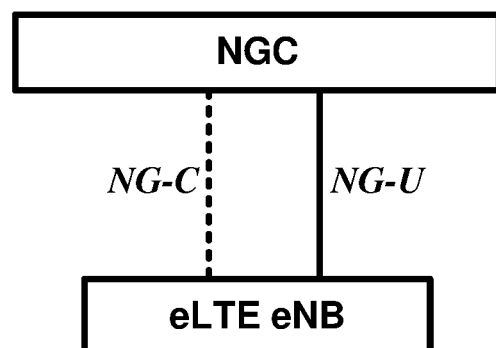

According to some of the various aspects of embodiments, a 5G network may include a multitude of base stations, providing a user plane NR PDCP/NR RLC/NR MAC/NR PHY and control plane (NR RRC) protocol terminations towards the wireless device. The base station(s) may be interconnected with other base station(s) (e.g. employing an Xn interface). The base stations may also be connected employing, for example, an NG interface to an NGC. FIG. 10A and FIG. 10B are example diagrams for interfaces between a 5G core network (e.g. NGC) and base stations (e.g. gNB and eLTE eNB) as per an aspect of an embodiment of the present disclosure. For example, the base stations may be interconnected to the NGC control plane (e.g. NG CP) employing the NG-C interface and to the NGC user plane (e.g. UPGW) employing the NG-U interface. The NG interface may support a many-to-many relation between 5G core networks and base stations.

A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

Figure 6:
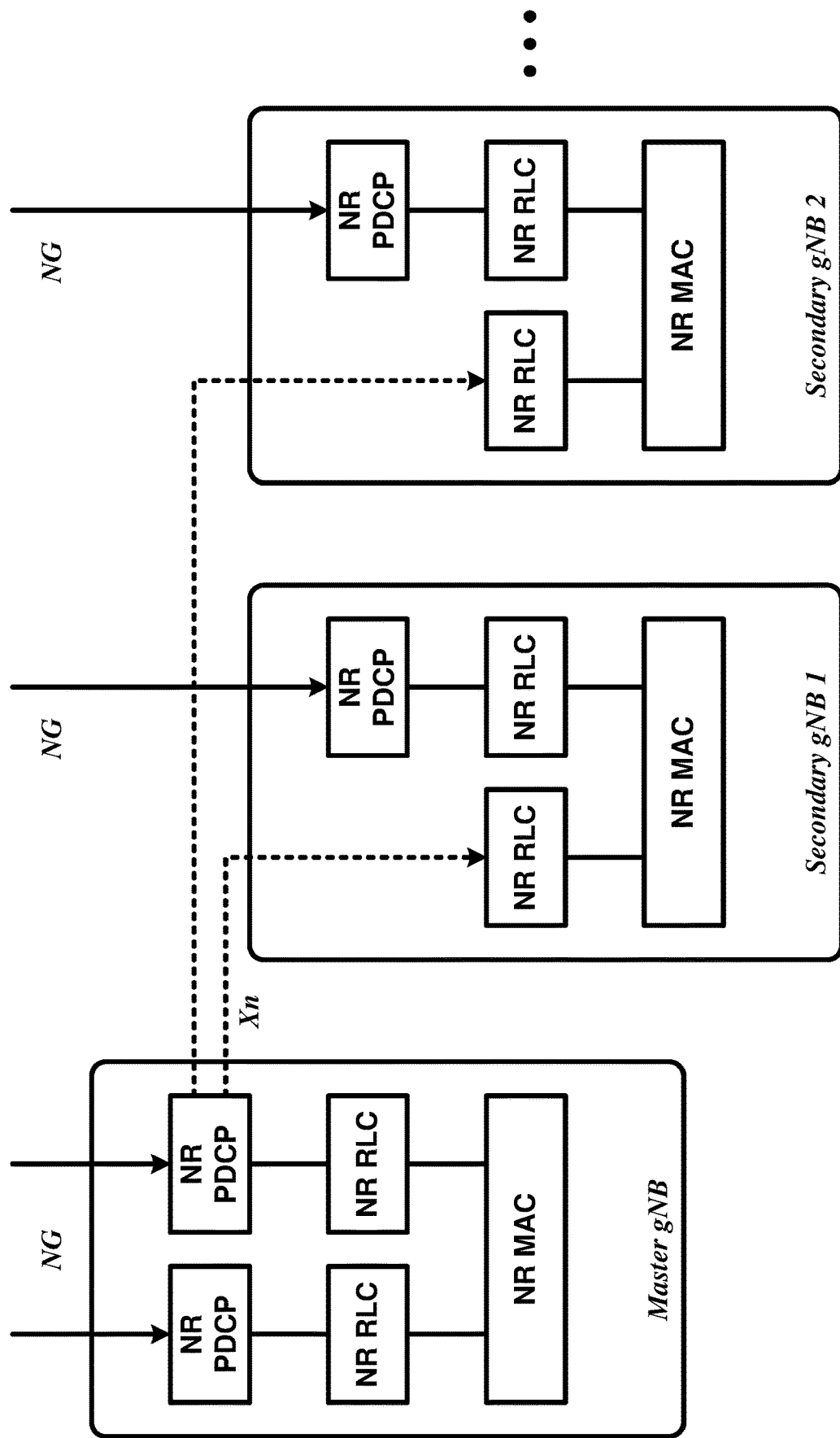
FIG. 6 is an example diagram for a protocol structure with multi-connectivity as per an aspect of an embodiment of the present disclosure.
Figure 7:
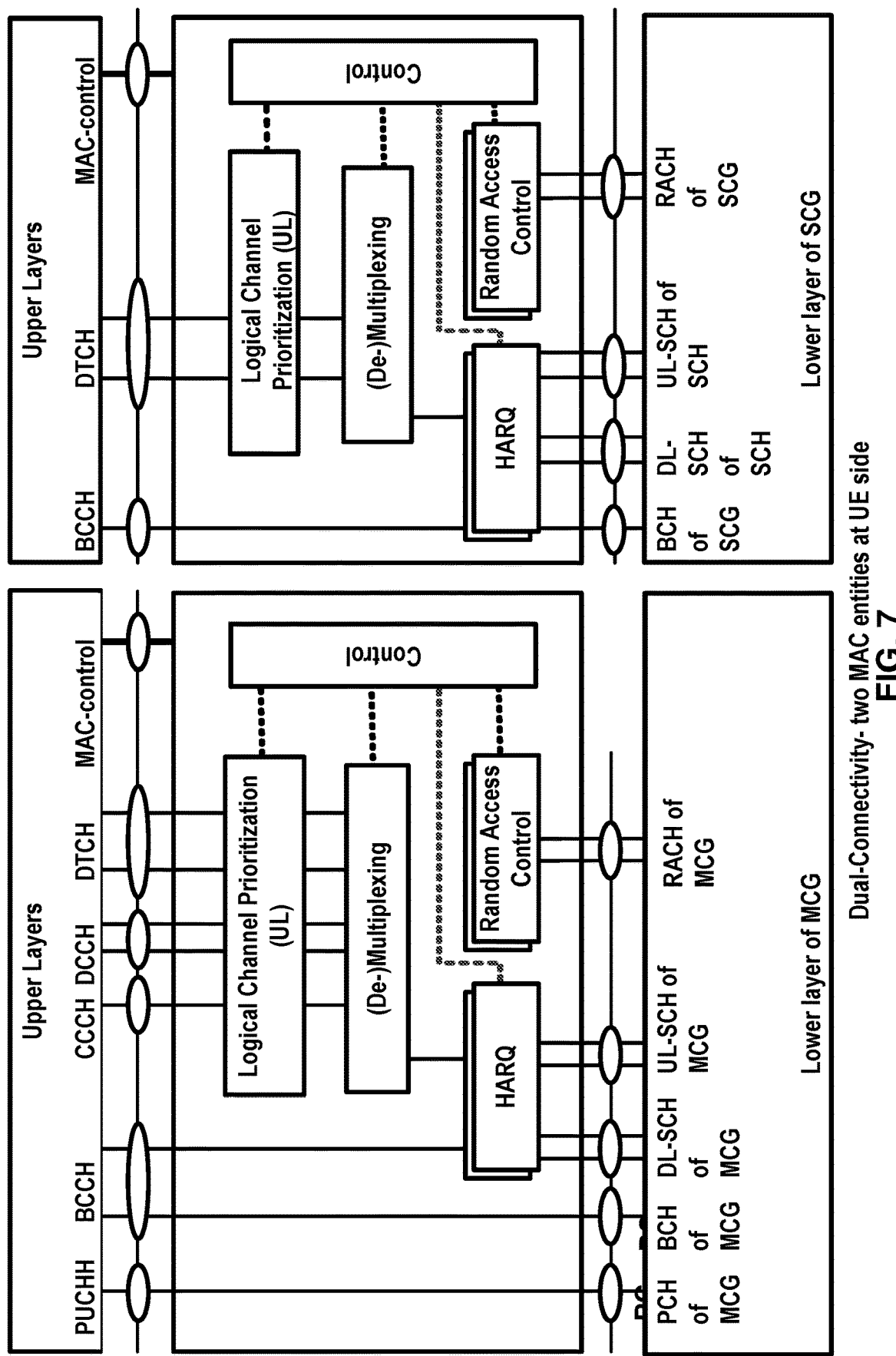
FIG. 7 is an example diagram for a protocol structure with CA and DC as per an aspect of an embodiment of the present disclosure.

FIG. 6 and FIG. 7 are example diagrams for protocol structure with CA and multi-connectivity as per an aspect of an embodiment of the present disclosure. NR may support multi-connectivity operation whereby a multiple RX/TX UE in RRC_CONNECTED may be configured to utilize radio resources provided by multiple schedulers located in multiple gNBs connected via a non-ideal or ideal backhaul over the Xn interface. gNBs involved in multi-connectivity for a certain UE may assume two different roles: a gNB may either act as a master gNB or as a secondary gNB. In multi-connectivity, a UE may be connected to one master gNB and one or more secondary gNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In multi-connectivity, the radio protocol architecture that a particular bearer uses may depend on how the bearer is setup. Three examples of bearers, including, an MCG bearer, an SCG bearer and a split bearer as shown in FIG. 6. NR RRC may be located in master gNB and SRBs may be configured as an MCG bearer type and may use the radio resources of the master gNB. Multi-connectivity may also be described as having at least one bearer configured to use radio resources provided by the secondary gNB. Multi-connectivity may or may not be configured/implemented in example embodiments of the disclosure.

In the case of multi-connectivity, the UE may be configured with multiple NR MAC entities: one NR MAC entity for master gNB, and other NR MAC entities for secondary gNBs. In multi-connectivity, the configured set of serving cells for a UE may comprise of two subsets: the Master Cell Group (MCG) containing the serving cells of the master gNB, and the Secondary Cell Groups (SCGs) containing the serving cells of the secondary gNBs. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of NR RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master gNB may be informed by the UE of a SCG failure type, for split bearer, the DL data transfer over the master gNB is maintained; the NR RLC AM bearer may be configured for the split bearer; like PCell, PSCell may not be de-activated; PSCell may be changed with a SCG change (e.g. with security key change and a RACH procedure); and/or a direct bearer type change between a Split bearer and a SCG bearer or simultaneous configuration of a SCG and a Split bearer may or may not be supported.

With respect to the interaction between a master gNB and secondary gNBs for multi-connectivity, one or more of the following principles may be applied: the master gNB may maintain the RRM measurement configuration of the UE and may, (e.g., based on received measurement reports or traffic conditions or bearer types), decide to ask a secondary gNB to provide additional resources (serving cells) for a UE; upon receiving a request from the master gNB, a secondary gNB may create a container that may result in the configuration of additional serving cells for the UE (or decide that it has no resource available to do so); for UE capability coordination, the master gNB may provide (part of) the AS configuration and the UE capabilities to the secondary gNB; the master gNB and the secondary gNB may exchange information about a UE configuration by employing of NR RRC containers (inter-node messages) carried in Xn messages; the secondary gNB may initiate a reconfiguration of its existing serving cells (e.g., PUCCH towards the secondary gNB); the secondary gNB may decide which cell is the PSCell within the SCG; the master gNB may or may not change the content of the NR RRC configuration provided by the secondary gNB; in the case of a SCG addition and a SCG SCell addition, the master gNB may provide the latest measurement results for the SCG cell(s); both a master gNB and secondary gNBs may know the SFN and subframe offset of each other by OAM, (e.g., for the purpose of DRX alignment and identification of a measurement gap). In an example, when adding a new SCG SCell, dedicated NR RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present disclosure. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
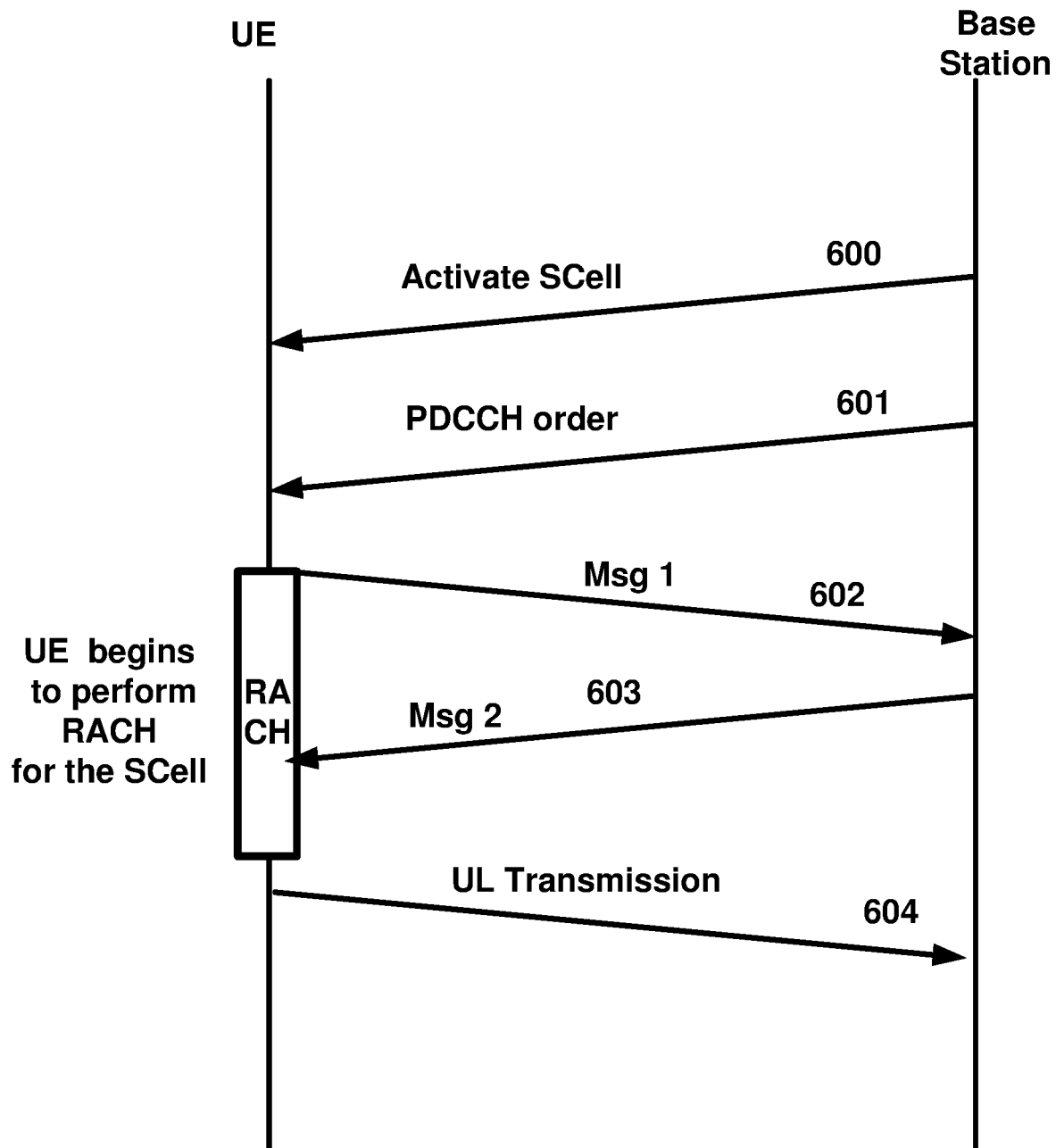
FIG. 9 is an example message flow in a random access process in a secondary TAG as per an aspect of an embodiment of the present disclosure.

FIG. 9 is an example message flow in a random access process in a secondary TAG as per an aspect of an embodiment of the present disclosure. An eNB transmits an activation command 900 to activate an SCell. A preamble 902 (Msg1) may be sent by a UE in response to a PDCCH order 901 on an SCell belonging to an sTAG. In an example embodiment, preamble transmission for SCells may be controlled by the network using PDCCH format 1A. Msg2 message 903 (RAR: random access response) in response to the preamble transmission on the SCell may be addressed to RA-RNTI in a PCell common search space (CSS). Uplink packets 904 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding (configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the disclosure may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

FIG. 11A, FIG. 11B, FIG. 11C, FIG. 11D, FIG. 11E, and FIG. 11F are example diagrams for architectures of tight interworking between 5G RAN and LTE RAN as per an aspect of an embodiment of the present disclosure. The tight interworking may enable a multiple RX/TX UE in RRC_CONNECTED to be configured to utilize radio resources provided by two schedulers located in two base stations (e.g. (e)LTE eNB and gNB) connected via a non-ideal or ideal backhaul over the Xx interface between LTE eNB and gNB or the Xn interface between eLTE eNB and gNB. Base stations involved in tight interworking for a certain UE may assume two different roles: a base station may either act as a master base station or as a secondary base station. In tight interworking, a UE may be connected to one master base station and one secondary base station. Mechanisms implemented in tight interworking may be extended to cover more than two base stations.

In FIG. 11A and FIG. 11B, a master base station may be an LTE eNB, which may be connected to EPC nodes (e.g. to an MME via the S1-C interface and to an S-GW via the S1-U interface), and a secondary base station may be a gNB, which may be a non-standalone node having a control plane connection via an Xx-C interface to an LTE eNB. In the tight interworking architecture of FIG. 11A, a user plane for a gNB may be connected to an S-GW through an LTE eNB via an Xx-U interface between LTE eNB and gNB and an S1-U interface between LTE eNB and S-GW. In the architecture of FIG. 11B, a user plane for a gNB may be connected directly to an S-GW via an S1-U interface between gNB and S-GW.

In FIG. 11C and FIG. 11D, a master base station may be a gNB, which may be connected to NGC nodes (e.g. to a control plane core node via the NG-C interface and to a user plane core node via the NG-U interface), and a secondary base station may be an eLTE eNB, which may be a non-standalone node having a control plane connection via an Xn-C interface to a gNB. In the tight interworking architecture of FIG. 11C, a user plane for an eLTE eNB may be connected to a user plane core node through a gNB via an Xn-U interface between eLTE eNB and gNB and an NG-U interface between gNB and user plane core node. In the architecture of FIG. 11D, a user plane for an eLTE eNB may be connected directly to a user plane core node via an NG-U interface between eLTE eNB and user plane core node.

In FIG. 11E and FIG. 11F, a master base station may be an eLTE eNB, which may be connected to NGC nodes (e.g. to a control plane core node via the NG-C interface and to a user plane core node via the NG-U interface), and a secondary base station may be a gNB, which may be a non-standalone node having a control plane connection via an Xn-C interface to an eLTE eNB. In the tight interworking architecture of FIG. 11E, a user plane for a gNB may be connected to a user plane core node through an eLTE eNB via an Xn-U interface between eLTE eNB and gNB and an NG-U interface between eLTE eNB and user plane core node. In the architecture of FIG. 11F, a user plane for a gNB may be connected directly to a user plane core node via an NG-U interface between gNB and user plane core node.

Figure 12A:
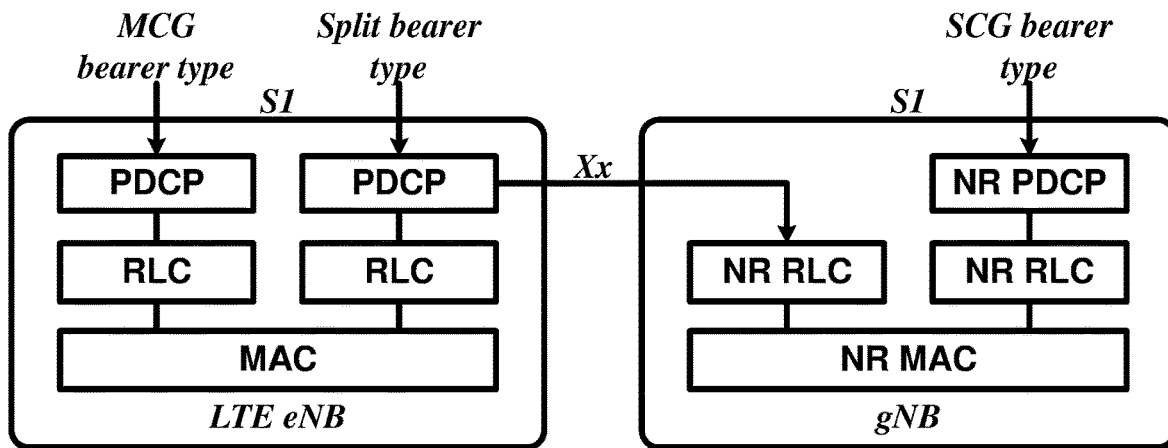
FIG. 12A, FIG. 12B, and FIG. 12C are example diagrams for radio protocol structures of tight interworking bearers as per an aspect of an embodiment of the present disclosure.
Figure 12B:
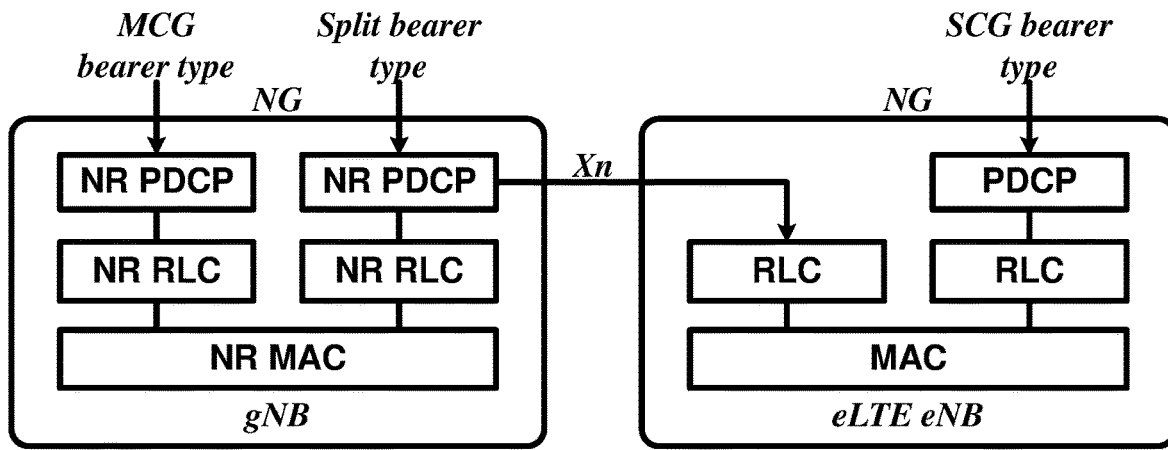
Figure 12C:
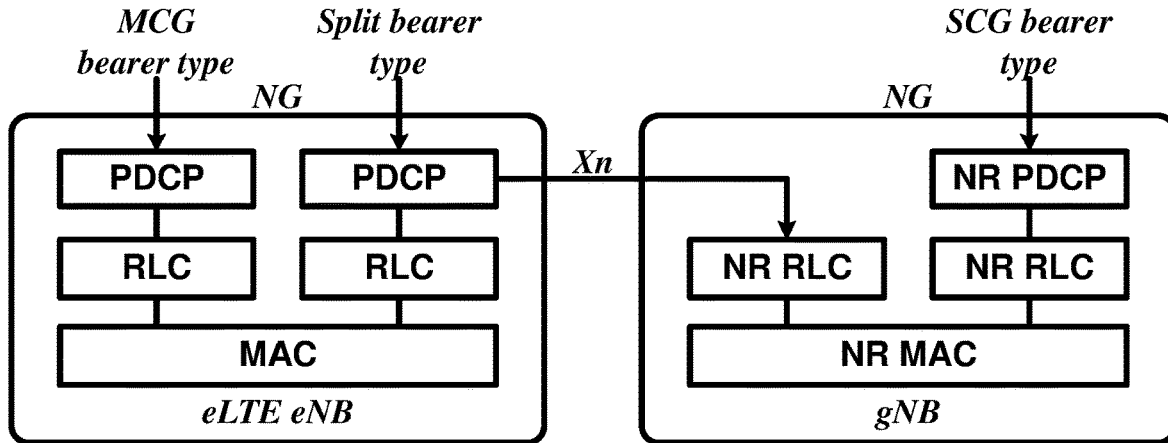

FIG. 12A, FIG. 12B, and FIG. 12C are example diagrams for radio protocol structures of tight interworking bearers as per an aspect of an embodiment of the present disclosure. In FIG. 12A, an LTE eNB may be a master base station, and a gNB may be a secondary base station. In FIG. 12B, a gNB may be a master base station, and an eLTE eNB may be a secondary base station. In FIG. 12C, an eLTE eNB may be a master base station, and a gNB may be a secondary base station. In 5G network, the radio protocol architecture that a particular bearer uses may depend on how the bearer is setup. Three example bearers including an MCG bearer, an SCG bearer, and a split bearer as shown in FIG. 12A, FIG. 12B, and FIG. 12C. NR RRC may be located in master base station, and SRBs may be configured as an MCG bearer type and may use the radio resources of the master base station. Tight interworking may also be described as having at least one bearer configured to use radio resources provided by the secondary base station. Tight interworking may or may not be configured/implemented in example embodiments of the disclosure.

In the case of tight interworking, the UE may be configured with two MAC entities: one MAC entity for master base station, and one MAC entity for secondary base station. In tight interworking, the configured set of serving cells for a UE may comprise of two subsets: the Master Cell Group (MCG) containing the serving cells of the master base station, and the Secondary Cell Group (SCG) containing the serving cells of the secondary base station. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one split bearer; upon detection of a physical layer problem or a random access problem on a PSCell, or the maximum number of (NR) RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master base station may be informed by the UE of a SCG failure type, for split bearer, the DL data transfer over the master base station is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a master base station and a secondary base station, one or more of the following principles may be applied: the master base station may maintain the RRM measurement configuration of the UE and may, (e.g., based on received measurement reports, traffic conditions, or bearer types), decide to ask a secondary base station to provide additional resources (serving cells) for a UE; upon receiving a request from the master base station, a secondary base station may create a container that may result in the configuration of additional serving cells for the UE (or decide that it has no resource available to do so); for UE capability coordination, the master base station may provide (part of) the AS configuration and the UE capabilities to the secondary base station; the master base station and the secondary base station may exchange information about a UE configuration by employing of RRC containers (inter-node messages) carried in Xn or Xx messages; the secondary base station may initiate a reconfiguration of its existing serving cells (e.g., PUCCH towards the secondary base station); the secondary base station may decide which cell is the PSCell within the SCG; the master base station may not change the content of the RRC configuration provided by the secondary base station; in the case of a SCG addition and a SCG SCell addition, the master base station may provide the latest measurement results for the SCG cell(s); both a master base station and a secondary base station may know the SFN and subframe offset of each other by OAM, (e.g., for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

Figure 13A:
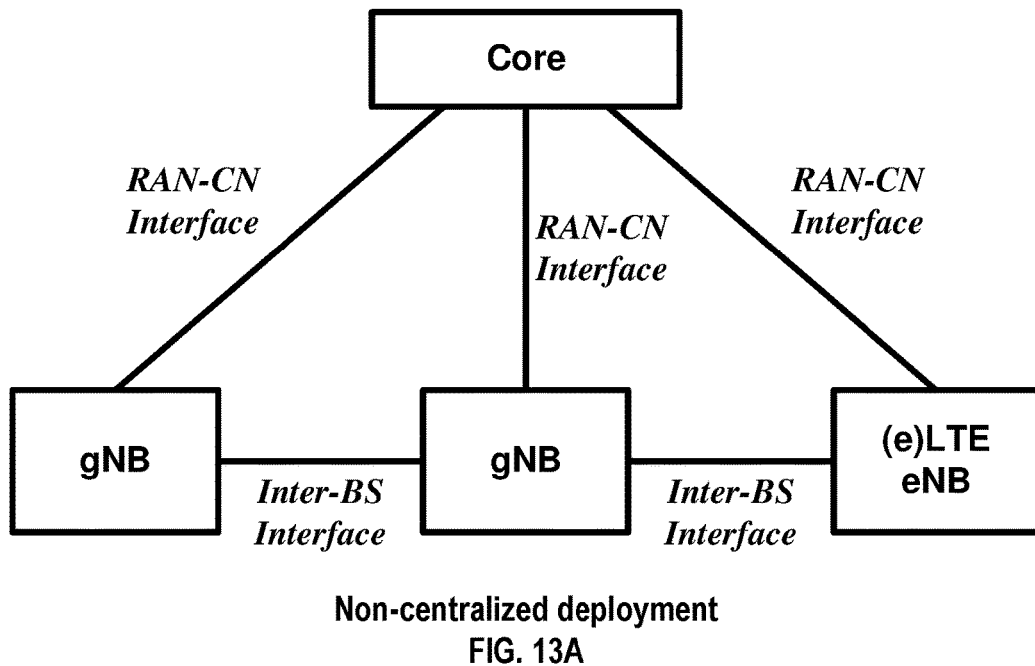
FIG. 13A and FIG. 13B are example diagrams for gNB deployment scenarios as per an aspect of an embodiment of the present disclosure.
Figure 13B:
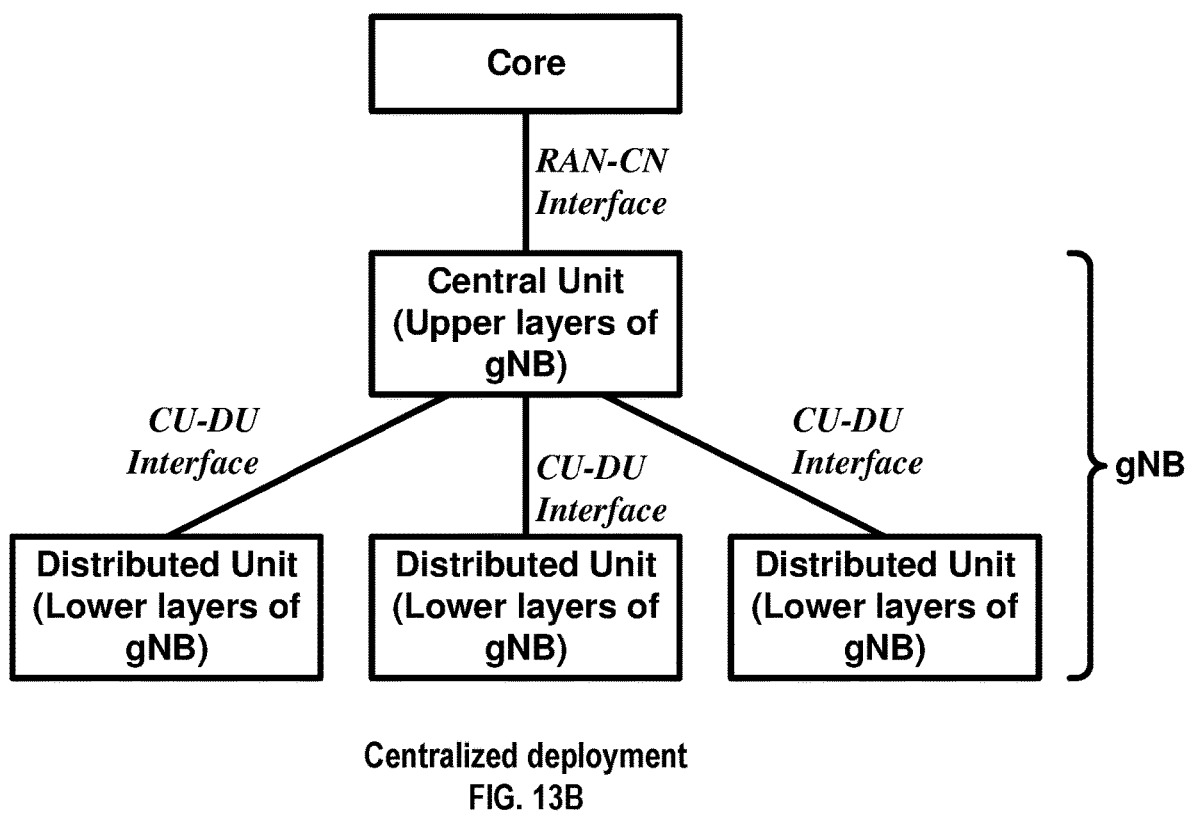

FIG. 13A and FIG. 13B are example diagrams for gNB deployment scenarios as per an aspect of an embodiment of the present disclosure. In the non-centralized deployment scenario in FIG. 13A, the full protocol stack (e.g. NR RRC, NR PDCP, NR RLC, NR MAC, and NR PHY) may be supported at one node. In the centralized deployment scenario in FIG. 13B, upper layers of gNB may be located in a Central Unit (CU), and lower layers of gNB may be located in Distributed Units (DU). The CU-DU interface (e.g. Fs interface) connecting CU and DU may be ideal or non-ideal. Fs-C may provide a control plane connection over Fs interface, and Fs-U may provide a user plane connection over Fs interface. In the centralized deployment, different functional split options between CU and DUs may be possible by locating different protocol layers (RAN functions) in CU and DU. The functional split may support flexibility to move RAN functions between CU and DU depending on service requirements and/or network environments. The functional split option may change during operation after Fs interface setup procedure or may change only in Fs setup procedure (i.e. static during operation after Fs setup procedure).

Figure 14:
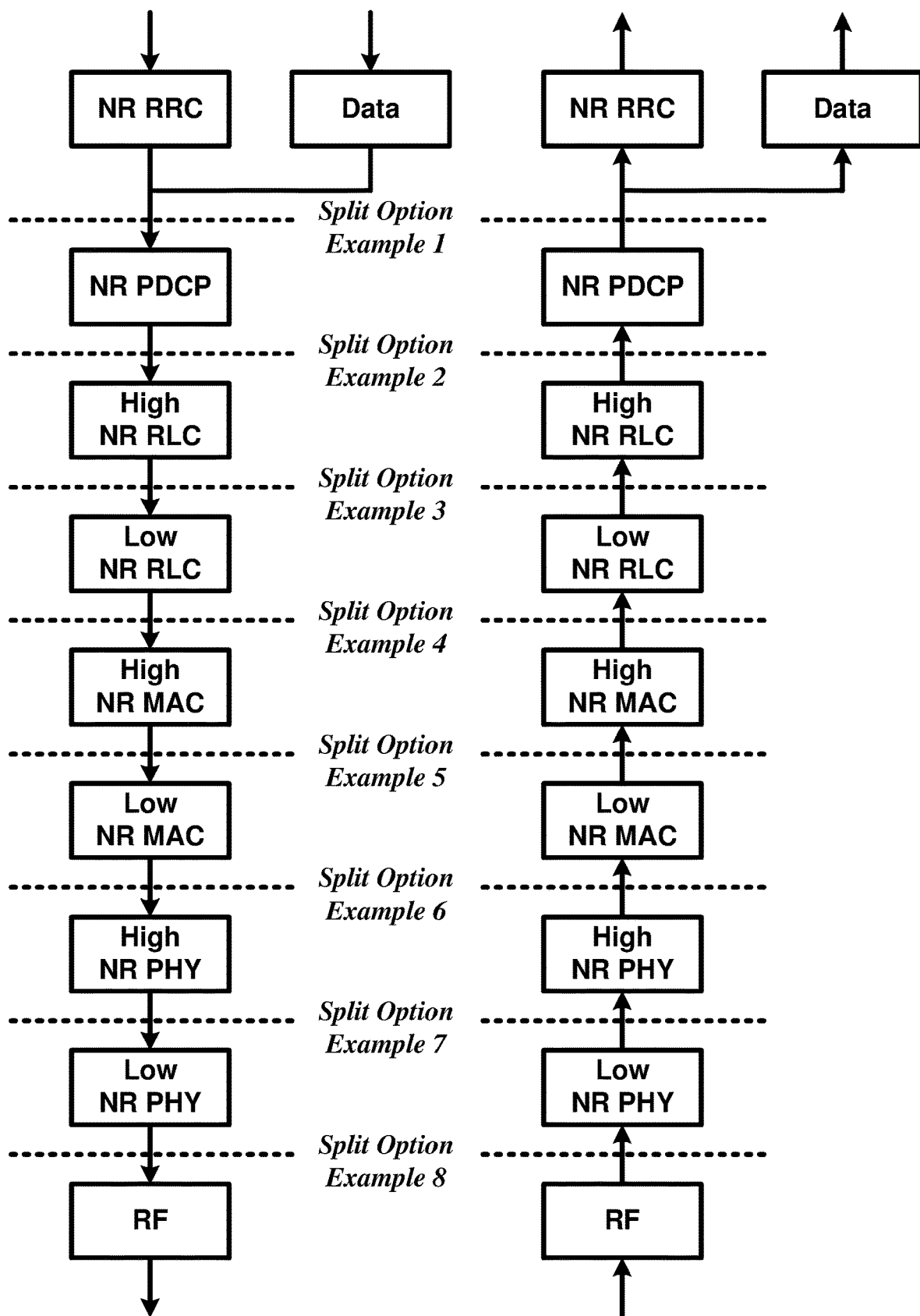
FIG. 14 is an example diagram for functional split option examples of the centralized gNB deployment scenario as per an aspect of an embodiment of the present disclosure.

FIG. 14 is an example diagram for different functional split option examples of the centralized gNB deployment scenario as per an aspect of an embodiment of the present disclosure. In the split option example 1, an NR RRC may be in CU, and NR PDCP, NR RLC, NR MAC, NR PHY, and RF may be in DU. In the split option example 2, an NR RRC and NR PDCP may be in CU, and NR RLC, NR MAC, NR PHY, and RF may be in DU. In the split option example 3, an NR RRC, NR PDCP, and partial function of NR RLC may be in CU, and the other partial function of NR RLC, NR MAC, NR PHY, and RF may be in DU. In the split option example 4, an NR RRC, NR PDCP, and NR RLC may be in CU, and NR MAC, NR PHY, and RF may be in DU. In the split option example 5, an NR RRC, NR PDCP, NR RLC, and partial function of NR MAC may be in CU, and the other partial function of NR MAC, NR PHY, and RF may be in DU. In the split option example 6, an NR RRC, NR PDCP, NR RLC, and NR MAC may be in CU, and NR PHY and RF may be in DU. In the split option example 7, an NR RRC, NR PDCP, NR RLC, NR MAC, and partial function of NR PHY may be in CU, and the other partial function of NR PHY and RF may be in DU. In the split option example 8, an NR RRC, NR PDCP, NR RLC, NR MAC, and NR PHY may be in CU, and RF may be in DU.

The functional split may be configured per CU, per DU, per UE, per bearer, per slice, or with other granularities. In per CU split, a CU may have a fixed split, and DUs may be configured to match the split option of CU. In per DU split, a DU may be configured with a different split, and a CU may provide different split options for different DUs. In per UE split, a gNB (CU and DU) may provide different split options for different UEs. In per bearer split, different split options may be utilized for different bearer types. In per slice splice, different split options may be applied for different slices.

In an example embodiment, the new radio access network (new RAN) may support different network slices, which may allow differentiated treatment customized to support different service requirements with end to end scope. The new RAN may provide a differentiated handling of traffic for different network slices that may be pre-configured and may allow a single RAN node to support multiple slices. The new RAN may support selection of a RAN part for a given network slice, by one or more slice ID(s) or NSSAI(s) provided by a UE or an NGC (e.g. NG CP). The slice ID(s) or NSSAI(s) may identify one or more of pre-configured network slices in a PLMN. For initial attach, a UE may provide a slice ID and/or an NSSAI, and a RAN node (e.g. gNB) may use the slice ID or the NSSAI for routing an initial NAS signaling to an NGC control plane function (e.g. NG CP). If a UE does not provide any slice ID or NSSAI, a RAN node may send a NAS signaling to a default NGC control plane function. For subsequent accesses, the UE may provide a temporary ID for a slice identification, which may be assigned by the NGC control plane function, to enable a RAN node to route the NAS message to a relevant NGC control plane function. The new RAN may support resource isolation between slices. The RAN resource isolation may be achieved by avoiding that shortage of shared resources in one slice breaks a service level agreement for another slice.

The amount of data traffic carried over cellular networks is expected to increase for many years to come. The number of users/devices is increasing, and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, may be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by wireless devices; time & frequency synchronization of wireless devices.

In an example embodiment, DL LAA design may employ subframe boundary alignment according to LTE-A carrier aggregation timing relationships across serving cells aggregated by CA. This may not imply that the base station transmissions may start only at the subframe boundary. LAA may support transmitting PDSCH when not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

LAA may employ uplink LBT at the wireless device. The UL LBT scheme may be different from the DL LBT scheme (e.g. by using different LBT mechanisms or parameters) for example, since the LAA UL is based on scheduled access which affects a wireless device's channel contention opportunities. Other considerations motivating a different UL LBT scheme include, but are not limited to, multiplexing of multiple wireless devices in a single subframe.

In an example, a DL transmission burst may be a continuous transmission from a DL transmitting node with no transmission immediately before or after from the same node on the same CC. An UL transmission burst from a wireless device perspective may be a continuous transmission from a wireless device with no transmission immediately before or after from the same wireless device on the same CC. In an example, UL transmission burst is defined from a wireless device perspective. In an example, an UL transmission burst may be defined from a base station perspective. In an example, in case of a base station operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

A New Radio (NR) system may support both single beam and multi-beam operations. In a multi-beam system, a base station (e.g., gNB) may perform a downlink beam sweeping to provide coverage for downlink Synchronization Signals (SSs) and common control channels. A User Equipment (UE) may perform an uplink beam sweeping for uplink direction to access a cell. In a single beam scenario, a gNB may configure time-repetition transmission for one SS block, which may comprise at least Primary Synchronization Signal (PSS), Secondary Synchronization Signal (SSS), and Physical Broadcast Channel (PBCH), with a wide beam. In a multi-beam scenario, a gNB may configure at least some of these signals and physical channels in multiple beams. A UE may identify at least OFDM symbol index, slot index in a radio frame and radio frame number from an SS block.

Figure 15:
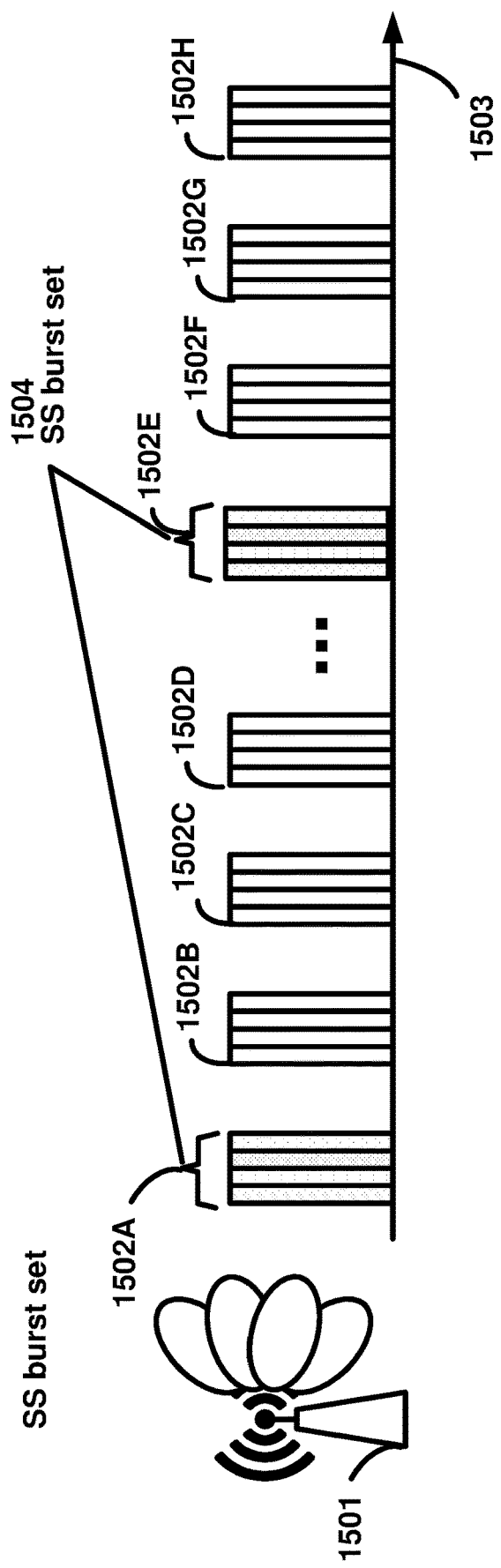
FIG. 15 is an example diagram for synchronization signal block transmissions as per an aspect of an embodiment of the present disclosure.

In an example, in an RRC_INACTIVE state or RRC_IDLE state, a UE may assume that SS blocks form an SS burst, and an SS burst set. An SS burst set may have a given periodicity. In multi-beam scenarios, SS blocks may be transmitted in multiple beams, together forming an SS burst. One or more SS blocks may be transmitted on one beam. A beam has a steering direction. If multiple SS bursts are transmitted with beams, these SS bursts together may form an SS burst set as shown in FIG. 15. A base station 1501 (e.g., a gNB in NR) may transmit SS bursts 1502A to 1502H during time periods 1503. A plurality of these SS bursts may comprise an SS burst set, such as an SS burst set 1504 (e.g., SS bursts 1502A and 1502E). An SS burst set may comprise any number of a plurality of SS bursts 1502A to 1502H. Each SS burst within an SS burst set may transmitted at a fixed or variable periodicity during time periods 1503.

An SS may be based on Cyclic Prefix-Orthogonal Frequency Division Multiplexing (CP-OFDM). The SS may comprise at least two types of synchronization signals; NR-PSS (Primary synchronization signal) and NR-SSS (Secondary synchronization signal). NR-PSS may be defined at least for initial symbol boundary synchronization to the NR cell. NR-SSS may be defined for detection of NR cell ID or at least part of NR cell ID. NR-SSS detection may be based on the fixed time/frequency relationship with NR-PSS resource position irrespective of duplex mode and beam operation type at least within a given frequency range and CP overhead. Normal CP may be supported for NR-PSS and NR-SSS.

The NR may comprise at least one physical broadcast channel (NR-PBCH). When a gNB transmit (or broadcast) the NR-PBCH, a UE may decode the NR-PBCH based on the fixed relationship with NR-PSS and/or NR-SSS resource position irrespective of duplex mode and beam operation type at least within a given frequency range and CP overhead. NR-PBCH may be a non-scheduled broadcast channel carrying at least a part of minimum system information with fixed payload size and periodicity predefined in the specification depending on carrier frequency range.

In single beam and multi-beam scenarios, NR may comprise an SS block that may support time (frequency, and/or spatial) division multiplexing of NR-PSS, NR-SSS, and NR-PBCH. A gNB may transmit NR-PSS, NR-SSS and/or NR-PBCH within an SS block. For a given frequency band, an SS block may correspond to N OFDM symbols based on the default subcarrier spacing, and N may be a constant. The signal multiplexing structure may be fixed in NR. A wireless device may identify, e.g., from an SS block, an OFDM symbol index, a slot index in a radio frame, and a radio frame number from an SS block.

A NR may support an SS burst comprising one or more SS blocks. An SS burst set may comprise one or more SS bursts. For example, a number of SS bursts within a SS burst set may be finite. From physical layer specification perspective, NR may support at least one periodicity of SS burst set. From UE perspective, SS burst set transmission may be periodic, and UE may assume that a given SS block is repeated with an SS burst set periodicity.

Within an SS burst set periodicity, NR-PBCH repeated in one or more SS blocks may change. A set of possible SS block time locations may be specified per frequency band in an RRC message. The maximum number of SS-blocks within SS burst set may be carrier frequency dependent. The position(s) of actual transmitted SS-blocks may be informed at least for helping CONNECTED/IDLE mode measurement, for helping CONNECTED mode UE to receive downlink (DL) data/control in one or more SS-blocks, or for helping IDLE mode UE to receive DL data/control in one or more SS-blocks. A UE may not assume that the gNB transmits the same number of physical beam(s). A UE may not assume the same physical beam(s) across different SS-blocks within an SS burst set. For an initial cell selection, UE may assume default SS burst set periodicity which may be broadcast via an RRC message and frequency band-dependent. At least for multi-beams operation case, the time index of SS-block may be indicated to the UE.

For CONNECTED and IDLE mode UEs, NR may support network indication of SS burst set periodicity and information to derive measurement timing/duration (e.g., time window for NR-SS detection). A gNB may provide (e.g., via broadcasting an RRC message) one SS burst set periodicity information per frequency carrier to UE and information to derive measurement timing/duration if possible. In case that one SS burst set periodicity and one information regarding timing/duration are indicated, a UE may assume the periodicity and timing/duration for all cells on the same carrier. If a gNB does not provide indication of SS burst set periodicity and information to derive measurement timing/duration, a UE may assume a predefined periodicity, e.g., 5 ms, as the SS burst set periodicity. NR may support set of SS burst set periodicity values for adaptation and network indication.

For initial access, a UE may assume a signal corresponding to a specific subcarrier spacing of NR-PSS/SSS in a given frequency band given by a NR specification. For NR-PSS, a Zadoff-Chu (ZC) sequence may be employed as a sequence for NR-PSS. NR may define at least one basic sequence length for a SS in case of sequence-based SS design. The number of antenna port of NR-PSS may be 1. For NR-PBCH transmission, NR may support a fixed number of antenna port(s). A UE may not be required for a blind detection of NR-PBCH transmission scheme or number of antenna ports. A UE may assume the same PBCH numerology as that of NR-SS. For the minimum system information delivery, NR-PBCH may comprise a part of minimum system information. NR-PBCH contents may comprise at least a part of the SFN (system frame number) or CRC. A gNB may transmit the remaining minimum system information in shared downlink channel via NR-PDSCH.

In a multi-beam example, one or more of PSS, SSS, or PBCH signals may be repeated for a cell, e.g., to support cell selection, cell reselection, and/or initial access procedures. For an SS burst, an associated PBCH or a physical downlink shared channel (PDSCH) scheduling system information may be broadcasted by a base station to multiple wireless devices. The PDSCH may be indicated by a physical downlink control channel (PDCCH) in a common search space. The system information may comprise a physical random access channel (PRACH) configuration for a beam. For a beam, a base station (e.g., a gNB in NR) may have a RACH configuration which may include a PRACH preamble pool, time and/or frequency radio resources, and other power related parameters. A wireless device may use a PRACH preamble from a RACH configuration to initiate a contention-based RACH procedure or a contention-free RACH procedure. A wireless device may perform a 4-step RACH procedure, which may be a contention-based RACH procedure or a contention-free RACH procedure. The wireless device may select a beam associated with an SS block that may have the best receiving signal quality. The wireless device may successfully detect a cell identifier associated with the cell and decode system information with a RACH configuration. The wireless device may use one PRACH preamble and select one PRACH resource from RACH resources indicated by the system information associated with the selected beam. A PRACH resource may comprise at least one of: a PRACH index indicating a PRACH preamble, a PRACH format, a PRACH numerology, time and/or frequency radio resource allocation, power setting of a PRACH transmission, and/or other radio resource parameters. For a contention-free RACH procedure, the PRACH preamble and resource may be indicated in a DCI or other high layer signaling.

In an example, a UE may detect one or more PSS/SSS/PBCH for cell selection/reselection and/or initial access procedures. PBCH, or a Physical Downlink Shared Channel (PDSCH), indicated by a Physical Downlink Control Channel (PDCCH) in common search space, scheduling a system information, such as System Information Block type 2 (SIB2), may be broadcasted to multiple UEs. In an example, SIB2 may carry one or more Physical Random Access Channel (PRACH) configuration. In an example, a gNB may have one or more Random Access Channel (RACH) configuration which may include PRACH preamble pool, time/frequency radio resources, and other power related parameters. A UE may select a PRACH preamble from a RACH configuration to initiate a contention-based RACH procedure, or a contention-free RACH procedure.

Figure 16B:
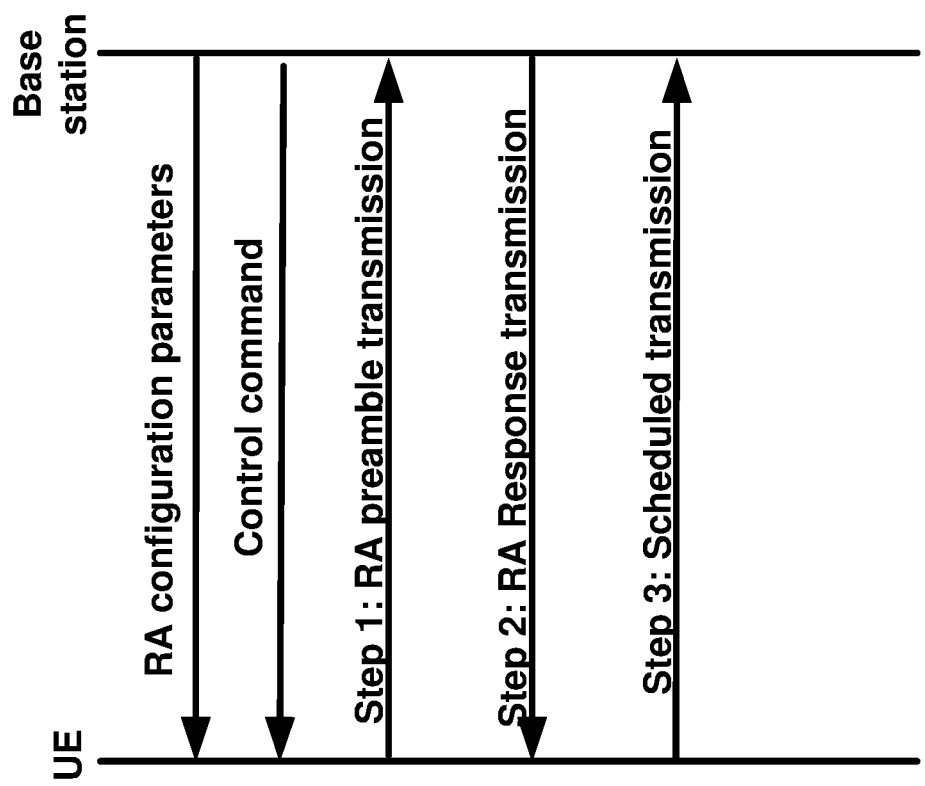
FIG. 16A and FIG. 16B are example diagrams of random access procedures as per an aspect of an embodiment of the present disclosure.
Figure 16A:
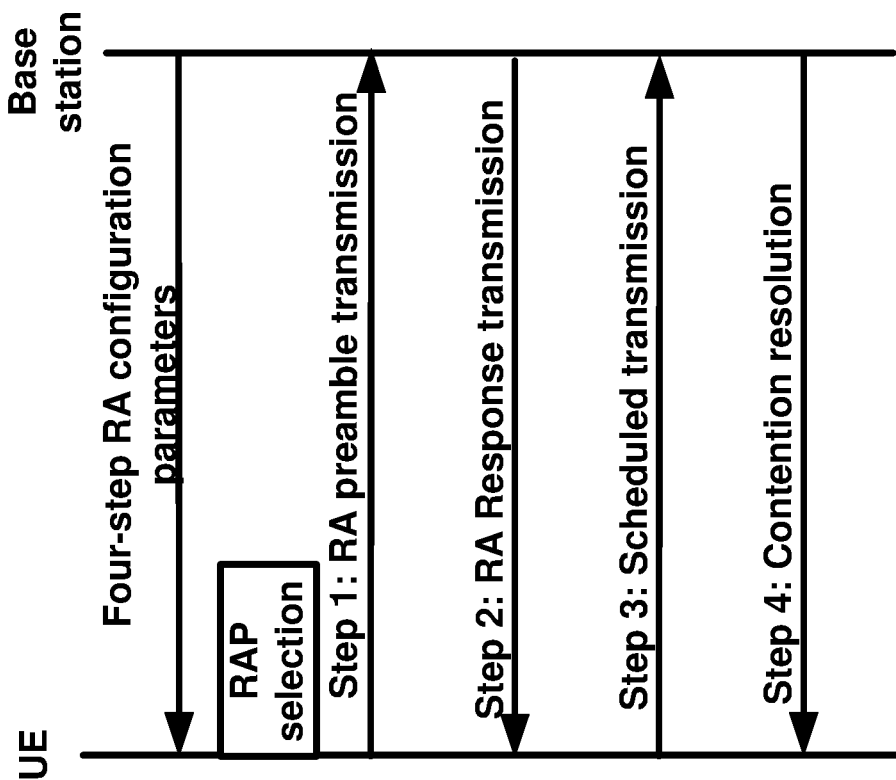

In an example, a UE may perform a 4-step RACH procedure, which may be a contention-based or contention-free RACH procedure. A four-step random access (RA) procedure may comprise RA preamble (RAP) transmission in the first step, random access response (RAR) transmission in the second step, scheduled transmission of one or more transport blocks (TBs) in the third step, and contention resolution in the fourth step as shown in FIG. 16. Specifically, FIG. 16A shows a contention-based 4-step RA procedure, and FIG. 16B shows a contention-free RA procedure.

In the first step, a UE may transmit a RAP using a configured RA preamble format with a Tx beam. RA channel (RACH) resource may be defined as a time-frequency resource to transmit a RAP. Broadcast system information may inform whether a UE needs to transmit one or multiple/repeated preamble within a subset of RACH resources.

A base station may configure an association between DL signal/channel, and a subset of RACH resources and/or a subset of RAP indices, for determining the downlink (DL) transmission in the second step. Based on the DL measurement and the corresponding association, a UE may select the subset of RACH resources and/or the subset of RAP indices. In an example, there may be two RAP groups informed by broadcast system information and one may be optional. If a base station configures the two groups in the four-step RA procedure, a UE may determine which group the UE selects a RAP from, based on the pathloss and a size of the message to be transmitted by the UE in the third step. A base station may use a group type to which a RAP belongs as an indication of the message size in the third step and the radio conditions at a UE. A base station may broadcast the RAP grouping information along with one or more thresholds on system information.

In the second step of the four-step RA procedure, a base station may transmit a RA response (RAR) to the UE in response to reception of a RAP that the UE transmits. A UE may monitor the PDCCH carrying a DCI, to detect RAR transmitted on a PDSCH in a RA Response window. The DCI may be CRC-scrambled by the RA-RNTI (Random Access-Radio Network Temporary Identifier). RA-RNTI may be used on the PDCCH when Random Access Response messages are transmitted. It may unambiguously identify which time-frequency resource is used by the MAC entity to transmit the Random Access preamble. The RA Response window may start at the subframe that contains the end of a RAP transmission plus three subframes. The RA Response window may have a length indicated by ra-ResponseWindowSize. A UE may compute the RA-RNTI associated with the PRACH in which the UE transmits a RAP as: RA-RNTI=1+t_id+10*f_id, where t_id is an index of a first subframe of a specified PRACH ($0 \leq t\_id < 10$), and f_id is an index of a specified PRACH within the subframe, in ascending order of frequency domain ($0 \leq f\_id < 6$). In an example, different types of UEs, e.g. NB-IoT, BL-UE, or UE-EC may employ different formulas for RA-RNTI calculations.

A UE may stop monitoring for RAR(s) after decoding of a MAC packet data unit (PDU) for RAR comprising a RAP identifier (RAPID) that matches the RAP transmitted by the UE. The MAC PDU may comprise one or more MAC RARs and a MAC header that may comprise a subheader having a backoff indicator (BI) and one or more subheader that comprises RAPIDs.

Figure 17:
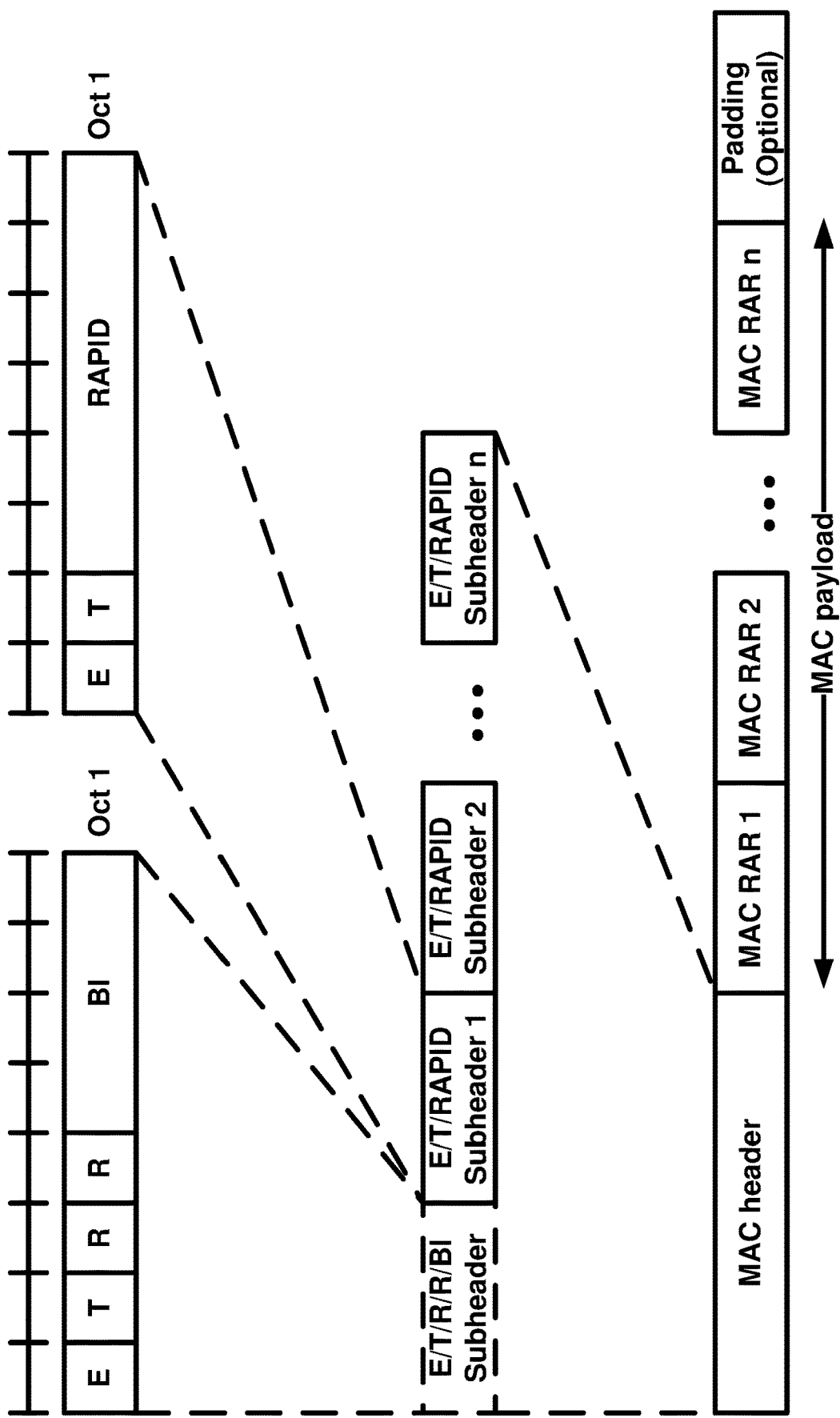
FIG. 17 is an example diagram of a MAC PDU comprising a RAR as per an aspect of an embodiment of the present disclosure.

FIG. 17 illustrates an example of a MAC PDU comprising a MAC header and MAC RARs for a four-step RA procedure. If a RAR comprises a RAPID corresponding to a RAP that a UE transmits, the UE may process the data, such as a timing advance (TA) command, a UL grant, and a Temporary C-RNTI (TC-RNTI), in the RAR.

Figure 18A:
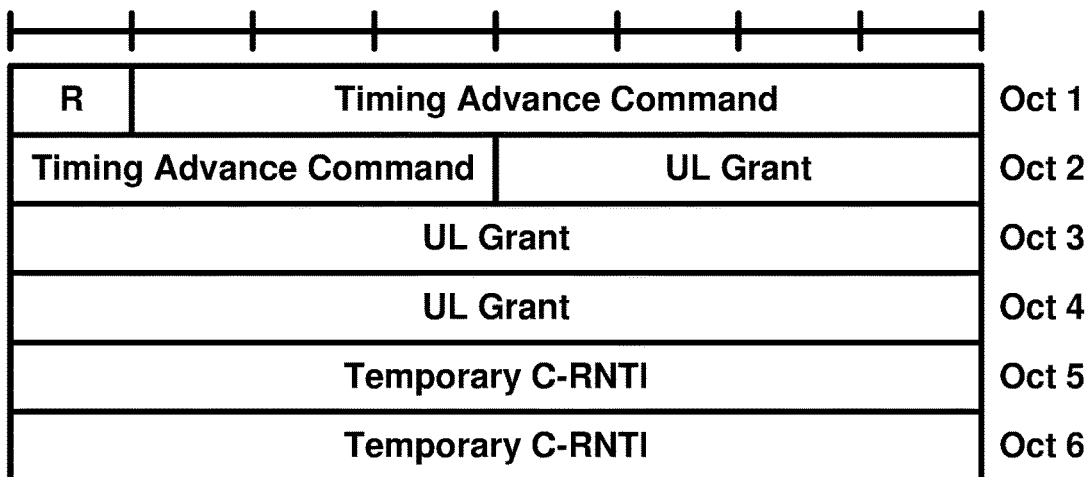
FIG. 18A, FIG. 18B and FIG. 18C are example diagrams of RAR MAC CEs as per an aspect of an embodiment of the present disclosure.
Figure 18B:
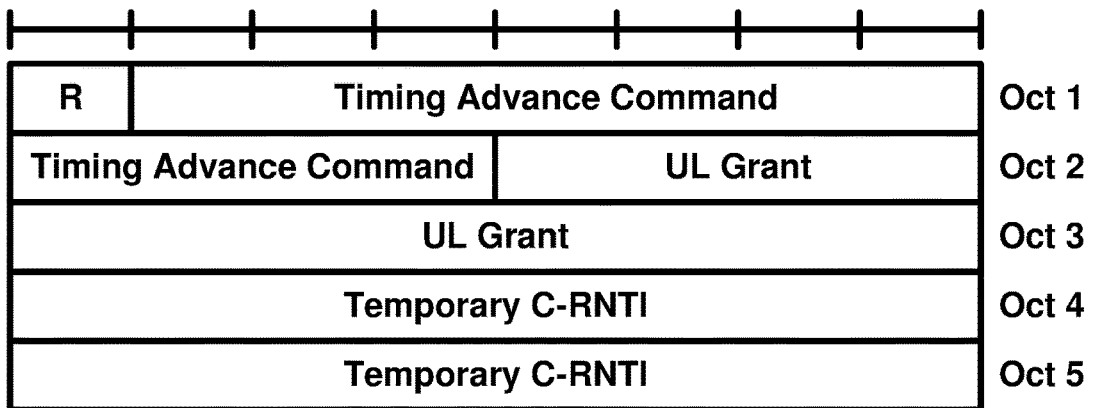
Figure 18C:
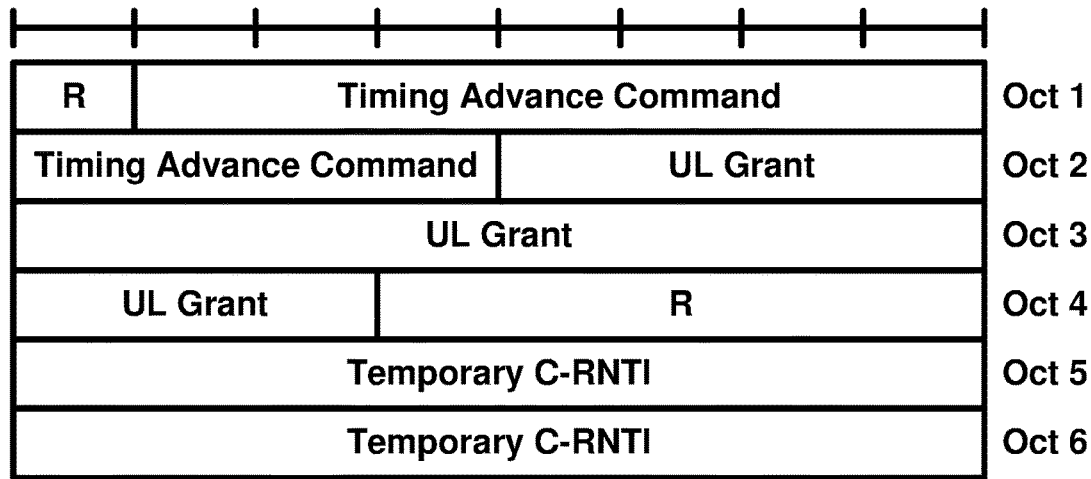

FIG. 18A, FIG. 18B and FIG. 18C show contents of a MAC RAR. Specifically, FIG. 18A shows the contents of a MAC RAR of a normal UE, FIG. 18B shows the contents of a MAC RAR of an MTC UE, and FIG. 18C shows the contents of MAC RAR of a NB-IOT UE.

In the third step of the four-step RA procedure, a UE may adjust UL time alignment by using the TA value corresponding to the TA command in the received RAR in the second step and may transmit the one or more TBs to a base station using the UL resources assigned in the UL grant in the received RAR. The TBs that a UE transmits in the third step may comprise RRC signaling, such as RRC connection request, RRC connection Re-establishment request, or RRC connection resume request, and a UE identity. The identity transmitted in the third step is used as part of the contention-resolution mechanism in the fourth step.

The fourth step in the four-step RA procedure may comprise a DL message for contention resolution. In an example, one or more UEs may perform simultaneous RA attempts selecting the same RAP in the first step and receive the same RAR with the same TC-RNTI in the second step. The contention resolution in the fourth step may be to ensure that a UE does not incorrectly use another UE Identity. The contention resolution mechanism may be based on either C-RNTI on PDCCH or UE Contention Resolution Identity on DL-SCH, depending on whether a UE has a C-RNTI or not. If a UE has C-RNTI, upon detection of C-RNTI on the PDCCH, the UE may determine the success of RA procedure. If a UE does not have C-RNTI pre-assigned, the UE may monitor DL-SCH associated with TC-RNTI that a base station transmits in a RAR of the second step and compare the identity in the data transmitted by the base station on DL-SCH in the fourth step with the identity that the UE transmits in the third step. If the two identities are identical, the UE may determine the success of RA procedure and promote the TC-RNTI to the C-RNTI.

The forth step in the four-step RA procedure may allow HARQ retransmission. A UE may start mac-ContentionResolutionTimer when the UE transmits one or more TBs to a base station in the third step and may restart mac-ContentionResolutionTimer at each HARQ retransmission. When a UE receives data on the DL resources identified by C-RNTI or TC-RNTI in the fourth step, the UE may stop the mac-ContentionResolutionTimer. If the UE does not detect the contention resolution identity that matches to the identity transmitted by the UE in the third step, the UE may determine the failure of RA procedure and discard the TC-RNTI. If mac-ContentionResolutionTimer expires, the UE may determine the failure of RA procedure and discard the TC-RNTI. If the contention resolution is failed, a UE may flush the HARQ buffer used for transmission of the MAC PDU and may restart the four-step RA procedure from the first step. The UE may delay the subsequent RAP transmission by the backoff time randomly selected according to a uniform distribution between 0 and the backoff parameter value corresponding the BI in the MAC PDU for RAR.

In a four-step RA procedure, the usage of the first two steps may be to obtain UL time alignment for a UE and obtain an uplink grant. The third and fourth steps may be used to setup RRC connections, and/or resolve contention from different UEs.

Figure 19:
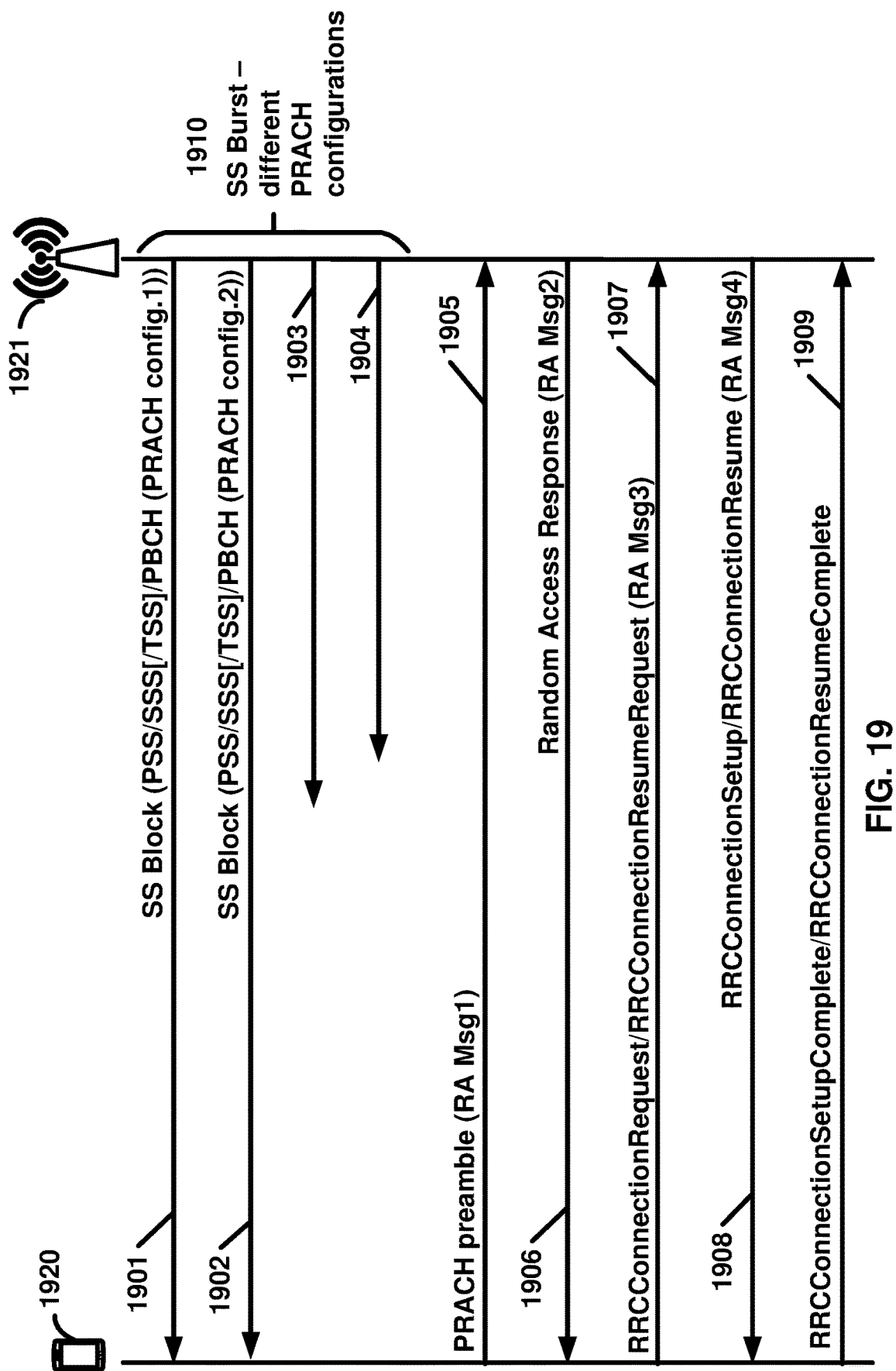
FIG. 19 is an example diagram for random access procedure when configured with multiple beams as per an aspect of an embodiment of the present disclosure.

FIG. 19 shows an example of a random access procedure (e.g., via a RACH) that may include sending, by a base station, one or more SS blocks. A wireless device 1920 (e.g., a UE) may transmit one or more preambles to a base station 1921 (e.g., a gNB in NR). Each preamble transmission by the wireless device may be associated with a separate random access procedure, such as shown in FIG. 19. The random access procedure may begin at step 1901 with a base station 1921 (e.g., a gNB in NR) sending a first SS block to a wireless device 1921 (e.g., a UE). Any of the SS blocks may comprise one or more of a PSS, SSS, tertiary synchronization signal (TSS), or PBCH signal. The first SS block in step 1901 may be associated with a first PRACH configuration. At step 1902, the base station 1921 may send to the wireless device 1920 a second SS block that may be associated with a second PRACH configuration. At step 1903, the base station 1921 may send to the wireless device 1920 a third SS block that may be associated with a third PRACH configuration. At step 1904, the base station 1921 may send to the wireless device 1920 a fourth SS block that may be associated with a fourth PRACH configuration. Any number of SS blocks may be sent in the same manner in addition to, or replacing, steps 1903 and 1904. An SS burst may comprise any number of SS blocks. For example, SS burst 1910 comprises the three SS blocks sent during steps 1902-1904.

The wireless device 1920 may send to the base station 1921 a preamble, at step 1905, e.g., after or in response to receiving one or more SS blocks or SS bursts. The preamble may comprise a PRACH preamble and may be referred to as RA Msg 1. The PRACH preamble may be transmitted in step 1905 according to or based on a PRACH configuration that may be received in an SS block (e.g., one of the SS blocks from steps 1901-1904) that may be determined to be the best SS block beam. The wireless device 1920 may determine a best SS block beam from among SS blocks it may receive prior to sending the PRACH preamble. The base station 1921 may send a random access response (RAR), which may be referred to as RA Msg2, at step 1906, e.g., after or in response to receiving the PRACH preamble. The RAR may be transmitted in step 1906 via a DL beam that corresponds to the SS block beam associated with the PRACH configuration. The base station 1921 may determine the best SS block beam from among SS blocks it previously sent prior to receiving the PRACH preamble. The base station 1621 may receive the PRACH preamble according to or based on the PRACH configuration associated with the best SS block beam.

The wireless device 1920 may send to the base station 1921 an RRCConnectionRequest and/or RRCConnectionResumeRequest message, which may be referred to as RA Msg3, at step 1907, e.g., after or in response to receiving the RAR. The base station 1921 may send to the wireless device 1920 an RRCConnectionSetup and/or RRCConnectionResume message, which may be referred to as RA Msg4, at step 1908, e.g., after or in response to receiving the RRCConnectionRequest and/or RRCConnectionResumeRequest message. The wireless device 1920 may send to the base station 1921 an RRCConnectionSetupComplete and/or RRCConnectionResumeComplete message, which may be referred to as RA Msg5, at step 1909, e.g., after or in response to receiving the RRCConnectionSetup and/or RRCConnectionResume. An RRC connection may be established between the wireless device 1920 and the base station 1921, and the random access procedure may end, e.g., after or in response to receiving the RRCConnectionSetupComplete and/or RRCConnectionResumeComplete message.

A best beam, including but not limited to a best SS block beam, may be determined based on a channel state information reference signal (CSI-RS). A wireless device may use a CSI-RS in a multi-beam system for estimating the beam quality of the links between the wireless device and a base station. For example, based on a measurement of a CSI-RS, a wireless device may report CSI for downlink channel adaption. A CSI parameter may include a precoding matrix index (PMI), a channel quality index (CQI) value, and/or a rank indicator (RI). A wireless device may report a beam index based on a reference signal received power (RSRP) measurement on a CSI-RS. The wireless device may report the beam index in a CSI resource indication (CRI) for downlink beam selection. A base station may transmit a CSI-RS via a CSI-RS resource, such as via one or more antenna ports, or via one or more time and/or frequency radio resources. A beam may be associated with a CSI-RS. A CSI-RS may comprise an indication of a beam direction. Each of a plurality of beams may be associated with one of a plurality of CSI-RSs. A CSI-RS resource may be configured in a cell-specific way, e.g., via common RRC signaling. Additionally or alternatively, a CSI-RS resource may be configured in a wireless device-specific way, e.g., via dedicated RRC signaling and/or layer 1 and/or layer 2 (L1/L2) signaling. Multiple wireless devices in or served by a cell may measure a cell-specific CSI-RS resource. A dedicated subset of wireless devices in or served by a cell may measure a wireless device-specific CSI-RS resource. A base station may transmit a CSI-RS resource periodically, using aperiodic transmission, or using a multi-shot or semi-persistent transmission. In a periodic transmission, a base station may transmit the configured CSI-RS resource using a configured periodicity in the time domain. In an aperiodic transmission, a base station may transmit the configured CSI-RS resource in a dedicated time slot. In a multi-shot or semi-persistent transmission, a base station may transmit the configured CSI-RS resource in a configured period. A base station may configure different CSI-RS resources in different terms for different purposes. Different terms may include, e.g., cell-specific, device-specific, periodic, aperiodic, multi-shot, or other terms. Different purposes may include, e.g., beam management, CQI reporting, or other purposes.

Figure 20:
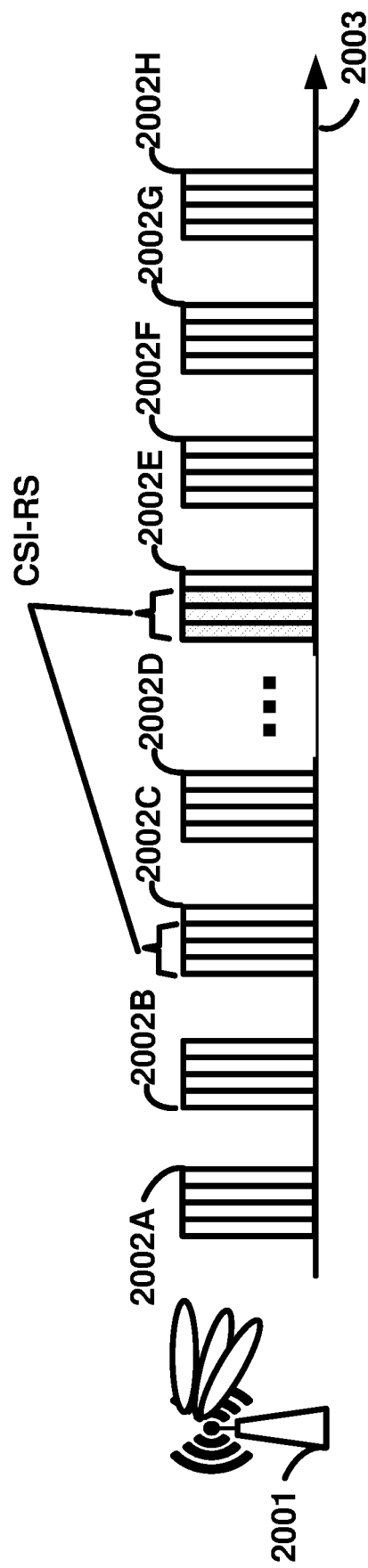
FIG. 20 is an example of channel state information reference signal transmissions when configured with multiple beams as per an aspect of an embodiment of the present disclosure.

FIG. 20 shows an example of transmitting CSI-RSs periodically for a beam. A base station 2001 may transmit a beam in a predefined order in the time domain, such as during time periods 2003. Beams used for a CSI-RS transmission, such as for CSI-RS 2004 in transmissions 2002C and/or 2003E, may have a different beam width relative to a beam width for SS-blocks transmission, such as for SS blocks 2002A, 2002B, 2002D, and 2002F-2002H. Additionally or alternatively, a beam width of a beam used for a CSI-RS transmission may have the same value as a beam width for an SS block. Some or all of one or more CSI-RSs may be included in one or more beams. An SS block may occupy a number of OFDM symbols (e.g., 4), and a number of subcarriers (e.g., 240), carrying a synchronization sequence signal. The synchronization sequence signal may identify a cell.

Figure 21:
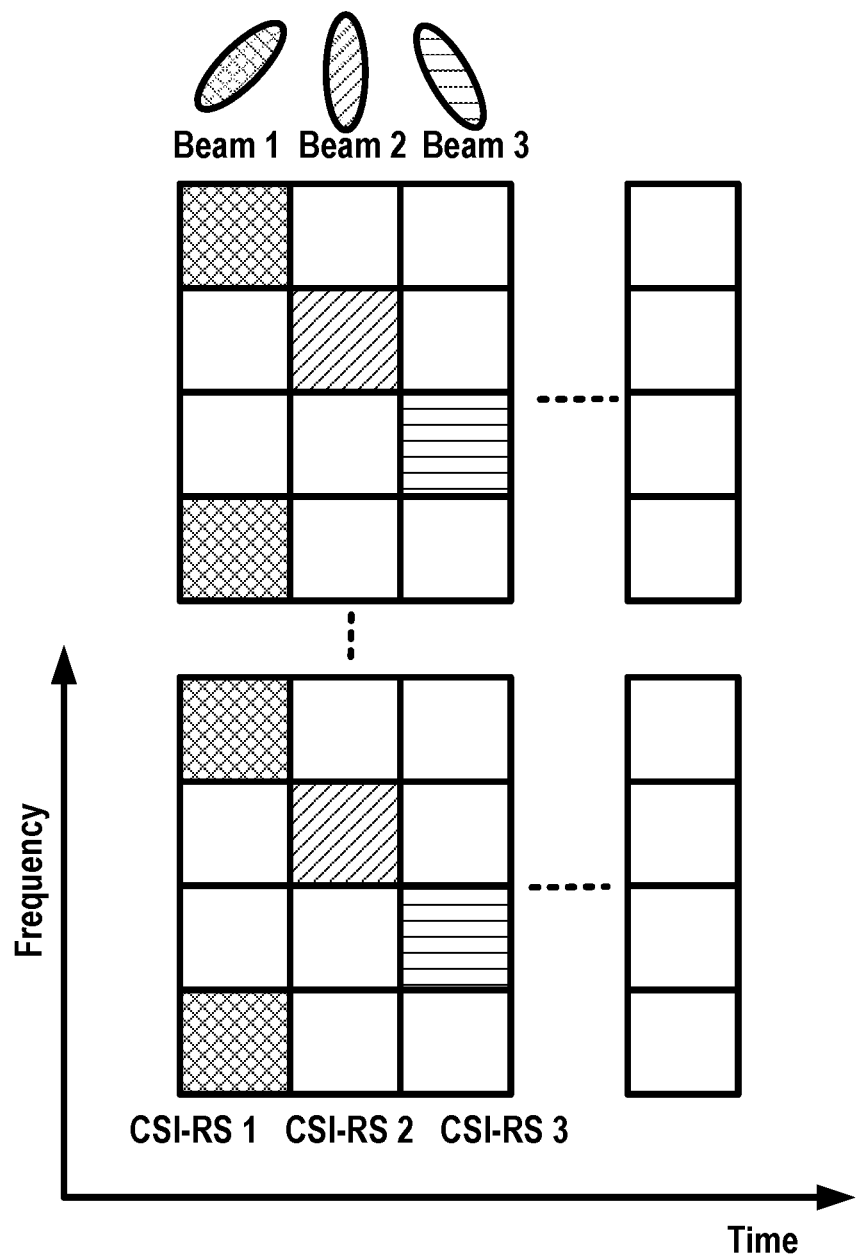
FIG. 21 is an example of channel state information reference signal transmissions when configured with multiple beams as per an aspect of an embodiment of the present disclosure.

FIG. 21 shows an example of a CSI-RS that may be mapped in time and frequency domains. Each square shown in FIG. 21 may represent a resource block within a bandwidth of a cell. Each resource block may comprise a number of subcarriers. A cell may have a bandwidth comprising a number of resource blocks. A base station (e.g., a gNB in NR) may transmit one or more Radio Resource Control (RRC) messages comprising CSI-RS resource configuration parameters for one or more CSI-RS. One or more of the following parameters may be configured by higher layer signaling for each CSI-RS resource configuration: CSI-RS resource configuration identity, number of CSI-RS ports, CSI-RS configuration (e.g., symbol and RE locations in a subframe), CSI-RS subframe configuration (e.g., subframe location, offset, and periodicity in a radio frame), CSI-RS power parameter, CSI-RS sequence parameter, CDM type parameter, frequency density, transmission comb, QCL parameters (e.g., QCL-scramblingidentity, crs-portscount, mbsfn-subframeconfiglist, csi-rs-configZPid, qcl-csi-rs-configNZPid), and/or other radio resource parameters.

FIG. 21 shows three beams that may be configured for a wireless device, e.g., in a wireless device-specific configuration. Any number of additional beams (e.g., represented by the column of blank squares) or fewer beams may be included. Beam 1 may be allocated with CSI-RS 1 that may be transmitted in some subcarriers in a resource block (RB) of a first symbol. Beam 2 may be allocated with CSI-RS 2 that may be transmitted in some subcarriers in an RB of a second symbol. Beam 3 may be allocated with CSI-RS 3 that may be transmitted in some subcarriers in an RB of a third symbol. All subcarriers in an RB may not necessarily be used for transmitting a particular CSI-RS (e.g., CSI-RS 1) on an associated beam (e.g., beam 1) for that CSI-RS. By using frequency division multiplexing (FDM), other subcarriers, not used for beam 1 for the wireless device in the same RB, may be used for other CSI-RS transmissions associated with a different beam for other wireless devices. Additionally or alternatively, by using time domain multiplexing (TDM), beams used for a wireless device may be configured such that different beams (e.g., beam 1, beam 2, and beam 3) for the wireless device may be transmitted using some symbols different from beams of other wireless devices.

Beam management may use a device-specific configured CSI-RS. In a beam management procedure, a wireless device may monitor a channel quality of a beam pair link comprising a transmitting beam by a base station (e.g., a gNB in NR) and a receiving beam by the wireless device (e.g., a UE). When multiple CSI-RSs associated with multiple beams are configured, a wireless device may monitor multiple beam pair links between the base station and the wireless device.

A wireless device may transmit one or more beam management reports to a base station. A beam management report may indicate one or more beam pair quality parameters, comprising, e.g., one or more beam identifications, RSRP, PMI, CQI, and/or RI, of a subset of configured beams.

Figure 23A:
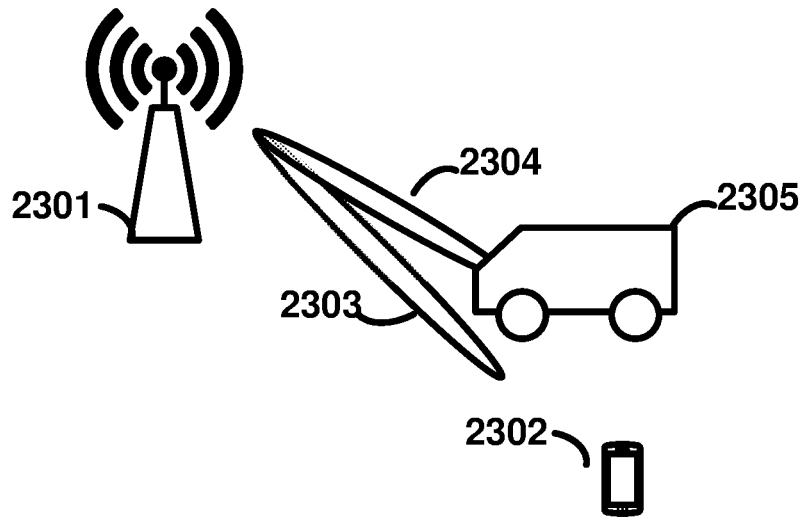
FIG. 23A is an example diagram for downlink beam failure scenario in a transmission receiving point (TRP) as per an aspect of an embodiment of the present disclosure.
Figure 23B:
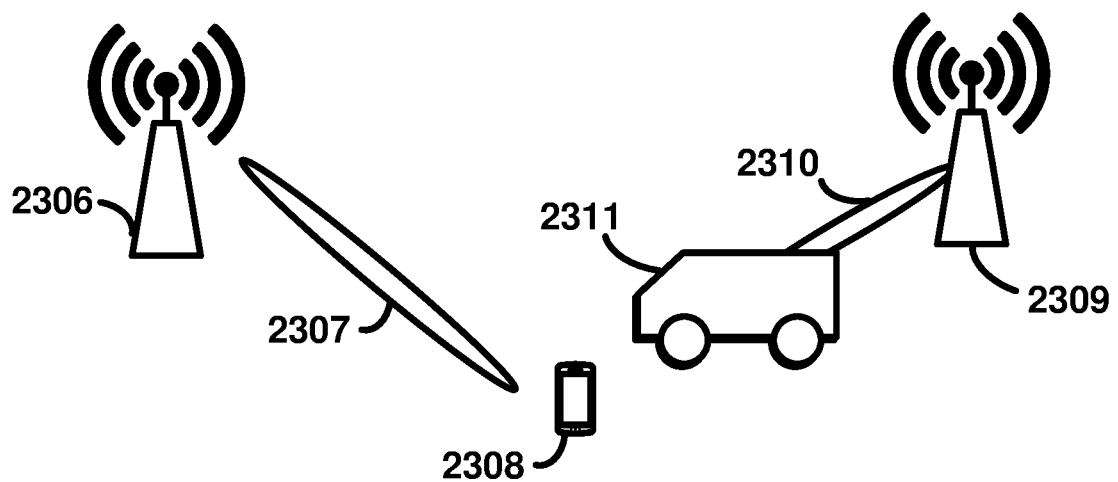
FIG. 23B is an example diagram for downlink beam failure scenario in multiple TRPs as per an aspect of an embodiment of the present disclosure.

A base station and/or a wireless device may perform a downlink L1/L2 beam management procedure. One or more downlink L1/L2 beam management procedures may be performed within one or multiple transmission and receiving points (TRPs), such as shown in FIG. 23A and FIG. 23B, respectively.

Figure 22:
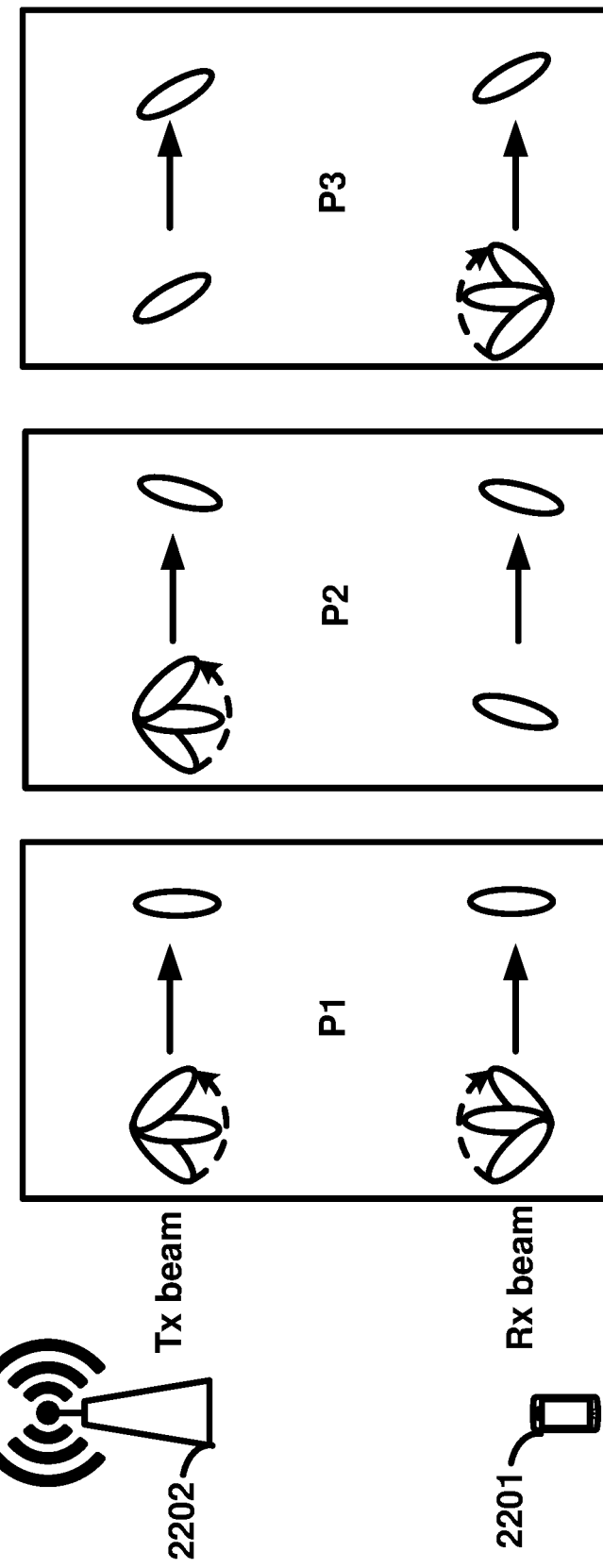
FIG. 22 is an example of various beam management procedures as per an aspect of an embodiment of the present disclosure.

FIG. 22 shows examples of three beam management procedures, P1, P2, and P3. Procedure P1 may be used to enable a wireless device measurement on different transmit (Tx) beams of a TRP (or multiple TRPs), e.g., to support a selection of Tx beams and/or wireless device receive (Rx) beam(s) (shown as ovals in the top row and bottom row, respectively, of P1). Beamforming at a TRP (or multiple TRPs) may include, e.g., an intra-TRP and/or inter-TRP Tx beam sweep from a set of different beams (shown, in the top rows of P1 and P2, as ovals rotated in a counter-clockwise direction indicated by the dashed arrow). Beamforming at a wireless device 2201, may include, e.g., a wireless device Rx beam sweep from a set of different beams (shown, in the bottom rows of P1 and P3, as ovals rotated in a clockwise direction indicated by the dashed arrow). Procedure P2 may be used to enable a wireless device measurement on different Tx beams of a TRP (or multiple TRPs) (shown, in the top row of P2, as ovals rotated in a counter-clockwise direction indicated by the dashed arrow), e.g., which may change inter-TRP and/or intra-TRP Tx beam(s). Procedure P2 may be performed, e.g., on a smaller set of beams for beam refinement than in procedure P1. P2 may be a particular example of P1. Procedure P3 may be used to enable a wireless device measurement on the same Tx beam (shown as oval in P3), e.g., to change a wireless device Rx beam if the wireless device 2201 uses beamforming.

A wireless device 2201 (e.g., a UE) and/or a base station 2202 (e.g., a gNB) may trigger a beam failure recovery mechanism. The wireless device 2201 may trigger a beam failure recovery (BFR) request transmission, e.g., if a beam failure event occurs. A beam failure event may include, e.g., a determination that a quality of beam pair link(s) of an associated control channel is unsatisfactory. A determination of an unsatisfactory quality of beam pair link(s) of an associated channel may be based on the quality falling below a threshold and/or an expiration of a timer.

The wireless device 2201 may measure a quality of beam pair link(s) using one or more reference signals (RS). One or more SS blocks, one or more CSI-RS resources, and/or one or more demodulation reference signals (DM-RSs) of a PBCH may be used as a RS for measuring a quality of a beam pair link. Each of the one or more CSI-RS resources may be associated with a CSI-RS resource index (CRI). A quality of a beam pair link may be based on one or more of an RSRP value, reference signal received quality (RSRQ) value, and/or CSI value measured on RS resources. The base station 2202 may indicate that an RS resource, e.g., that may be used for measuring a beam pair link quality, is quasi-co-located (QCLed) with one or more DM-RSs of a control channel. The RS resource and the DM-RSs of the control channel may be QCLed when the channel characteristics from a transmission via an RS to the wireless device 2201, and the channel characteristics from a transmission via a control channel to the wireless device, are similar or the same under a configured criterion.

FIG. 23A shows an example of a beam failure event involving a single TRP. A single TRP such as at a base station 2301 may transmit, to a wireless device 2302, a first beam 2303 and a second beam 2304. A beam failure event may occur if, e.g., a serving beam, such as the second beam 2304, is blocked by a moving vehicle 2305 or other obstruction (e.g., building, tree, land, or any object) and configured beams (e.g., the first beam 2303 and/or the second beam 2304), including the serving beam, are received from the single TRP. The wireless device 2302 may trigger a mechanism to recover from beam failure when a beam failure occurs.

FIG. 23B shows an example of a beam failure event involving multiple TRPs. Multiple TRPs, such as at a first base station 2306 and at a second base station 2309, may transmit, to a wireless device 2308, a first beam 2307 (e.g., from the first base station 2306) and a second beam 2310 (e.g., from the second base station 2309). A beam failure event may occur when, e.g., a serving beam, such as the second beam 2310, is blocked by a moving vehicle 2311 or other obstruction (e.g., building, tree, land, or any object) and configured beams (e.g., the first beam 2307 and/or the second beam 2310) are received from multiple TRPs. The wireless device 2008 may trigger a mechanism to recover from beam failure when a beam failure occurs.

A wireless device may monitor a PDCCH, such as a New Radio PDCCH (NR-PDCCH), on M beam pair links simultaneously, where M≥1 and the maximum value of M may depend at least on the wireless device capability. Such monitoring may increase robustness against beam pair link blocking. A base station may transmit, and the wireless device may receive, one or more messages configured to cause the wireless device to monitor NR-PDCCH on different beam pair link(s) and/or in different NR-PDCCH OFDM symbol.

A base station may transmit higher layer signaling, and/or a MAC control element (MAC CE), that may comprise parameters related to a wireless device Rx beam setting for monitoring NR-PDCCH on multiple beam pair links. A base station may transmit one or more indications of a spatial QCL assumption between a first DL RS antenna port(s) and a second DL RS antenna port(s). The first DL RS antenna port(s) may be for one or more of a cell-specific CSI-RS, device-specific CSI-RS, SS block, PBCH with DM-RSs of PBCH, and/or PBCH without DM-RSs of PBCH. The second DL RS antenna port(s) may be for demodulation of a DL control channel. Signaling for a beam indication for a NR-PDCCH (e.g., configuration to monitor NR-PDCCH) may be via MAC CE signaling, RRC signaling, DCI signaling, or specification-transparent and/or an implicit method, and any combination thereof.

For reception of unicast DL data channel, a base station may indicate spatial QCL parameters between DL RS antenna port(s) and DM-RS antenna port(s) of DL data channel. A base station may transmit DCI (e.g., downlink grants) comprising information indicating the RS antenna port(s). The information may indicate the RS antenna port(s) which may be QCLed with DM-RS antenna port(s). A different set of DM-RS antenna port(s) for the DL data channel may be indicated as a QCL with a different set of RS antenna port(s).

If a base station transmits a signal indicating a spatial QCL parameters between CSI-RS and DM-RS for PDCCH, a wireless device may use CSI-RSs QCLed with DM-RS for a PDCCH to monitor beam pair link quality. If a beam failure event occurs, the wireless device may transmit a beam failure recovery request, such as by a determined configuration.

If a wireless device transmits a beam failure recovery request, e.g., via an uplink physical channel or signal, a base station may detect that there is a beam failure event, for the wireless device, by monitoring the uplink physical channel or signal. The base station may initiate a beam recovery mechanism to recover the beam pair link for transmitting PDCCH between the base station and the wireless device. The base station may transmit one or more control signals, to the wireless device, e.g., after or in response to receiving the beam failure recovery request. A beam recovery mechanism may be, e.g., an L1 scheme, or a higher layer scheme.

A base station may transmit one or more messages comprising, e.g., configuration parameters of an uplink physical channel and/or a signal for transmitting a beam failure recovery request. The uplink physical channel and/or signal may be based on at least one of the following: a non-contention based PRACH (e.g., a beam failure recovery PRACH or BFR-PRACH), which may use a resource orthogonal to resources of other PRACH transmissions; a PUCCH (e.g., beam failure recovery PUCCH or BFR-PUCCH); and/or a contention-based PRACH resource. Combinations of these candidate signal and/or channels may be configured by a base station.

A gNB may respond a confirmation message to a UE after receiving one or multiple BFR request. The confirmation message may include the CRI associated with the candidate beam the UE indicates in the one or multiple BFR request. The confirmation message may be a L1 control information.

In carrier aggregation (CA), two or more component carriers (CCs) may be aggregated. A wireless device may simultaneously receive or transmit on one or more CCs, depending on capabilities of the wireless device, using the technique of CA. In an example, a wireless device may support CA for contiguous CCs and/or for non-contiguous CCs. CCs may be organized into cells. For example, CCs may be organized into one primary cell (PCell) and one or more secondary cells (SCells).

When configured with CA, a wireless device may have one RRC connection with a network. During an RRC connection establishment/re-establishment/handover, a cell providing NAS mobility information may be a serving cell. During an RRC connection re-establishment/handover procedure, a cell providing a security input may be a serving cell. In an example, the serving cell may denote a PCell. In an example, a gNB may transmit, to a wireless device, one or more messages comprising configuration parameters of a plurality of one or more SCells, depending on capabilities of the wireless device.

When configured with CA, a base station and/or a wireless device may employ an activation/deactivation mechanism of an SCell to improve battery or power consumption of the wireless device. When a wireless device is configured with one or more SCells, a gNB may activate or deactivate at least one of the one or more SCells. Upon configuration of an SCell, the SCell may be deactivated unless an SCell state associated with the SCell is set to "activated" or "dormant".

In an example, a wireless device may activate/deactivate an SCell in response to receiving an SCell Activation/Deactivation MAC CE.

In an example, a gNB may transmit, to a wireless device, one or more messages comprising an SCell timer (e.g., sCellDeactivationTimer). In an example, a wireless device may deactivate an SCell in response to an expiry of the SCell timer.

When a wireless device receives an SCell Activation/Deactivation MAC CE activating an SCell, the wireless device may activate the SCell. In response to the activating the SCell, the wireless device may perform operations comprising: SRS transmissions on the SCell; CQI/PMI/RI/CRI reporting for the SCell; PDCCH monitoring on the SCell; PDCCH monitoring for the SCell; and/or PUCCH transmissions on the SCell.

In an example, in response to the activating the SCell, the wireless device may start or restart a first SCell timer (e.g., sCellDeactivationTimer) associated with the SCell. The wireless device may start or restart the first SCell timer in the slot when the SCell Activation/Deactivation MAC CE activating the SCell has been received. In an example, in response to the activating the SCell, the wireless device may (re-)initialize one or more suspended configured uplink grants of a configured grant Type 1 associated with the SCell according to a stored configuration. In an example, in response to the activating the SCell, the wireless device may trigger PHR.

When a wireless device receives an SCell Activation/Deactivation MAC CE deactivating an activated SCell, the wireless device may deactivate the activated SCell. In an example, when a first SCell timer (e.g., sCellDeactivationTimer) associated with an activated SCell expires, the wireless device may deactivate the activated SCell. In response to the deactivating the activated SCell, the wireless device may stop the first SCell timer associated with the activated SCell. In an example, in response to the deactivating the activated SCell, the wireless device may clear one or more configured downlink assignments, and/or one or more configured uplink grants of a configured uplink grant Type 2 associated with the activated SCell. In an example, in response to the deactivating the activated SCell, the wireless device may: suspend one or more configured uplink grants of a configured uplink grant Type 1 associated with the activated SCell; and/or flush HARQ buffers associated with the activated SCell.

In an example, when an SCell is deactivated, a wireless device may not perform operations comprising: transmitting SRS on the SCell; reporting CQI/PMI/RI/CRI for the SCell; transmitting on UL-SCH on the SCell; transmitting on RACH on the SCell; monitoring at least one first PDCCH on the SCell; monitoring at least one second PDCCH for the SCell; and/or transmitting a PUCCH on the SCell.

In an example, when at least one first PDCCH on an activated SCell indicates an uplink grant or a downlink assignment, a wireless device may restart a first SCell timer (e.g., sCellDeactivationTimer) associated with the activated SCell. In an example, when at least one second PDCCH on a serving cell (e.g. a PCell or an SCell configured with PUCCH, i.e. PUCCH SCell) scheduling the activated SCell indicates an uplink grant or a downlink assignment for the activated SCell, a wireless device may restart the first SCell timer (e.g., sCellDeactivationTimer) associated with the activated SCell.

In an example, when an SCell is deactivated, if there is an ongoing random access procedure on the SCell, a wireless device may abort the ongoing random access procedure on the SCell.

Figure 24A:
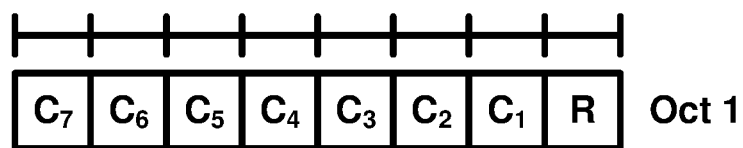
FIG. 24A is an example diagram for a secondary activation/deactivation medium access control control element (MAC CE) as per an aspect of an embodiment of the present disclosure.

FIG. 24A shows an example of an SCell Activation/Deactivation MAC CE of one octet. A first MAC PDU subheader with a first LCID (e.g., '111010') may identify the SCell Activation/Deactivation MAC CE of one octet. The SCell Activation/Deactivation MAC CE of one octet may have a fixed size. The SCell Activation/Deactivation MAC CE of one octet may comprise a single octet. The single octet may comprise a first number of C-fields (e.g. seven) and a second number of R-fields (e.g., one).

Figure 24B:
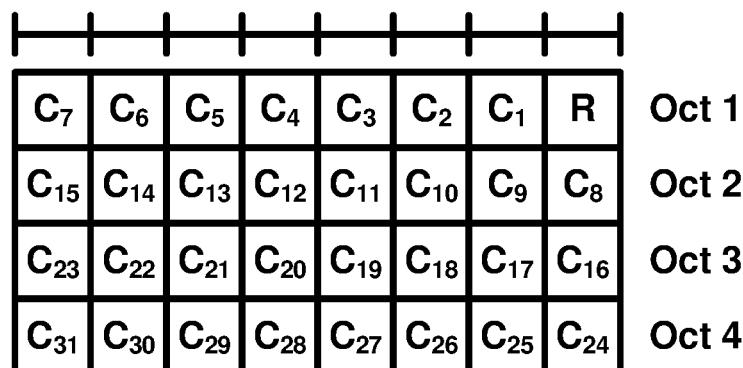
FIG. 24B is an example diagram for a secondary activation/deactivation MAC CE as per an aspect of an embodiment of the present disclosure.

FIG. 24B shows an example of an SCell Activation/Deactivation MAC CE of four octets. A second MAC PDU subheader with a second LCID (e.g., '111001') may identify the SCell Activation/Deactivation MAC CE of four octets. The SCell Activation/Deactivation MAC CE of four octets may have a fixed size. The SCell Activation/Deactivation MAC CE of four octets may comprise four octets. The four octets may comprise a third number of C-fields (e.g., 31) and a fourth number of R-fields (e.g., 1).

In FIG. 24A and/or FIG. 24B, a $C_i$ field may indicate an activation/deactivation status of an SCell with an SCell index i if an SCell with SCell index i is configured. In an example, when the $C_i$ field is set to one, an SCell with an SCell index i may be activated. In an example, when the $C_i$ field is set to zero, an SCell with an SCell index i may be deactivated. In an example, if there is no SCell configured with SCell index i, the wireless device may ignore the $C_i$ field. In FIG. 24A and FIG. 24B, an R field may indicate a reserved bit. The R field may be set to zero.

FIG. 25A and FIG. 25B show timeline when a UE receives a MAC activation command. When a UE receives a MAC activation command for a secondary cell in subframe n, the corresponding actions in the MAC layer shall be applied no later than the minimum requirement defined in 3GPP TS 36.133 or TS 38.133 and no earlier than subframe n+8, except for the following: the actions related to CSI reporting and the actions related to the sCellDeactivationTimer associated with the secondary cell, which shall be applied in subframe n+8. When a UE receives a MAC deactivation command for a secondary cell or the sCellDeactivationTimer associated with the secondary cell expires in subframe n, the corresponding actions in the MAC layer shall apply no later than the minimum requirement defined in 3GPP TS 36.133 or TS 38.133, except for the actions related to CSI reporting which shall be applied in subframe n+8.

When a UE receives a MAC activation command for a secondary cell in subframe n, the actions related to CSI reporting and the actions related to the sCellDeactivationTimer associated with the secondary cell, are applied in subframe n+8. When a UE receives a MAC deactivation command for a secondary cell or other deactivation conditions are met (e.g. the sCellDeactivationTimer associated with the secondary cell expires) in subframe n, the actions related to CSI reporting are applied in subframe n+8. The UE starts reporting invalid or valid CSI for the SCell at the $(n+8)^{th}$ subframe, and start or restart the sCellDeactivationTimer when receiving the MAC CE activating the SCell in the $n^{th}$ subframe. For some UE having slow activation, it may report an invalid CSI (out-of-range CSI) at the $(n+8)^{th}$ subframe, for some UE having a quick activation, it may report a valid CSI at the $(n+8)^{th}$ subframe.

When a UE receives a MAC activation command for an SCell in subframe n, the UE starts reporting CQI/PMI/RI/PTI for the SCell at subframe n+8 and starts or restarts the sCellDeactivationTimer associated with the SCell at subframe n+8. It is important to define the timing of these actions for both UE and eNB. For example, sCellDeactivationTimer is maintained in both eNB and UE and it is important that both UE and eNB stop, start and/or restart this timer in the same TTI. Otherwise, the sCellDeactivationTimer in the UE may not be in-sync with the corresponding sCellDeactivationTimer in the eNB. Also, eNB starts monitoring and receiving CSI (CQI/PMI/RI/PTI) according to the predefined timing in the same TTI and/or after UE starts transmitting the CSI. If the CSI timings in UE and eNB are not coordinated based on a common standard or air interface signaling the network operation may result in inefficient operations and/or errors.

FIG. 26 shows DCI formats for an example of 20 MHz FDD operation with 2 Tx antennas at the base station and no carrier aggregation in an LTE system. In a NR system, the DCI formats may comprise at least one of: DCI format 0_0/0_1 indicating scheduling of PUSCH in a cell; DCI format 1_0/1_1 indicating scheduling of PDSCH in a cell; DCI format 2_0 notifying a group of UEs of slot format; DCI format 2_1 notifying a group of UEs of PRB(s) and OFDM symbol(s) where a UE may assume no transmission is intended for the UE; DCI format 2_2 indicating transmission of TPC commands for PUCCH and PUSCH; and/or DCI format 2_3 indicating transmission of a group of TPC commands for SRS transmission by one or more UEs. In an example, a gNB may transmit a DCI via a PDCCH for scheduling decision and power-control commends. More specifically, the DCI may comprise at least one of: downlink scheduling assignments, uplink scheduling grants, power-control commands. The downlink scheduling assignments may comprise at least one of: PDSCH resource indication, transport format, HARQ information, and control information related to multiple antenna schemes, a command for power control of the PUCCH used for transmission of ACK/NACK in response to downlink scheduling assignments. The uplink scheduling grants may comprise at least one of: PUSCH resource indication, transport format, and HARQ related information, a power control command of the PUSCH.

In an example, different types of control information may correspond to different DCI message sizes. For example, supporting spatial multiplexing with noncontiguous allocation of RBs in the frequency domain may require a larger scheduling message in comparison with an uplink grant allowing for frequency-contiguous allocation only. DCIs may be categorized into different DCI formats, where a format corresponds to a certain message size and usage.

In an example, a UE may monitor one or more PDCCH to detect one or more DCI with one or more DCI format. The one or more PDCCH may be transmitted in common search space or UE-specific search space. A UE may monitor PDCCH with only a limited set of DCI format, to save power consumption. For example, a normal UE may not be required to detect a DCI with DCI format 6 which is used for an eMTC UE. The more DCI format to be detected, the more power be consumed at the UE.

In an example, a UE may monitor one or more PDCCH candidates to detect one or more DCI with one or more DCI format. The one or more PDCCH may be transmitted in common search space or UE-specific search space. A UE may monitor PDCCH with only a limited set of DCI format, to save power consumption. For example, a normal UE may not be required to detect a DCI with DCI format 6 which is used for an eMTC UE. The more DCI format to be detected, the more power be consumed at the UE.

In an example, the one or more PDCCH candidates that a UE monitors may be defined in terms of PDCCH UE-specific search spaces. A PDCCH UE-specific search space at CCE aggregation level $L \in \{1, 2, 4, 8\}$ may be defined by a set of PDCCH candidates for CCE aggregation level L. In an example, for a DCI format, a UE may be configured per serving cell by one or more higher layer parameters a number of PDCCH candidates per CCE aggregation level L.

In an example, in non-DRX mode operation, a UE may monitor one or more PDCCH candidate in control resource set q according to a periodicity of $W_{PDCCH, q}$ symbols that may be configured by one or more higher layer parameters for control resource set q.

In an example, if a UE is configured with higher layer parameter, e.g., cif-InSchedulingCell, the carrier indicator field value may correspond to cif-InSchedulingCell.

In an example, for the serving cell on which a UE may monitor one or more PDCCH candidate in a UE-specific search space, if the UE is not configured with a carrier indicator field, the UE may monitor the one or more PDCCH candidates without carrier indicator field. In an example, for the serving cell on which a UE may monitor one or more PDCCH candidates in a UE-specific search space, if a UE is configured with a carrier indicator field, the UE may monitor the one or more PDCCH candidates with carrier indicator field.

In an example, a UE may not monitor one or more PDCCH candidates on a secondary cell if the UE is configured to monitor one or more PDCCH candidates with carrier indicator field corresponding to that secondary cell in another serving cell. For example, for the serving cell on which the UE may monitor one or more PDCCH candidates, the UE may monitor the one or more PDCCH candidates at least for the same serving cell.

In an example, the information in the DCI formats used for downlink scheduling can be organized into different groups, with the field present varying between the DCI formats, including at least one of: resource information, consisting of: carrier indicator (0 or 3 bits), RB allocation; HARQ process number; MCS, NDI, and RV (for the first TB); MCS, NDI and RV (for the second TB); MIMO related information; PDSCH resource-element mapping and QCI; Downlink assignment index (DAI); TPC for PUCCH; SRS request (1 bit), triggering one-shot SRS transmission; ACK/NACK offset; DCI format 0/1A indication, used to differentiate between DCI format 1A and 0; and padding if necessary. The MIMO related information may comprise at least one of: PMI, precoding information, transport block swap flag, power offset between PDSCH and reference signal, reference-signal scrambling sequence, number of layers, and/or antenna ports for the transmission.

In an example, the information in the DCI formats used for uplink scheduling can be organized into different groups, with the field present varying between the DCI formats, including at least one of: resource information, consisting of: carrier indicator, resource allocation type, RB allocation; MCS, NDI (for the first TB); MCS, NDI (for the second TB); phase rotation of the uplink DMRS; precoding information; CSI request, requesting an aperiodic CSI report; SRS request (2 bit), used to trigger aperiodic SRS transmission using one of up to three preconfigured settings; uplink index/DAI; TPC for PUSCH; DCI format 0/1A indication; and padding if necessary.

In an example, a gNB may perform CRC scrambling for a DCI, before transmitting the DCI via a PDCCH. The gNB may perform CRC scrambling by bit-wise addition (or Modulo-2 addition or exclusive OR (XOR) operation) of multiple bits of at least one wireless device identifier (e.g., C-RNTI, CS-RNTI, TPC-CS-RNTI, TPC-PUCCH-RNTI, TPC-PUSCH-RNTI, SP CSI C-RNTI, SRS-TPC-RNTI, INT-RNTI, SFI-RNTI, P-RNTI, SI-RNTI, RA-RNTI, and/or MCS-C-RNTI) with the CRC bits of the DCI. The wireless device may check the CRC bits of the DCI, when detecting the DCI. The wireless device may receive the DCI when the CRC is scrambled by a sequence of bits that is the same as the at least one wireless device identifier.

In a NR system, in order to support wide bandwidth operation, a gNB may transmit one or more PDCCH in different control resource sets. A gNB may transmit one or more RRC message comprising configuration parameters of one or more control resource sets. At least one of the one or more control resource sets may comprise at least one of: a first OFDM symbol; a number of consecutive OFDM symbols; a set of resource blocks; a CCE-to-REG mapping; and a REG bundle size, in case of interleaved CCE-to-REG mapping.

In an example, a wireless device may transmit one or more uplink control information (UCI) via one or more PUCCH resources to a base station. The one or more UCI may comprise at least one of: HARQ-ACK information; scheduling request (SR); and/or CSI report. In an example, a PUCCH resource may be identified by at least: frequency location (e.g., starting PRB); and/or a PUCCH format associated with initial cyclic shift of a base sequence and time domain location (e.g., starting symbol index). In an example, a PUCCH format may be PUCCH format 0, PUCCH format 1, PUCCH format 2, PUCCH format 3, or PUCCH format 4. A PUCCH format 0 may have a length of 1 or 2 OFDM symbols and be less than or equal to 2 bits. A PUCCH format 1 may occupy a number between 4 and 14 of OFDM symbols and be less than or equal to 2 bits. A PUCCH format 2 may occupy 1 or 2 OFDM symbols and be greater than 2 bits. A PUCCH format 3 may occupy a number between 4 and 14 of OFDM symbols and be greater than 2 bits. A PUCCH format 4 may occupy a number between 4 and 14 of OFDM symbols and be greater than 2 bits. The PUCCH resource may be configured on a PCell, or a PUCCH secondary cell.

In an example, when configured with multiple uplink BWPs, a base station may transmit to a wireless device, one or more RRC messages comprising configuration parameters of one or more PUCCH resource sets (e.g., at most 4 sets) on an uplink BWP of the multiple uplink BWPs. Each PUCCH resource set may be configured with a PUCCH resource set index, a list of PUCCH resources with each PUCCH resource being identified by a PUCCH resource identifier (e.g., pucch-Resourceid), and/or a maximum number of UCI information bits a wireless device may transmit using one of the plurality of PUCCH resources in the PUCCH resource set.

In an example, when configured with one or more PUCCH resource sets, a wireless device may select one of the one or more PUCCH resource sets based on a total bit length of UCI information bits (e.g., HARQ-ARQ bits, SR, and/or CSI) the wireless device will transmit. In an example, when the total bit length of UCI information bits is less than or equal to 2, the wireless device may select a first PUCCH resource set with the PUCCH resource set index equal to "0". In an example, when the total bit length of UCI information bits is greater than 2 and less than or equal to a first configured value, the wireless device may select a second PUCCH resource set with the PUCCH resource set index equal to "1". In an example, when the total bit length of UCI information bits is greater than the first configured value and less than or equal to a second configured value, the wireless device may select a third PUCCH resource set with the PUCCH resource set index equal to "2". In an example, when the total bit length of UCI information bits is greater than the second configured value and less than or equal to a third value (e.g., 1706), the wireless device may select a fourth PUCCH resource set with the PUCCH resource set index equal to "3".

In an example, a wireless device may determine, based on a number of uplink symbols of UCI transmission and a number of UCI bits, a PUCCH format from a plurality of PUCCH formats comprising PUCCH format 0, PUCCH format 1, PUCCH format 2, PUCCH format 3 and/or PUCCH format 4. In an example, the wireless device may transmit UCI in a PUCCH using PUCCH format 0 if the transmission is over 1 symbol or 2 symbols and the number of HARQ-ACK information bits with positive or negative SR (HARQ-ACK/SR bits) is 1 or 2. In an example, the wireless device may transmit UCI in a PUCCH using PUCCH format 1 if the transmission is over 4 or more symbols and the number of HARQ-ACK/SR bits is 1 or 2. In an example, the wireless device may transmit UCI in a PUCCH using PUCCH format 2 if the transmission is over 1 symbol or 2 symbols and the number of UCI bits is more than 2. In an example, the wireless device may transmit UCI in a PUCCH using PUCCH format 3 if the transmission is over 4 or more symbols, the number of UCI bits is more than 2 and PUCCH resource does not include an orthogonal cover code. In an example, the wireless device may transmit UCI in a PUCCH using PUCCH format 4 if the transmission is over 4 or more symbols, the number of UCI bits is more than 2 and the PUCCH resource includes an orthogonal cover code.

In an example, in order to transmit HARQ-ACK information on a PUCCH resource, a wireless device may determine the PUCCH resource from a PUCCH resource set. The PUCCH resource set may be determined as mentioned above. The wireless device may determine the PUCCH resource based on a PUCCH resource indicator field in a DCI (e.g., with a DCI format 1_0 or DCI for 1_1) received on a PDCCH. A 3-bit PUCCH resource indicator field in the DCI may indicate one of eight PUCCH resources in the PUCCH resource set. The wireless device may transmit the HARQ-ACK information in a PUCCH resource indicated by the 3-bit PUCCH resource indicator field in the DCI.

In an example, the wireless device may transmit one or more UCI bits via a PUCCH resource of an active uplink BWP of a PCell or a PUCCH secondary cell. Since at most one active uplink BWP in a cell is supported for a wireless device, the PUCCH resource indicated in the DCI is naturally a PUCCH resource on the active uplink BWP of the cell.

Figure 27:
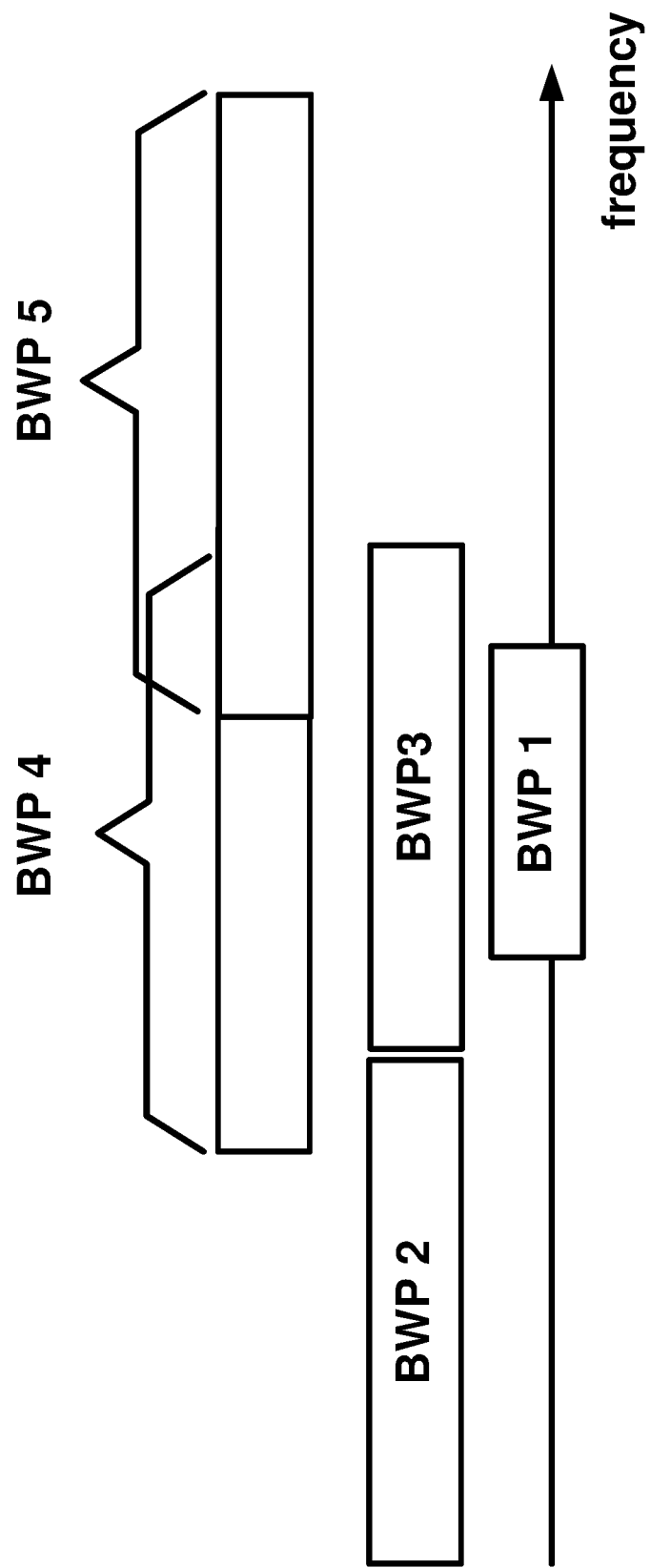
FIG. 27 is an example diagram for bandwidth part (BWP) configurations as per an aspect of an embodiment of the present disclosure.

FIG. 27 shows example of multiple BWPs configuration. A gNB may transmit one or more messages comprising configuration parameters of one or more bandwidth parts (BWP) of a cell. The cell may be a PCell or a SCell. The one or more messages may comprise: RRC connection reconfiguration message (e.g., RRCReconfiguration); RRC connection reestablishment message (e.g., RRCRestablishment); and/or RRC connection setup message (e.g., RRCSetup). The one or more BWPs may have different numerologies. A gNB may transmit one or more control information for cross-BWP scheduling to a UE. One BWP may overlap with another BWP in frequency domain.

In an example, a gNB may transmit one or more messages comprising configuration parameters of one or more DL and/or UL BWPs for a cell, with at least one BWP as the active DL or UL BWP, and zero or one BWP as the default DL or UL BWP. For the PCell, the active DL BWP may be the DL BWP on which the UE may monitor one or more PDCCH, and/or receive PDSCH. The active UL BWP is the UL BWP on which the UE may transmit uplink signal. For a secondary cell (SCell) if configured, the active DL BWP may be the DL BWP on which the UE may monitor one or more PDCCH and receive PDSCH when the SCell is activated by receiving a MAC activation/deactivation CE. The active UL BWP is the UL BWP on which the UE may transmit PUCCH (if configured) and/or PUSCH when the SCell is activated by receiving a MAC activation/deactivation CE. Configuration of multiple BWPs may be used to save UE's power consumption. When configured with an active BWP and a default BWP, a UE may switch to the default BWP if there is no activity on the active BWP. For example, a default BWP may be configured with narrow bandwidth, an active BWP may be configured with wide bandwidth. If there is no signal transmitting or receiving, the UE may switch the BWP to the default BWP, which may reduce power consumption.

In an example, for each DL BWP or UL BWP in a set of DL BWPs or UL BWPs, respectively, the wireless device may be configured the following parameters for the serving cell: a subcarrier spacing provided by a higher layer parameter (e.g., subcarrierSpacing); a cyclic prefix provided by a higher layer parameter (e.g., cyclicPrefix); a first PRB and a number of contiguous PRBs indicated by a higher layer parameter (e.g., locationAndBandwidth) that is interpreted as RIV, and the first PRB is a PRB offset relative to the PRB indicated by higher layer parameters (e.g., offsetToCarrier and subcarrierSpacing); an index in the set of DL BWPs or UL BWPs by respective a higher layer parameter (e.g., bwp-Id); a set of BWP-common and a set of BWP-dedicated parameters by higher layer parameters (e.g., bwp-Common and bwp-Dedicated).

In an example, switching BWP may be triggered by a DCI or a timer. When a UE receives a DCI indicating DL BWP switching from an active BWP to a new BWP, the UE may monitor PDCCH and/or receive PDSCH on the new BWP. When the UE receives a DCI indicating UL BWP switching from an active BWP to a new BWP, the UE may transmit PUCCH (if configured) and/or PUSCH on the new BWP. A gNB may transmit one or more messages comprising a BWP inactivity timer to a UE. The UE starts the timer when it switches its active DL BWP to a DL BWP other than the default DL BWP. The UE may restart the timer to the initial value when it successfully decodes a DCI to schedule PDSCH(s) in its active DL BWP. The UE may switch its active DL BWP to the default DL BWP when the BWP timer expires.

In an example, a BWP may be configured with: a subcarrier spacing, a cyclic prefix, a number of contiguous PRBs, an offset of the first PRB in the number of contiguous PRBs relative to the first PRB, or Q control resource sets if the BWP is a DL BWP.

In an example, on a SCell, there may be no initial active BWP since the initial access is performed on the PCell. For example, the initially activated DL BWP and/or UL BWP, when the SCell is activated, may be configured or reconfigured by RRC signaling. In an example, the default BWP of the SCell may also be configured or reconfigured by RRC signaling.

In an example, gNB may configure UE-specific default DL BWP other than initial active BWP after RRC connection, e.g., for the purpose of load balancing. The default BWP may support other connected mode operations (besides operations supported by initial active BWP), e.g., fall back and/or connected mode paging. In this case, the default BWP may comprise common search space, e.g., at least a search space needed for monitoring a pre-emption indication.

In an example, a DL BWP other than the initial active DL BWP may be configured to a UE as the default DL BWP. The reconfiguring the default DL BWP may be due to load balancing and/or different numerologies employed for active DL BWP and initial active DL BWP.

In an example, for a paired spectrum, DL and UL BWPs may be independently activated while, for an unpaired spectrum DL and UL BWPS are jointly activated. In case of bandwidth adaptation, where the bandwidth of the active downlink BWP may be changed, there may, in case of an unpaired spectrum, be a joint activation of a new downlink BWP and new uplink BWP. For example, a new DL/UL BWP pair where the bandwidth of the uplink BWPs may be the same (e.g., no change of uplink BWP).

In an example embodiment, making an association between DL BWP and UL BWP may allow that one activation/deactivation command may switch both DL and UL BWPs at once. Otherwise, separate BWP switching commands may be necessary.

In an example, PUCCH resources may be configured in a configured UL BWP, in a default UL BWP and/or in both. For instance, if the PUCCH resources are configured in the default UL BWP, UE may retune to the default UL BWP for transmitting an SR. for example, the PUCCH resources are configured per BWP or a BWP other than the default BWP, the UE may transmit an SR in the current active BWP without retuning.

In an example, there may be at most one active DL BWP and at most one active UL BWP at a given time for a serving cell. A BWP of a cell may be configured with a specific numerology/TTI. In an example, a logical channel and/or logical channel group that triggers SR transmission while the wireless device operates in one active BWP, the corresponding SR may remain triggered in response to BWP switching.

In an example, when a new BWP is activated, a configured downlink assignment may be initialized (if not active) or re-initialized (if already active) using PDCCH. In an example, via one or more RRC messages/signaling, a wireless device may be configured with at least one UL BWP, at least one DL BWP, and one or more configured grants for a cell. The one or more configured grants may be semi-persistent scheduling (SPS), Type 1 grant-free (GF) transmission/scheduling, and/or Type 2 GF transmission/scheduling. In an example, one or more configured grants may be configured per UL BWP. For example, one or more radio resources associated with one or more configured grants may not be defined/assigned/allocated across two or more UL BWPs.

In an example, an BWP may be in active during a period of time when a BWP inactivity timer is running. For example, a base station may transmit a control message to a wireless device to configure a first timer value of an BWP inactivity timer. The first timer value may determine how long a BWP inactivity timer runs, e.g., a period of time that a BWP inactivity timer runs. For example, the BWP inactivity timer may be implemented as a count-down timer from a first timer value down to a value (e.g., zero). In an example embodiment, the BWP inactivity timer may be implemented as a count-up timer from a value (e.g., zero) up to a first timer value down. In an example embodiment, the BWP inactivity timer may be implemented as a down-counter from a first timer value down to a value (e.g., zero). In an example embodiment, the BWP inactivity timer may be implemented as a count-up counter from a value (e.g., zero) up to a first timer value down. For example, a wireless device may restart a BWP inactivity timer (e.g., UL BWP and/or DL BWP inactivity timers) when the wireless device receives (and/or decodes) a DCI to schedule PDSCH(s) in its active BWP (e.g., its active UL BWP, its active DL BWP, and/or UL/DL BWP pair).

Figure 28:
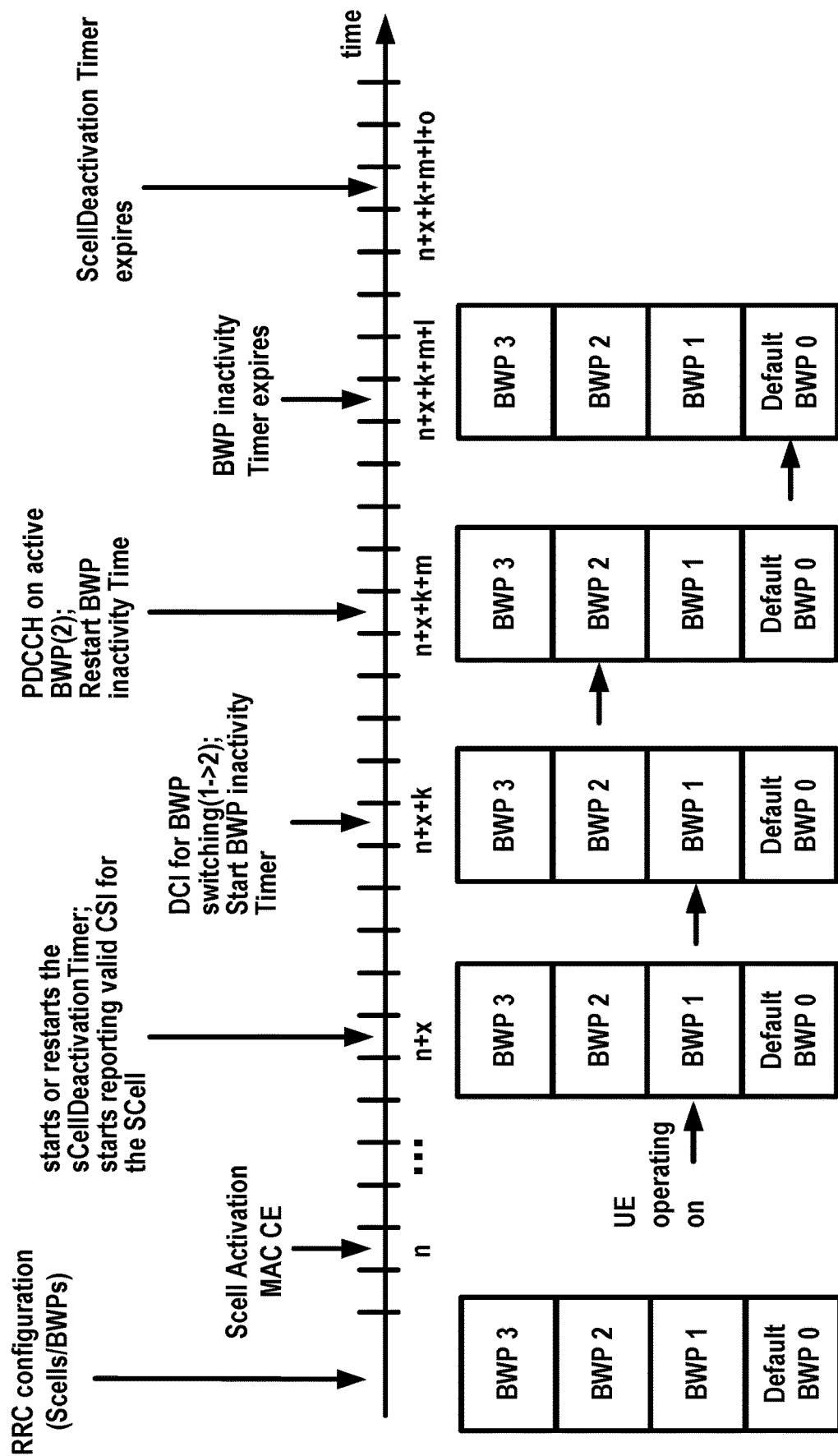
FIG. 28 is an example diagram for BWP operation in a secondary cell as per an aspect of an embodiment of the present disclosure.

FIG. 28 shows example of BWP switching mechanism. A UE may receive RRC message comprising parameters of a SCell and one or more BWP configuration associated with the SCell. Among the one or more BWPs, at least one BWP may be configured as the first active BWP (e.g., BWP 1 in FIG. 28), one BWP as the default BWP (e.g., BWP 0 in FIG. 28). The UE may receive a MAC CE to activate the SCell at the $n^{th}$ slot. The UE may start the sCellDeactivationTimer, and start CSI related actions for the SCell, and/or start CSI related actions for the first active BWP of the SCell at the $(n+x)^{th}$ slot. The UE may start the BWP inactivity timer at the $(n+x+k)^{th}$ slot in response to receiving a DCI indicating switching BWP from BWP 1 to BWP 2. When receiving a PDCCH indicating DL scheduling on BWP 2, for example, at the $(n+x+k+m)^{th}$ slot, the UE may restart the BWP inactivity timer. The UE may switch back to the default BWP (e.g., BWP 0) as an active BWP when the BWP inactivity timer expires, at the $(n+x+k+m+1)^{th}$ slot. The UE may deactivate the SCell when the sCellDeactivationTimer expires.

In an example, a BWP inactivity timer may be applied in a PCell. A base station may transmit one or more RRC messages comprising a BWP inactivity timer to a wireless device. The wireless device may start the BWP inactivity timer if the wireless devices switches its active DL BWP to a DL BWP other than the default DL BWP on the PCell. The wireless device may restart the BWP inactivity timer if it successfully decodes a DCI to schedule PDSCH(s) in its active DL BWP. The wireless device may switch its active DL BWP to the default DL BWP if the BWP inactivity timer expires.

In an example, employing the BWP inactivity timer may reduce UE's power consumption when the UE is configured with multiple BWPs on a cell (a PCell or a SCell). The UE may switch to a default BWP on the PCell or SCell when there is no activity on an active BWP (e.g., when the BWP inactivity timer expires).

In an example, a gNB may transmit one or more RRC message comprising one or more CSI configuration parameters comprising at least: one or more CSI-RS resource settings; one or more CSI reporting settings, and one CSI measurement setting.

In an example, a CSI-RS resource setting may comprise one or more CSI-RS resource sets. In an example, there may be one CSI-RS resource set for periodic CSI-RS, or semi-persistent (SP) CSI-RS. In an example, a CSI-RS resource set may comprise at least one of: one CSI-RS type (e.g., periodic, aperiodic, or semi-persistent); one or more CSI-RS resources comprising at least one of: CSI-RS resource configuration identity (or index); number of CSI-RS ports; CSI-RS configuration (symbol and RE locations in a subframe); CSI-RS subframe configuration (subframe location, offset, and/or periodicity in radio frame); CSI-RS power parameter; CSI-RS sequence parameter; CDM type parameter; frequency density; transmission comb; and/or QCL parameters.

In an example, one or more CSI-RS resources may be transmitted periodically, using aperiodic transmission, using a multi-shot transmission, and/or using a SP transmission. In a periodic transmission, the configured CSI-RS resource may be transmitted using a configured periodicity in time domain. In an aperiodic transmission, the configured CSI-RS resource may be transmitted in a dedicated time slot or subframe. In a multi-shot or SP transmission, the configured CSI-RS resource may be transmitted within a configured period. In an example, a gNB may transmit one or more SP CSI-RSs with a periodicity. The gNB may stop transmission of the one or more SP CSI-RSs if the CSI-RS is configured with a transmission duration. The gNB may stop transmission of the one or SP CSI-RSs in response to transmitting a MAC CE or DCI for deactivating (or stopping the transmission of) the one or more SP CSI-RSs.

In an example, a CSI reporting setting may comprise at least one of: one report configuration identifier; one report type; one or more reported CSI parameter(s); one or more CSI type (e.g., type I or type II); one or more codebook configuration parameters; one or more parameters indicating time-domain behavior; frequency granularity for CQI and PMI; and/or measurement restriction configurations. The report type may indicate a time domain behavior of the report (aperiodic, SP, or periodic). The CSI reporting setting may further comprise at least one of: one periodicity parameter; one duration parameter; and/or one offset (e.g., in unit of slots), if the report type is a periodic or SP report. The periodicity parameter may indicate a periodicity of a CSI report. The duration parameter may indicate a duration of CSI report transmission. The offset parameter may indicate value of timing offset of CSI report.

In an example, a CSI measurement setting may comprise one or more links comprising one or more link parameters. The link parameter may comprise at least one of: one CSI reporting setting indication, CSI-RS resource setting indication, and one or more measurement parameters.

FIG. 29 shows example of various CSI report triggering mechanisms. In an example, a gNB may trigger a CSI reporting by transmitting an RRC message, or a MAC CE, or a DCI, as shown in FIG. 29. In an example, a UE may perform periodic CSI reporting (e.g., P-CSI reporting in FIG. 29) based on an RRC message and one or more periodic CSI-RSs. In an example, a UE may not be allowed (or required) to perform periodic CSI reporting based on one or more aperiodic CSI-RSs and/or one or more SP CSI-RSs. In an example, a UE may perform SP CSI reporting (e.g., SP-CSI reporting in FIG. 29) based on a MAC CE and/or a DCI and based on one or more periodic or SP CSI-RSs. In an example, a UE may not be allowed (or required) to perform SP CSI reporting based on one or more aperiodic CSI-RSs. In an example, a UE may perform aperiodic CSI reporting (e.g., Ap-CSI reporting in FIG. 29) based on a DCI and based on one or more periodic, SP, or aperiodic CSI-RSs. In an example, a wireless device may perform a SP CSI reporting on a PUCCH in response to the SP CSI reporting being activated (or triggered) by a MAC CE. The wireless device may perform a SP CSI reporting on a PUSCH in response to the SP CSI reporting being activated (or triggered). In an example, a base station may instruct (e.g., by transmitting the MAC CE) a wireless device to perform SP CSI reporting on PUCCH when a compact CSI (e.g., small amount of report contents) is required by the base station, or DCI transmission is not convenient for the base station, and/or the CSI is not urgently required by the base station. In an example, a base station may instruct (e.g., by transmitting the DCI) a wireless device to perform SP CSI reporting on PUSCH when a large-sized CSI (e.g., big amount of report contents) is required by the base station, or a DCI transmission is convenient for the base station, and/or the CSI is urgently required by the base station.

Figure 30:
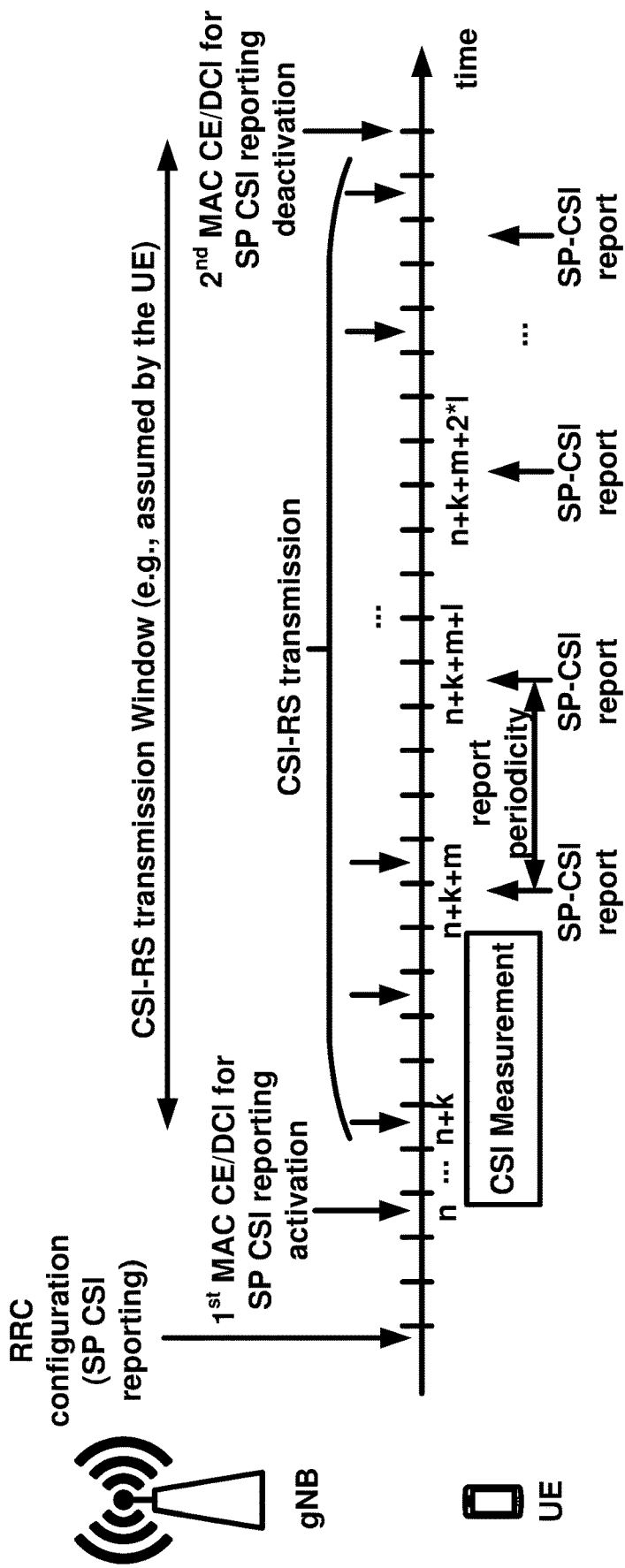
FIG. 30 is an example diagram for semi-persistent CSI reporting mechanism as per an aspect of an embodiment of the present disclosure.

FIG. 30 shows an example of SP CSI reporting in a cell. In an example, a base station (e.g., gNB in FIG. 30) may transmit to a wireless device (e.g., UE in FIG. 30) one or more RRC messages comprising configuration parameters of one or more SP CSI reporting configurations. The base station may transmit to the wireless device, at slot (or subframe) n, a $1^{st}$ MAC CE or DCI indicating an activation of a SP CSI reporting configuration of the one or more SP CSI reporting configurations. The base station may start transmitting one or more SP CSI-RSs at slot (or subframe) n+k. In an example, k may be zero or an integer greater than zero, configured by an RRC message, or be predefined as a fixed value.

As shown in FIG. 30, after or in response to receiving the $1^{st}$ MAC CE or the $1^{st}$ DCI, the wireless device may perform CSI measurements on one or more CSI-RSs according to the activated SP CSI reporting configuration. In an example, after or in response to receiving the $1^{st}$ MAC CE or the $1^{st}$ DCI, the wireless device may transmit one or more SP CSI reports (e.g., based on the CSI measurements) at slot/subframe n+k+m, n+k+m+l, n+k+m+2*l, etc., with a periodicity of l subframes (or slots). The periodicity may be configured in an RRC message. In an example, the UE may receive a $2^{nd}$ MAC/DCI indicating a deactivation of the SP CSI reporting configuration. After receiving the $2^{nd}$ MAC/DCI, or in response to the $2^{nd}$ MAC/DCI, the UE may stop transmitting the one or more SP CSI reports. In an example, k may be zero (configured, or predefined). In an example, m (e.g., when k=0) may be a time offset between the wireless device receives the $1^{st}$ MAC CE/DCI for activation of the SP CSI reporting and the wireless device transmits a first SP CSI report of the one or more SP CSI reports. In an example, m may be configured by an RRC message, or be predefined as a fixed value. A value of m may depend on the capability of a UE and/or the network.

As shown in FIG. 30, a wireless device may assume a CSI-RS transmission period (e.g., CSI-RS transmission Window in FIG. 30), in response to a $1^{st}$ MAC CE/DCI for activation of a SP CSI reporting configuration and based on one or more configuration parameters of the activated SP CSI reporting configuration. The base station may transmit one or more CSI-RSs at least in the CSI-RS transmission period, based on the activated SP CSI reporting configuration. In an example, the wireless device may perform CSI measurements on the one or more CSI-RSs transmitted in the CSI-RS transmission period.

Example DRX (Discontinuous Reception) Operation

In an example, DRX operation may be used by a wireless device (UE) to improve UE battery lifetime. In an example, in DRX, UE may discontinuously monitor downlink control channel, e.g., PDCCH/EPDCCH. In an example, the base station may configure DRX with a set of DRX parameters, e.g., using RRC configuration. The DRX parameters may be selected based on the application type such that power and resource savings are maximized. In an example, in response to DRX being configured/activated, there may be an extended delay in receiving data as, the UE may be in DRX Sleep/Off state at the time of data arrival at the UE and the base station may wait until the UE transitions to the DRX ON state. The base station may select the DRX parameters such that the packet delay is reduced, and power saving is increased.

In an example, during a DRX mode, the UE may power down most of its circuitry when there are no packets to be received. During this time the UE listens to the downlink (DL) occasionally which is called DRX Active state whereas the time during which UE doesn't listen PDCCH is called DRX Sleep state.

In an example, DRX may improve spectrum efficiency of a base station. In an example, if DRX is not configured, the wireless device may be transmitting periodic CSI and/or SRS frequently (e.g., based on the configuration). With DRX, during DRX OFF periods, the UE may not transmit periodic CSI and/or SRS. The base station may assign these resources to the other UEs to maximize resource utilization.

In LTE/LTE_A system, the time granularity for DRX timers may be in terms of PDCCH subframes (e.g., indicated as psf in the DRX configurations) in legacy DRX procedures. Example embodiments may enhance the DRX configuration for determining time granularity of DRX timers for example, based on a numerology and/or TTI.

In an example, the MAC entity may be configured by RRC with a DRX functionality that controls the UE's downlink control channel (e.g., PDCCH) monitoring activity for a plurality of RNTIs for the MAC entity, e.g., C-RNTI and/or TPC-PUCCH-RNTI and/or TPC-PUSCH-RNTI and/or Semi-Persistent Scheduling C-RNTI (if configured) and/or eIMTA-RNTI (if configured) and/or SL-RNTI (if configured) and/or SL-V-RNTI (if configured) and/or CC-RNTI (if configured) and/or SP-CSI C-RNTI (if configured) and SRS-TPC-RNTI (if configured). In an example, in response to being in RRC_CONNECTED, if DRX is configured, the MAC entity may monitor the PDCCH discontinuously using the DRX operation; otherwise the MAC entity may monitor the PDCCH continuously. RRC may control DRX operation by configuring a plurality of timers, e.g., drx-onDurationTimer and/or drx-InactivityTimer and/or drx-RetransmissionTimer (e.g., one per DL HARQ process except for the broadcast process) and/or drx-ULRetransmissionTimer (one per asynchronous UL HARQ process) and/or the longDRX-Cycle and/or the value of the drxStartOffset and/or optionally the drxShortCycleTimer and/or shortDRX-Cycle. In an example, a HARQ RTT timer per DL HARQ process (except for the broadcast process) and/or UL HARQ RTT Timer per asynchronous UL HARQ process may be defined.

In an example, in response to a DRX cycle being configured, the Active Time may include the time while drx-onDurationTimer or drx-InactivityTimer or drx-RetransmissionTimer or drx-ULRetransmissionTimer or mac-ContentionResolutionTimer is running.

In an example, drx-Inactivity-Timer may specify a time duration for which the UE may be Active after successfully decoding a PDCCH indicating a new transmission (UL or DL or SL). In an example, this timer may be restarted upon receiving PDCCH for a new transmission (UL or DL or SL). In an example, the UE may transition to a DRX mode in response to the expiry of this timer.

In an example, shortDRX-Cycle may be a first type of DRX cycle (e.g., if configured) that needs to be followed when UE enters DRX mode. In an example, a DRX-Config IE indicates the length of the short cycle.

In an example, drxShortCycleTimer may be expressed as multiples of shortDRX-Cycle. The timer may indicate the number of initial DRX cycles to follow the short DRX cycle before entering the long DRX cycle.

In an example, longDRX-CycleStartOffset may define long DRX cycle length and/or the DRX offset. DRX offset may be used to calculate the start of DRX cycle.

In an example, drx-onDurationTimer may specify the time duration at the beginning of a DRX Cycle (e.g., DRX ON). In an example, drx-onDurationTimer may indicate the time duration before entering the power saving mode (DRX OFF).

In an example, HARQ RTT Timer may specify a minimum duration from the time new transmission is received and before the UE may expect a retransmission of a same packet. In an example, this timer may be fixed and may not be configured by RRC.

In an example, drx-RetransmissionTimer may indicate a maximum duration for which UE may be monitoring PDCCH when a retransmission from the eNodeB is expected by the UE.

In an example, in response to a DRX cycle being configured, the Active Time may include the time while a Scheduling Request is sent on PUCCH and is pending.

In an example, in response to a DRX cycle being configured, the Active Time may include the time while an uplink grant for a pending HARQ retransmission can occur and there is data in the corresponding HARQ buffer for synchronous HARQ process.

In an example, in response to a DRX cycle being configured, the Active Time may include the time while a PDCCH indicating a new transmission addressed to the C-RNTI of the MAC entity has not been received after successful reception of a Random Access Response for the preamble not selected by the MAC entity.

In an example, DRX may be configured for a wireless device. The HARQ RTT Timer may expire in a subframe and the data of the corresponding HARQ process may not be successfully decoded. The MAC entity may start the drx-RetransmissionTimer for the corresponding HARQ process.

In an example, DRX may be configured for a wireless device. An UL HARQ RTT Timer may expire in a subframe. The MAC entity may start the drx-ULRetransmissionTimer for the corresponding HARQ process.

In an example, DRX may be configured for a wireless device. A DRX Command MAC control element or a Long DRX Command MAC control element may be received. The MAC entity may stop drx-onDurationTimer and stop drx-InactivityTimer.

In an example, DRX may be configured for a wireless device. In an example, drx-InactivityTimer may expire or a DRX Command MAC control element may be received in a subframe. In an example, in response to Short DRX cycle being configured, the MAC entity may start or restart drxShortCycleTimer and may use Short DRX Cycle. Otherwise, the MAC entity may use the Long DRX cycle.

In an example, DRX may be configured for a wireless device. In an example, drxShortCycleTimer may expire in a subframe. The MAC entity may use the Long DRX cycle.

In an example, DRX may be configured for a wireless device. In an example, a Long DRX Command MAC control element may be received. The MAC entity may stop drxShortCycleTimer and may use the Long DRX cycle.

In an example, DRX may be configured for a wireless device. In an example, if the Short DRX Cycle is used and [(SFN*10)+subframe number] modulo (shortDRX-Cycle)= (drxStartOffset) modulo (shortDRX-Cycle), a wireless device may start drx-onDurationTimer.

In an example, DRX may be configured for a wireless device. In an example, if the Long DRX Cycle is used and [(SFN*10)+subframe number] modulo (longDRX-Cycle)=drxStartOffset, a wireless device may start drx-onDurationTimer.

In an example, DRX may be configured for a wireless device. In an example, during the Active Time, for a PDCCH-subframe, the subframe may not be required for uplink transmission for half-duplex FDD UE operation. In an example, the subframe may not be a half-duplex guard subframe. In an example, the subframe may not be part of a configured measurement gap. In an example, the subframe may not be part of a configured Sidelink Discovery Gap for Reception. During the Active Time, for a subframe other than a PDCCH-subframe and for a UE capable of simultaneous reception and transmission in the aggregated cells, the subframe may be a downlink subframe indicated by a valid eIMTA L1 signaling for at least one serving cell not configured with schedulingCellId. In an example, the subframe may not be part of a configured measurement gap. In an example, the subframe may not be part of a configured Sidelink Discovery Gap for Reception.

In an example, during the Active Time, for a subframe other than a PDCCH-subframe and for a UE not capable of simultaneous reception and transmission in the aggregated cells, the subframe may be a downlink subframe indicated by a valid eIMTA L1 signaling for the SpCell. In an example, the subframe may not be part of a configured measurement gap. In an example, the subframe may not be part of a configured Sidelink Discovery Gap for Reception. The wireless device may monitor the PDCCH. In an example, if the PDCCH indicates a DL transmission or if a DL assignment has been configured for this subframe, the wireless device may start the HARQ RTT Timer for the corresponding HARQ process. The wireless device may stop the drx-RetransmissionTimer for the corresponding HARQ process. In an example, if the PDCCH indicates an UL transmission for an asynchronous HARQ process or if an UL grant has been configured for an asynchronous HARQ process for this subframe, the wireless device may start the UL HARQ RTT Timer for the corresponding HARQ process in the subframe containing the last repetition of the corresponding PUSCH transmission. The wireless device may stop the drx-ULRetransmissionTimer for the corresponding HARQ process. In an example, if the PDCCH indicates a new transmission (DL, UL or SL), the wireless device may start or restart drx-InactivityTimer.

Figure 31:
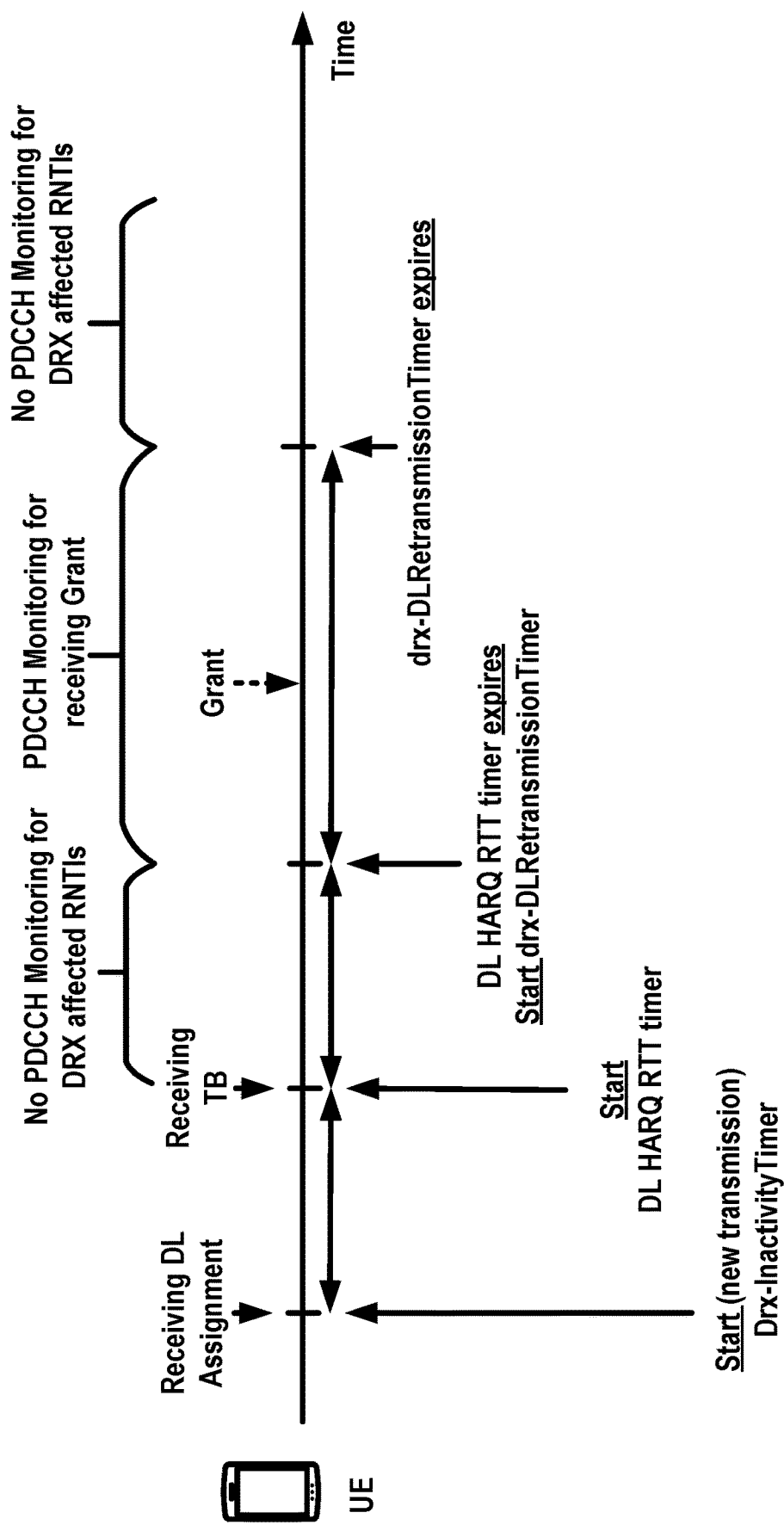
FIG. 31 is an example diagram of a discontinuous reception (DRX) operation as per an aspect of an embodiment of the present disclosure.

FIG. 31 shows example of DRX operation in a LTE/LTE_A system. A base station may transmit a RRC message comprising parameter configuration of DRX operation. A base station may transmit a DCI for downlink resource allocation via a PDCCH, to a UE. The UE may start a DRX inactivity timer (e.g., drx-InactivityTimer) during which, the UE may monitor the PDCCH. After receiving a transmission block (TB) when the drx-InactivityTimer is running, the UE may start the HARQ RTT Timer, during which, the UE may stop monitoring the PDCCH. The UE may transmit a NACK to the base station upon unsuccessful receiving the TB. When the HARQ RTT Timer expires, the UE may monitor the PDCCH and start the drx-RetransmissionTimer. When the drx-RetransmissionTimer is running, the UE may receive a second DCI indicating a DL grant for the retransmission of the TB. If not receiving the second DCI before drx-RetransmissionTimer expires, the UE may stop monitoring the PDCCH.

In a LTE/LTE_A system, when a preamble is not selected by a MAC entity (e.g., when contention-free random access is triggered), a RAR may be scheduled by a first DCI with a small downlink assignment. The small downlink assignment may not accommodate a new transmission with a big amount of data. A UE may stay active to monitor a PDCCH for detecting a second DCI for new data transmission, instead of switching to DRX inactive mode (e.g, not monitoring a PDCCH), if DRX operation configured. Therefore, the Active Time of a DRX operation may include the time while a PDCCH indicating a new transmission addressed to the C-RNTI of the MAC entity has not been received after successful reception of a RAR for the premable not selected by the MAC entity. The UE may monitor a PDCCH for detecting the second DCI for new data transmission in the Active Time, if DRX operation configured.

In a NR system, when a gNB and/or a UE configured with multiple beams, the gNB and/or the UE may perform one or more beam management procedure. For example, the UE may perform a beam failure recovery procedure, if one or more beam pair links between the gNB and the UE fail. The UE may transmit one or more PRACH preambles via one or more PRACH resources, to the gNB indicating a beam failure recovery request.

Figure 32:
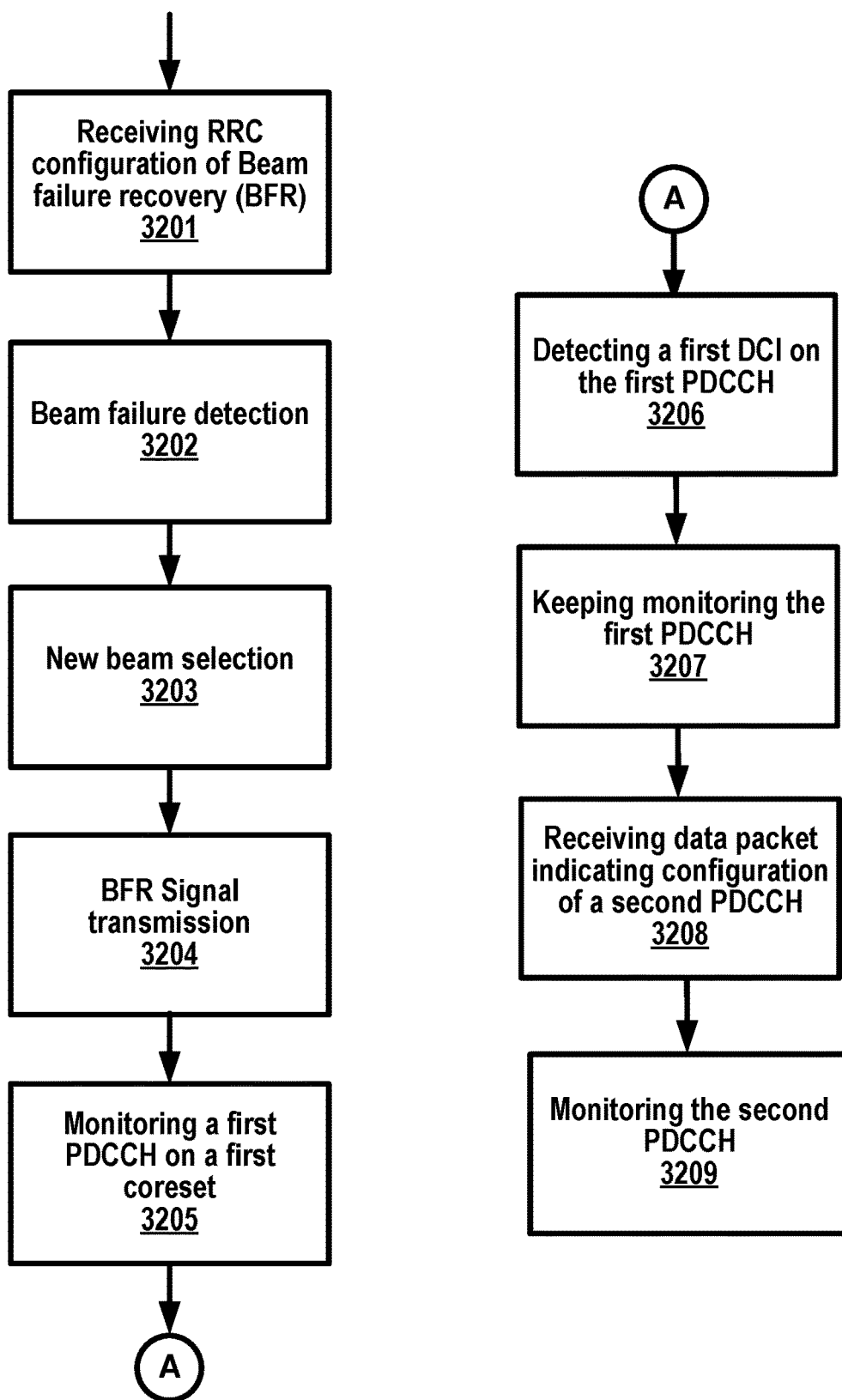
FIG. 32 is an example diagram of a beam failure recovery procedure as per an aspect of an embodiment of the present disclosure.

FIG. 32 shows example of a BFR procedure. A wireless device may receive one or more RRC messages comprising BFR parameters 3201. The wireless device may detect at least one beam failure 3202 according to at least one of BFR parameters. The wireless device may start a first timer in response to detecting the at least one beam failure. The wireless device may select a beam 3203 in response to detecting the at least one beam failure. The wireless device may transmit at least a first BFR signal 3204 to a gNB in response to selecting the beam. The wireless device may start a response window in response to transmitting the at least first BFR signal. In an example, the response window may be a timer with a value configured by the gNB. When the response window is running, the wireless device may monitor a first PDCCH in a first coreset 3205. The first coreset may be associated with the BFR procedure.

In an example, a wireless device may monitor the first PDCCH in the first coreset in condition of transmitting the at least first BFR signal. The wireless device may not monitor the first PDCCH in the first coreset when no BFR procedure is triggered.

In an example, a wireless device may receive a first DCI via the first PDCCH in the first coreset 3206 when the response window is running. The wireless device may consider the BFR procedure successfully completed when receiving the first DCI via the first PDCCH in the first coreset before the response window expires. The wireless device may stop the first timer and/or stop the response window in response to the BFR procedure successfully being completed.

In an example, the wireless device may keep monitoring the first PDCCH in the first coreset 3207. In an example, the first coreset may support a limited number of DCI formats (e.g., fallback DCI formats), and/or a limited number of control-channel element (CCE) aggregation levels (ALs). In order to support all DCI formats and/or all CCE ALs, the gNB may transmit a data packet of an RRC message or a MAC CE 3208 comprising one or more parameters of a second coreset for monitoring a second PDCCH. In an example, the second coreset may support more DCI formats than the first CORSETS. In an example, the second coreset may support more CCE aggregation level than the first coreset.

In an example, the wireless device may monitor the first PDCCH in the first coreset for receiving downlink assignment for scheduling a data packet comprising the RRC message or the MAC CE. The RRC message or the MAC CE may comprise one or more parameters of a second coreset. When receiving the data packet comprising the RRC message or the MAC CE, the wireless device may switch to monitor the second PDCCH in the second coreset 3209 based on the one or more parameters comprised in the RRC message or the MAC CE.

In an example, a PRACH preamble of a beam failure recovery procedure may be selected by a MAC entity of a wireless device, different from a contention-free random access procedure where a PRACH preamble of the contention-free random access procedure is not selected by the MAC entity of the wireless device, instead the PRACH preamble of the contention-free random access procedure is indicated by a PDCCH order or an RRC signalling (e.g., for handover). In an example, a wireless device may keep monitoring a first PDCCH until receiving an RRC message or a MAC CE for a second PDCCH configuration, after the BFR procedure successfully is completed. In existing DRX procedures, when configured with a DRX operation, the wireless device may switch to a DRX Sleep/Inactive state, for example, by stopping monitoring the first PDCCH. In existing DRX procedures, the wireless device may miss detecting a DCI via the first PDCCH for scheduling the RRC message or the MAC CE for the second PDCCH configuration, if the wireless device is in a DRX Sleep/Inactive mode. In existing DRX procedures, if the wireless device misses the DCI, the gNB and the wireless device may not communicate correctly. In the case, the wireless device and the gNB may be in misalignment on which PDCCH the wireless device may monitor. Existing technologies (e.g., an LTE/LTE_A technology) may result in missing detecting a DCI for new beam parameter reconfiguration, when DRX configured. Existing technologies may increase data transmission latency, delay of beam recovery procedure, and/or power consumption of a wireless device. Existing technologies may reduce system throughput, and/or spectrum efficiency. Example embodiments of enhancing a DRX procedure (operation) when configured with BFR procedure may reduce misalignment of a gNB and a wireless device. More specifically, example embodiments may reduce probability of a wireless device missing detection of configuration of a PDCCH when triggering a BFR procedure during a DRX process. Consequently, example embodiments may reduce data transmission latency, delay of beam recovery procedure, and/or power consumption of a wireless device. Example embodiments may provide mechanisms to increase system throughput and/or spectrum efficiency of a base station.

In an example, a UE may receive from a base station, one or more RRC messages comprising at least one of: one or more first parameters controlling a Discontinuous Reception (DRX) operation, the one or more first parameters comprising one or more timer values of one or more DRX timers; and one or more second parameters of a beam failure recovery procedure comprising one or more PRACH resource configuration parameters associated with one or more reference signals. In an example, the one or more PRACH resource configuration parameters comprise: one or more preambles; and/or one or more time/frequency resources. The UE may transmit at least a first preamble indicating a beam failure associated with the beam failure recovery procedure. The UE may receive a first DCI via a PDCCH, wherein the first DCI comprises indication of a reference signal. The reference signal may be associated with the at least first preamble. The UE may determine the DRX operation being in an Active Time. The Active Time may be a time duration during which a second DCI indicating a new transmission addressed to the wireless device is not yet received after the UE successfully receives the first DCI. The UE may monitor a PDCCH for the second DCI during at least a portion of the Active Time. In an example, the UE may receive a new transmission block in response to successful reception of the second DCI. By the example embodiment, a wireless device may keep monitoring a PDCCH for a DCI which may allocate downlink resource for transmitting RRC reconfiguration of new beam parameters (e.g., QCL parameters of PDSCH/PDCCH), when DRX operation is configured (or triggered by a MAC CE or one or more DRX timers). Keeping monitoring the PDCCH by the embodiments, rather than going to DRX inactive mode as required by a DRX operation in existing technologies, may improve delay of beam failure recovery procedure, and/or power consumption of a wireless device. Example embodiment may increase system throughput and/or spectrum efficiency of a base station.

Figure 33:
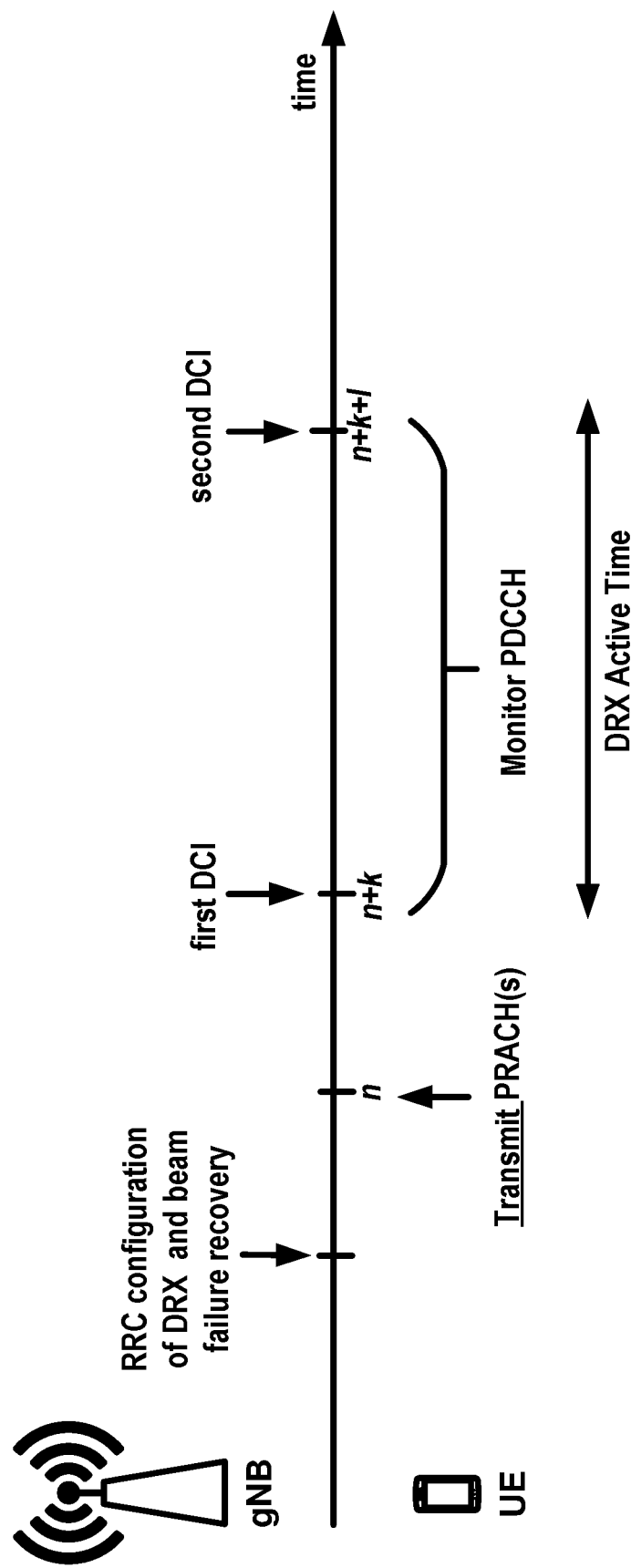
FIG. 33 is an example diagram of a beam failure recovery procedure when DRX is configured as per an aspect of an embodiment of the present disclosure.

FIG. 33 shows example embodiment of improved DRX operation with a beam failure recovery procedure. A base station (e.g., gNB in FIG. 33) may transmit to a wireless device (e.g., UE in FIG. 33), one or more configuration parameters of a DRX operation and a beam failure recovery procedure.

As shown in FIG. 33, the UE may trigger a beam failure recovery request transmission, if a beam failure event occurs. The UE may start transmitting one or more PRACH preambles at subframe/slot n, in response to triggering the beam failure recovery request transmission. In response to receiving the one or more PRACH preambles, the gNB may transmit a first DCI via a PDCCH at subframe/slot n+k, wherein the first DCI may indicate at least one of: receiving the one or more PRACH preambles; a new data transmission; a CSI request; and/or a beam index indication. In an example, the UE may determine the DRX operation being in an Active Time, in response to receiving the first DCI. the Active Time may include a time duration during which, a second DCI indicating a new transmission addressed to the UE is yet not received, after the UE successfully receives the first DCI. In an example, the DRX active time may be a duration starting from subframe n+k, untile receiving the second DCI in subframe n+k+l. The value/is an integer greater than zero. During at least a portion of the DRX active time, the UE may monitor a PDCCH for the second DCI. In an example, in response to receiving the second DCI, the UE may start receiving new transmission from the gNB, and/or transmitting new data to the gNB. By the embodiment, if configured with DRX operation, a UE may not miss a second DCI for new transmission (e.g., for beam reconfiguration parameters), after receiving a first DCI for beam failure recovery procedure.

In an example, when configured with a DRX operation and a BFR procedure, a wireless device may determine that the Active Time associated with the DRX operation may comprise a time during which the information (an RRC message or a MAC CE) for a second PDCCH configuration has not been received, after the wireless device receives a first DCI on the first PDCCH, when the BFR procedure triggered.

Figure 34:
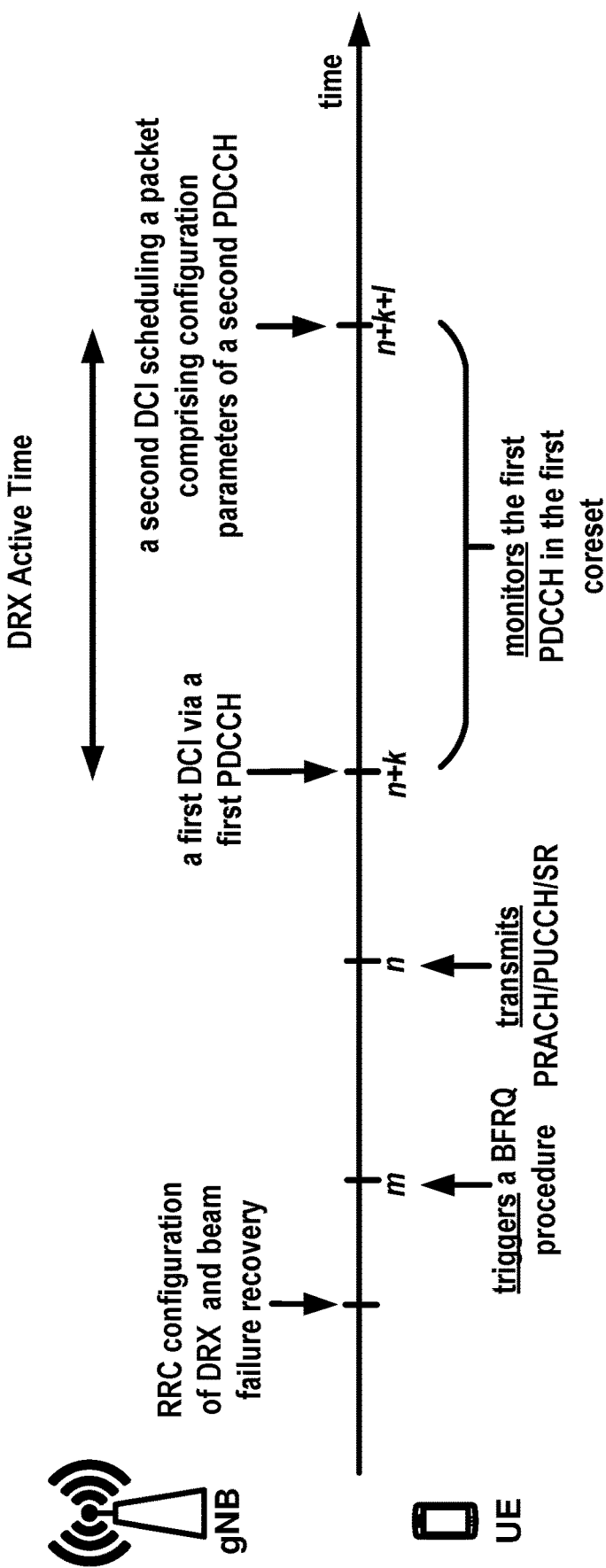
FIG. 34 is an example diagram of a beam failure recovery procedure when DRX is configured as per an aspect of an embodiment of the present disclosure.

FIG. 34 shows example of the embodiment. In the example, a wireless device (e.g., UE in FIG. 34) may receive from a base station (e.g., gNB in FIG. 34), one or more RRC messages comprising one or more first parameters controlling a DRX operation. In an example, the one or more first parameters may comprise one or more timer values of one or more DRX timers. In an example, the one or more RRC messages may comprise one or more second parameters of a BFR procedure.

In an example, the one or more second parameters may indicate at least: one or more PRACH resources; one or more first RSs; and/or a first coreset for monitoring a first PDCCH. In an example, one of the one or more PRACH resources may be associated with one of the one or more first RSs. In an example, each PRACH resource of the one or more PRACH resources may comprise: one preamble; and/or one time/frequency resource. In an example, each PRACH resource of the one or more PRACH resources is associated with each of the one or more first RSs.

In an example, the one or more second parameters may indicate at least: one or more PUCCH/SR resources; one or more second RSs. In an example, each of the one or more PUCCH/SR resources may be associated with each of the one or more second RSs. In an example, the each of the one or more PUCCH/SR resources may comprise at least one of: time allocation; frequency allocation; cyclic shift; orthogonal cover code; and/or a spatial setting.

In an example, the wireless device may trigger the BFR procedure when at least one beam failure occurs. In an example, a beam failure may occur when quality of at least one RS transmitted from a gNB to the wireless device is worse than a first configured threshold.

In an example, when triggering the BFR procedure, the wireless device may select at least a first RS from the one or more first RSs with quality greater than a second configured threshold. The wireless device may select one of the one or more PRACH resources associated with the at least first RS.

In an example, when triggering the BFR procedure, the wireless device may select at least a second RS from the one or more second RSs with quality greater than a second configured threshold. The wireless device may select one of the one or more PUCCH/SR resources associated with the at least second RS.

As shown in FIG. 34, the wireless device may transmit at least one BFR signal in response to the selecting, starting from the $n^{th}$ slot. In an example, the at least one BFR signal may be a preamble associated with the one of the one or more PRACH resources. In an example, the at least one BFR signal may be a PUCCH/SR signal transmitted on the one of the one or more PUCCH/SR resources.

In an example, the wireless device may monitor the first PDCCH in the first coreset for detecting a first DCI, in response to transmitting the at least one BFR signal. In an example, the wireless device may receive the first DCI via the first PDCCH in the $(n+k)^{th}$ slot. The wireless device may determine the Active Time associated with the DRX operation, in response to receiving the first DCI. In an example, the Active Time may comprise a time during which a second DCI has not been received, after the wireless device receives the first DCI in the $(n+k)^{th}$ slot. In an example, the second DCI is a DCI for scheduling a data packet comprising an RRC message or a MAC CE indicating one or more configuration parameters of a second PDCCH. In an example, the one or more configuration parameters of the second PDCCH may indicate at least one of: a second coreset; at least one parameter related to antenna port QCL indicating QCL information of a DM-RS antenna port of the second PDCCH. In an example, the wireless device may receive the second DCI via the first PDCCH at the $(n+k+1)^{th}$ slot. In the example, the Active Time may be the time from the $(n+k)^{th}$ slot to the $(n+k+1)^{th}$ slot. During at least a portion of the Active Time, the wireless device may monitor the first PDCCH in the first coreset for detecting the second DCI. By the embodiment, the wireless device may avoid switching to DRX sleep/inactive state and missing the second DCI, when configured with DRX operation, since the second DCI indicates for scheduling for the data packet related to configuration parameters of the second PDCCH.

Figure 35:
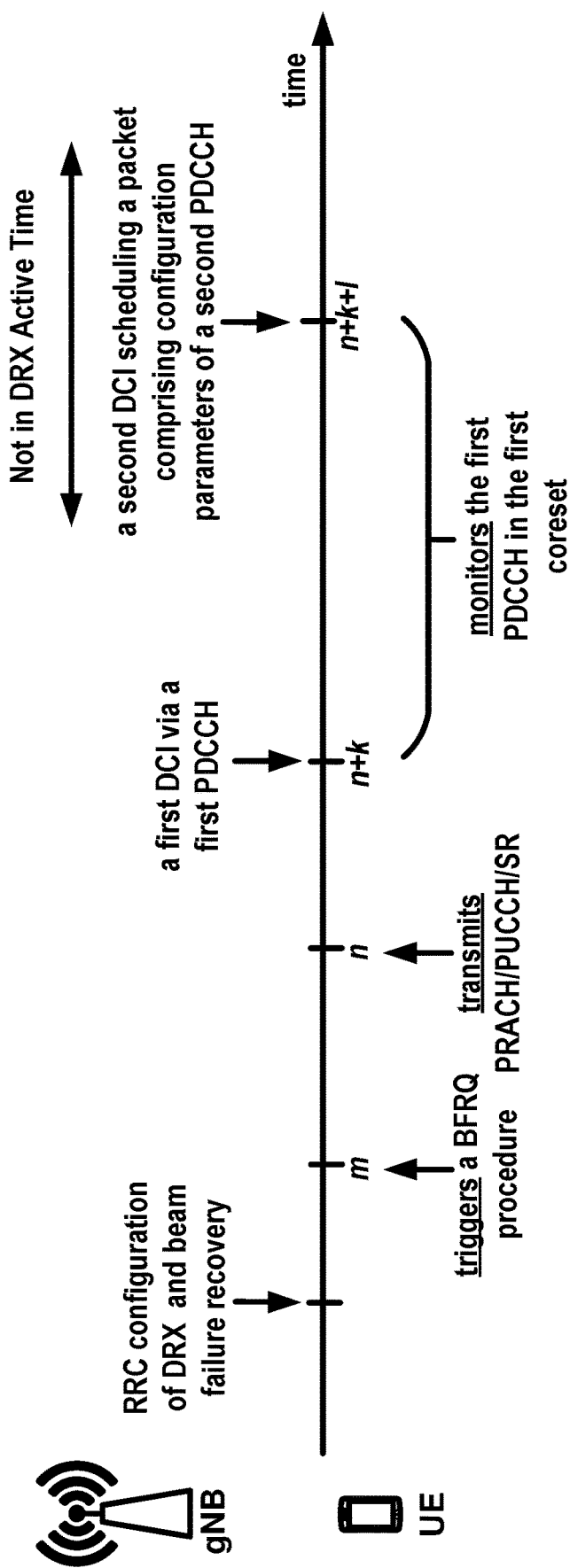
FIG. 35 is an example diagram of a beam failure recovery procedure when DRX is configured as per an aspect of an embodiment of the present disclosure.

FIG. 35 shows an example of an embodiment. In an example, when configured with a DRX operation and a BFR procedure, a wireless device (e.g., UE in FIG. 35) may transmit at least one BFR signal in response to detecting at least a beam failure, starting from the $n^{th}$ slot. In an example, the wireless device may monitor a first PDCCH in a first coreset for detecting a first DCI. In an example, the wireless device may receive the first DCI in the $(n+k)^{th}$ slot. In an example, in order to instruct the wireless device to monitor a second PDCCH, a base station (e.g., gNB in FIG. 35) may transmit a second DCI scheduling a data packet comprising configuration parameters of the second PDCCH, in the $(n+k+1)^{th}$ slot. In an example, the wireless device may be not in the Active Time associated with the DRX operation, in the $(n+k+1)^{th}$ slot. In an example, the wireless device may be not in the Active Time in the $(n+k+1)^{th}$ slot, when one or more timers (e.g., drx-onDurationTimer or drx-InactivityTimer or drx-RetransmissionTimerDL or drx-RetransmissionTimerUL or a ra-ContentionResolutionTimer) is not running. In an example, the wireless device may be not in the Active Time in the $(n+k+1)^{th}$ slot, when there is no SR transmitted or pending. In an example, in order to receive the second DCI, the wireless device may monitor the first PDCCH in the first coreset at least during a portion of the time duration when the second DCI has not been received, after receiving the first DCI, even the wireless device is not in the Active Time associated with the DRX operation. By the embodiment, the wireless device may monitor the first PDCCH in the first coreset in response to receiving the first DCI, when the wireless device is not in the Active Time. The wireless device may not monitor a PDCCH in a coreset other than the first coreset, when the wireless device is not in the Active Time. By the embodiment, the wireless device may reduce the power consumption, and receive configuration parameters of the second PDCCH, when configured with a DRX operation.

In an example, a wireless device may receive from a base station one or more messages comprising at least one of: first configuration parameters indicating first parameters of a DRX process; second parameters of a BFR procedure indicating a first coreset. The wireless device may transmit one or more signal associated with the BFR procedure in response to initiating the BFR procedure. The wireless device may receive a first DCI via a first PDCCH in the first coreset, in response to the transmitting the one or more first signals. The DRX process may determine that a MAC entity is in an Active Time. In an example, the Active Time may comprise a time when an indication has not been received after receiving the first DCI. In an example, the indication may comprise second configuration parameters of a second corset. In an example, the wireless device may monitor, during at least a portion of the Active Time, the first PDCCH for receiving at least a second DCI comprising scheduling parameters of the indication. The wireless device may receive the indication comprise the second configuration parameters. In an example, the one or more signals associated with the BFR procedure may comprise at least one of: one or more preambles; one or more PUCCH/SRs; one or more SRSs. In an example, the first coreset may comprise a first control resource set comprising a first number of OFDM symbols and a first set of resource blocks. In an example, the second coreset may comprise a second number of OFDM symbols and a second set of resource blocks. In an example, the wireless device may, in response to receiving the indication, monitor a second PDCCH in the second coreset for detecting at least a third DCI, based on the second configuration parameters. The wireless device may receive or transmit a TB according to the at least third DCI.

In a LTE/LTE_A system, when configured with a DRX operation, a UE may not report CQI/PMI/RI on PUCCH when the UE is not in an Active Time, e.g., for saving UE's transmission power, reducing interference to other UEs, or improving uplink resource spectrum efficiency. The Active Time my include a time duration during which, at least one of: one or more DRX timers (e.g., drx-onDurationTimer; InactivityTimer; etc.) is running; a SR is sent on a PUCCH and is pending; and/or a PDCCH indicating a new transmission addressed to the C-RNTI of the MAC entity has not been received after successful reception of a RAR for the preamble not selected by the MAC entity.

In an example, when configured with multiple beams in a gNB and/or a UE, the UE may transmit one or more L1-RSRP report to the gNB, via a PUCCH, or a PUSCH, where the one or more L1-RSRP report may indicate beam quality of selected beams. The UE may transmit one or more CQI/PMI/RI/CRI report to the gNB, via a PUCCH, or a PUSCH. In an example, a L1-RSRP report and a CQI/PMI/RI/CRI report may indicate different parameters. In an example, the L1-RSRP report may indicate a coarse receiving quality of a RS transmitted from a beam. In response to receiving the L1-RSRP report, a gNB may adjust a beam direction or change to another beam based on the L1-RSRP report. In an example, a UE may transmit one or more CQI/PMI/RI/CRI report in a CSI acquisition procedure. A CQI/PMI/RI/CRI report may indicate a quantity of spatial property (e.g., rank, precoding weight index, etc.) of a radio propagation channel from a gNB to a UE. In response to receiving the CQI/PMI/RI/CRI report, the gNB may determine a transmission format (e.g., MCS, resource allocation of PDCCH/PDSCH, MIMO transmission format, etc.) on a PDSCH. In an example, a wireless device may transmit L1-RSRP report on a first PUCCH/PUSCH resource different from a second PUCCH/PUSCH resource for CQI/PMI/RI/CRI report transmission. The first PUCCH/PUSCH resource may have different configuration parameters (e.g., power setting, periodicity, and/or format) from the second PUCCH/PUSCH resource. Existing DRX technologies may not specify UE's behavior regarding beam management procedure during DRX mode. Not specifying beam management procedure during DRX mode may cause misalignment between a base station and a wireless device, regarding for example, whether the wireless device may transmit L1-RSRP or not, whether the base station may reallocate uplink resource originally allocated to a first wireless device for L1-RSRP report to a second wireless device. Misalignment on beam management in DRX operation, between the base station and the wireless device, may increase power consumption of a wireless device, and/or uplink interference to other wireless devices. The misalignment may decrease uplink resource spectrum efficiency. Example embodiments may provide mechanisms to improve power consumption of a wireless device, reduce uplink interference to other wireless devices, and/or increase uplink resource spectrum efficiency.

In an example, a UE may receive from a base station, one or more RRC messages comprising at least one of: one or more first parameters controlling a Discontinuous Reception (DRX) operation, the one or more first parameters comprising one or more timer values of one or more DRX timers; and one or more second parameters of a beam management procedure comprising at least one of: a reference signal (RS) resource setting; and/or a CSI reporting setting for L1-RSRP (Reference Signal Receiving Power) reporting. A L1-RSRP may indicate the receiving quality measured on one or more RSs transmitted with a transmit beam from a gNB and received with a receiving beam at a UE. The RS resource setting may comprise a set of RS resources, each RS resource associated with a RS resource configuration identifier and radio resource configuration (e.g., number of ports; time and frequency resource allocation; frequency density, etc.). In an example, the RS may be a CSI-RS, and/or a SS/PBCH block. In an example, the CSI report setting for L1-RSRP reporting may comprise parameters indicating at least one of: an indicator indicating whether a group-based beam reporting is supported; a number indicating the number of reported RS; a value indicating frequency granularity for CSI report; parameters indicating periodicity; slot offset of CSI report; and/or a PUCCH resource for the L1-RSRP reporting. In an example, a RS resource may be transmitted with a beam direction. Different RS resources may be transmitted with different beam directions.

In an example, the at least RRC message may further comprise a report configuration type (e.g., indicating the time domain behavior of the report—either aperiodic, semi-persistent, or periodic), if a gNB and/or a UE supports aperiodic, SP, and/or periodic L1-RSRP reporting.

In an example, the UE may transmit one or more L1-RSRP report on PUCCH during an Active Time. In an example, the UE may not transmit the one or more L1-RSRP report on the PUCCH when not in the Active Time. In an example, the one or more L1-RSRP may be a SP CSI report, which may be activated/deactivated by a MAC CE. In an example, the one or more L1-RSRP may be a periodic CSI report.

In an example, the UE may transmit one or more L1-RSRP report on a PUSCH during an Active Time. In an example, the UE may not transmit the one or more L1-RSRP report on the PUSCH when not in the Active Time. In an example, the one or more L1-RSRP may be a SP CSI report, which may be activated/deactivated by a DCI.

Figure 36:
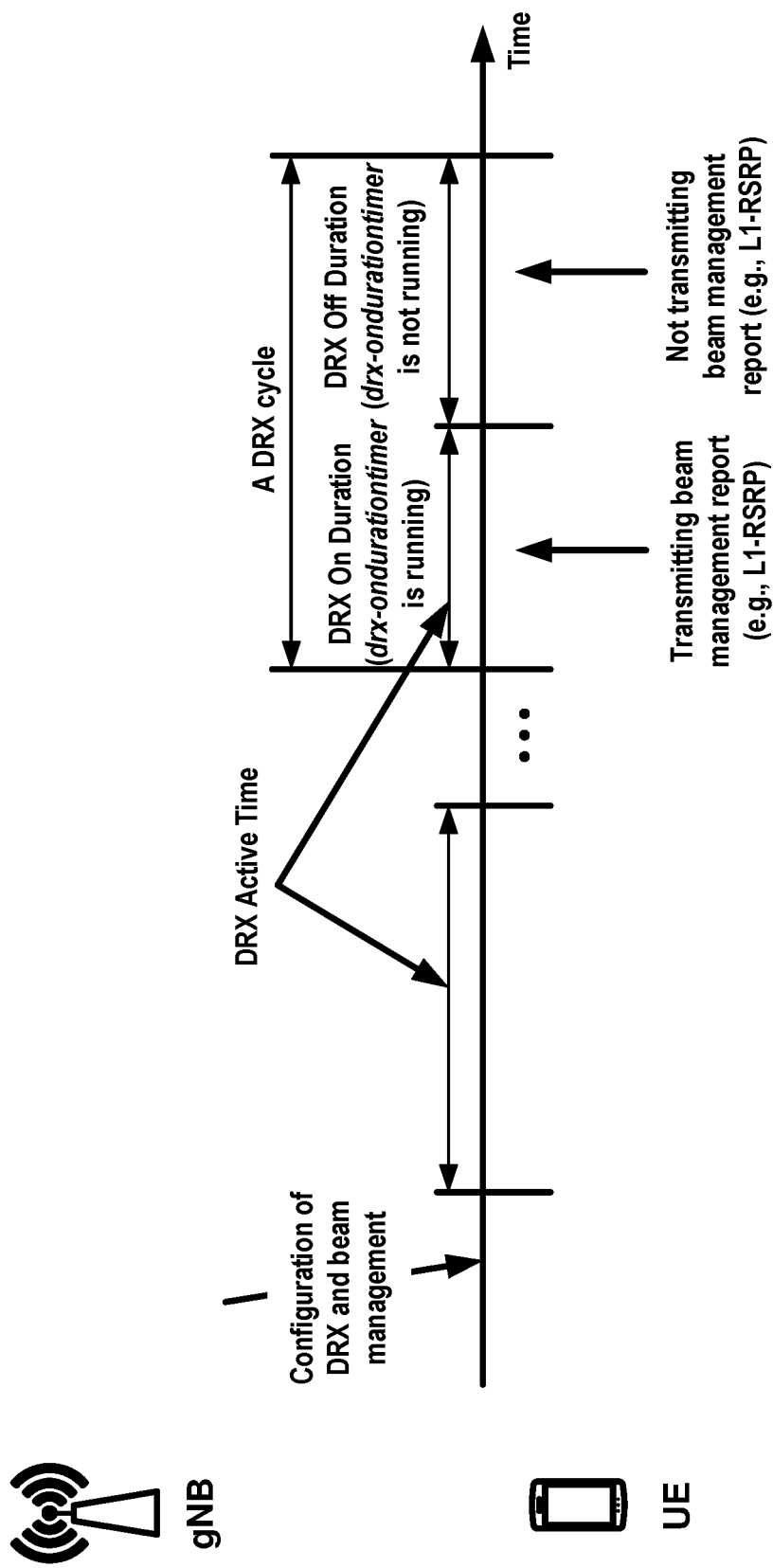
FIG. 36 is an example diagram of beam management when DRX is configured as per an aspect of an embodiment of the present disclosure.

FIG. 36 shows an example embodiment of improved DRX operation with beam management procedure. A base station (e.g., gNB in FIG. 36) may transmit one or more RRC messages comprising first configuration parameters of a DRX operation and second configuration parameters of beam management (e.g., L1-RSRP report configuration). In an example, when the DRX operation configured, a DRX Active Time may comprise: a first time period while a Scheduling Request is sent on PUCCH and is pending; a second time period while an uplink grant for a pending HARQ retransmission can occur and there is data in the corresponding HARQ buffer for synchronous HARQ process; a third time period while a PDCCH indicating a new transmission addressed to the C-RNTI of the MAC entity has not been received after successful reception of a Random Access Response for the preamble not selected by the MAC entity; a fourth time period while drx-onDurationTimer is running; and/or one or more fifth time period while drx-InactivityTimer or drx-RetransmissionTimer or drx-UL-RetransmissionTimer or mac-ContentionResolutionTimer is running.

As shown in FIG. 36, the UE may transmit L1-RSRP on PUCCH/PUSCH, when the drx-onDurationTimer is running. In an example, the UE may transmit L1-RSRP on PUCCH/PUSCH, when the UE is in the DRX Active time. In an example, the UE may not transmit the L1-RSRP on PUCCH/PUSCH, when the drx-onDurationTimer is not running (e.g., DRX off Duration in FIG. 36). In addition to stopping CQI/PMI/RI/CRI report, stopping transmitting the L1-RSRP when in DRX off mode (e.g., the drx-onDurationTimer is not running) may improve power consumption of a wireless device, reduce uplink interference to other wireless devices, and/or increase uplink resource spectrum efficiency. By implementing the example embodiment, stopping L1-RSRP reporting when in DRX off mode may avoid triggering a beam failure recovery in DRX off mode. By implementing the example embodiment, a base station may reallocate the uplink resource (e.g., the PUCCH/PUSCH) to another wireless device, therefore increasing uplink resource spectrum efficiency.

In an example, a gNB may transmit to a UE, a report indicator (e.g., masking indicator) indicating whether the L1-RSRP reporting is limited to a time period when the drx-onDurationTimer is running. In an example, when the report indicator indicates the L1-RSRP reporting is limited to the time period when the drx-onDurationTimer is running, the base station may flexibly determine to receive the L1-RSRP reporting from the wireless device when the drx-onDurationTimer is running, and skip receiving the L1-RSRP reporting when the drx-onDurationTimer is not running, therefore reducing power consumption of a base station, and/or enabling the base station reallocate uplink resource to other wireless devices. In an example, when the report indicator indicates the L1-RSRP reporting is limited to the time period when the drx-onDurationTimer is running, a wireless device may transmit the L1-RSRP reporting when the drx-onDurationTimer is running, and skip transmitting the L1-RSRP reporting when the drx-onDurationTimer is not running, therefore reducing power consumption of the wireless device, and/or reducing interference to other wireless devices.

In an example, a gNB may transmit one or more RRC messages comprising a report indicator indicating whether L1-RSRP transmission is allowed when a timer (e.g., drx-onDurationTimer) is running, or when a UE is in an Active Time, when DRX configured. In an example, when the report indicator indicates L1-RSRP transmission is allowed when drx-onDurationTimer is running, the UE may transmit L1-RSRP when drx-onDurationTimer is running. In an example, when the report indicator indicates L1-RSRP transmission is allowed when drx-onDurationTimer is running, the UE may not transmit L1-RSRP when drx-onDurationTimer is not running. In an example, when the report indicator indicates L1-RSRP transmission is allowed when the UE is in an Active Time, the UE may transmit L1-RSRP when the UE is in the Active Time. In an example, when the report indicator indicates L1-RSRP transmission is allowed when the UE is in an Active Time, the UE may not transmit L1-RSRP when the UE is not in the Active Time. In an example, the report indicator may apply for CQI/PMI/RI/CRI report on PUCCH. In an example, the report indicator may be different from a report indicator for CQI/PMI/RI/CRI report on PUCCH.

Figure 37:
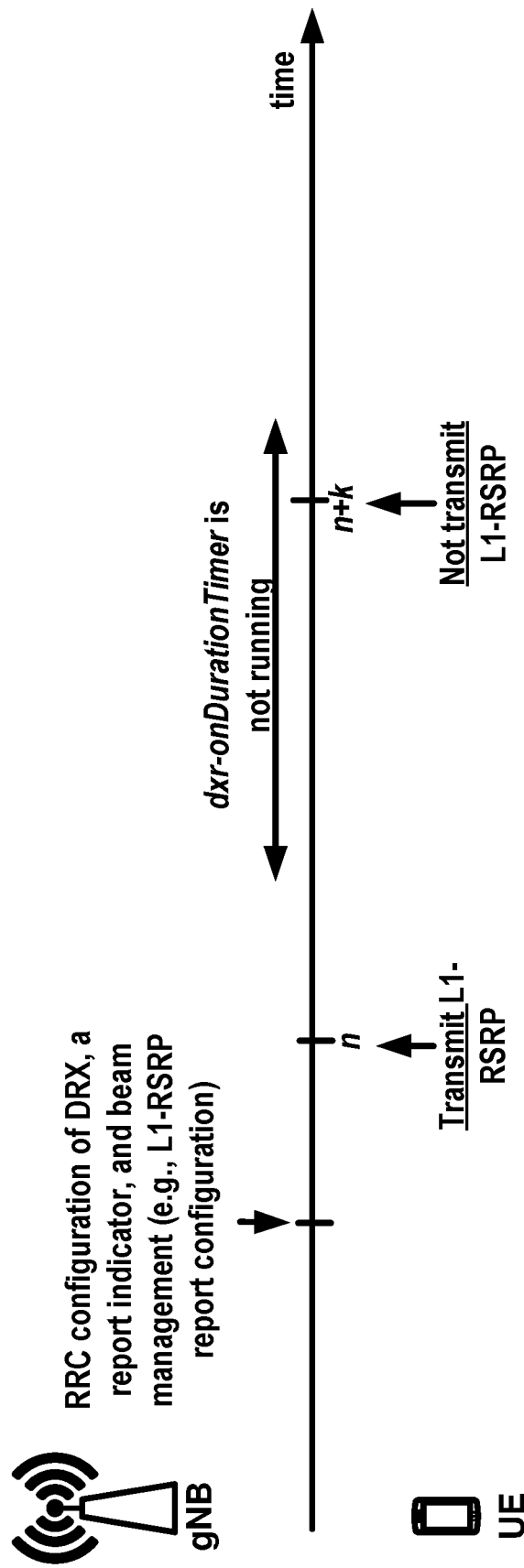
FIG. 37 is an example diagram of beam management when DRX is configured as per an aspect of an embodiment of the present disclosure.

FIG. 37 shows an example embodiment of improved DRX operation with beam management procedure. A wireless device (e.g., UE in FIG. 37) may receive from a base station (e.g., gNB in FIG. 37), one or more RRC messages comprising at least one of: one or more first parameters controlling a DRX operation, the one or more first parameters comprising one or more timer values of one or more DRX timers; and one or more second parameters of a beam management procedure. The one or more RRC messages may further comprise a report indicator indicating L1-RSRP transmission is allowed when a timer (e.g., drx-onDurationTimer) is running. The UE may transmit L1-RSRP on PUCCH/PUSCH at subframe/slot n, when the drx-onDurationTimer is running. In an example, in response to the report indicator indicating L1-RSRP transmission is limited to when the DRX timer is running, the UE may not transmit the L1-RSRP on PUCCH/PUSCH at subframe/slot n+k, when the drx-onDurationTimer is not running. In addition to stopping CQI/PMI/RI/CRI report, stopping transmitting the L1-RSRP when in DRX off mode (e.g., the drx-onDurationTimer is not running) may improve power consumption of a wireless device, reduce uplink interference to other wireless devices, and/or increase uplink resource spectrum efficiency. By implementing the example embodiment, stopping L1-RSRP reporting when in DRX off mode may avoid triggering a beam failure recovery in DRX off mode. By implementing the example embodiment, a base station may reallocate the uplink resource (e.g., the PUCCH/PUSCH) to another wireless device, therefore increasing uplink resource spectrum efficiency.

Figure 38:
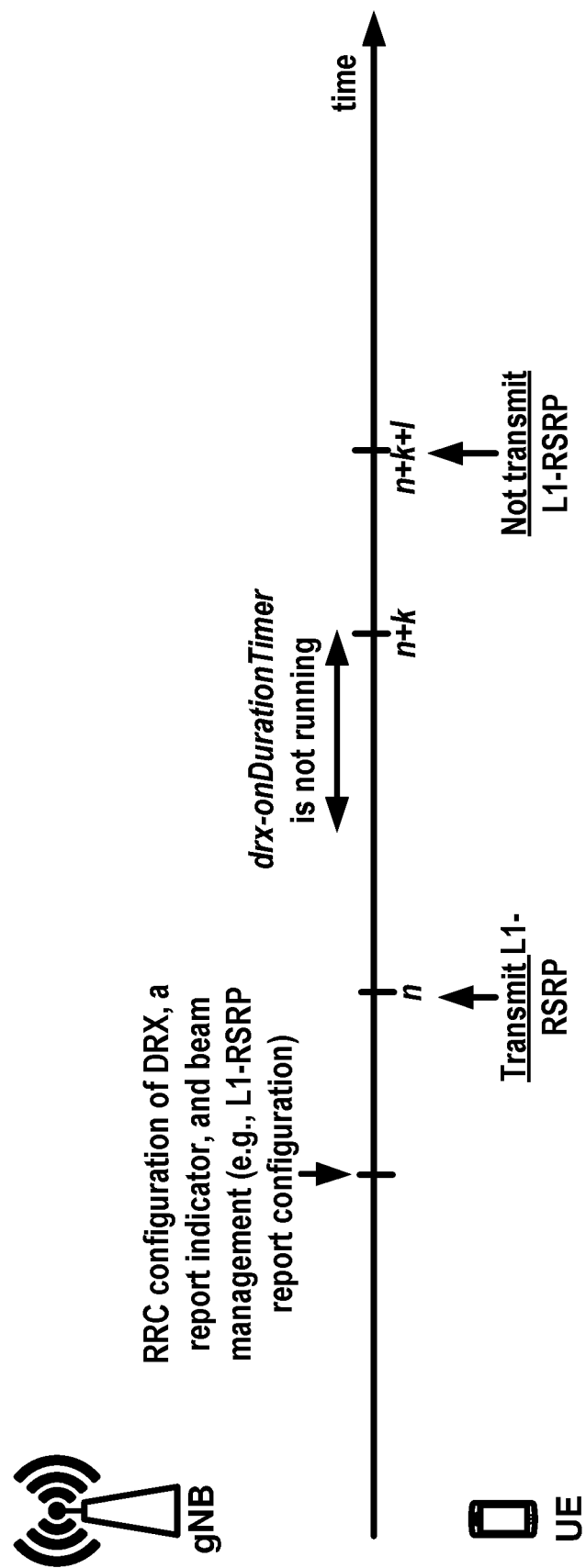
FIG. 38 is an example diagram of beam management when DRX is configured as per an aspect of an embodiment of the present disclosure.

FIG. 38 shows an example embodiment of improved DRX operation with beam management, e.g., when there is switching ambiguity between DRX off and on mode. A wireless device (e.g., UE in FIG. 38) may receive from a base station (e.g., gNB in FIG. 38), one or more RRC messages comprising at least one of: one or more first parameters controlling a DRX operation, the one or more first parameters comprising one or more timer values of one or more DRX timers; and one or more second parameters of a beam management procedure. The one or more RRC messages may further comprise a report indicator indicating L1-RSRP transmission is allowed when a timer (e.g., drxonDurationTimer) is running. As shown in FIG. 38, the UE may transmit L1-RSRP on PUCCH/PUSCH at subframe/slot n. In the example, in response to the report indicator indicating L1-RSRP transmission is limited to when the DRX timer is running, the UE may not transmit L1-RSRP at subframe n+k+l, if the drx-onDurationTimer is not running until and/or including subframe n+k. The value l may be configured by the gNB, or a predefined value.

Figure 39:
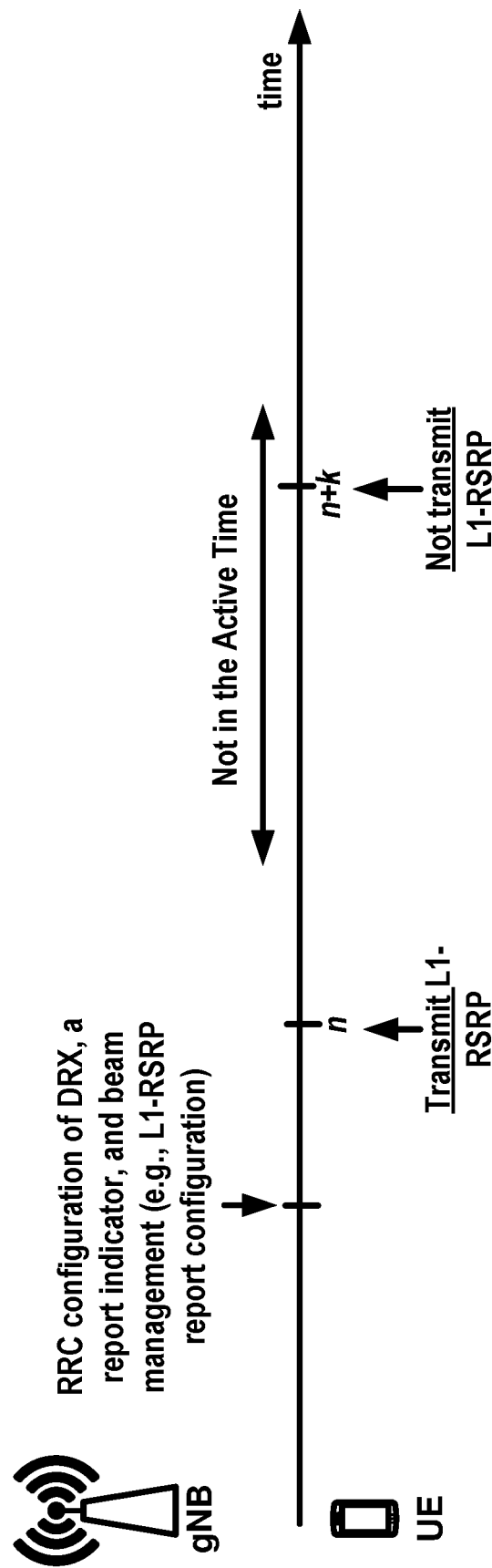
FIG. 39 is an example diagram of beam management when DRX is configured as per an aspect of an embodiment of the present disclosure.

FIG. 39 shows an example embodiment of improved DRX operation with beam management. A wireless device (e.g., UE in FIG. 39) may receive from a base station (e.g., gNB in FIG. 39), one or more RRC messages comprising at least one of: one or more first parameters controlling a DRX operation, the one or more first parameters comprising one or more timer values of one or more DRX timers; and one or more second parameters of a beam management procedure. The one or more RRC messages may further comprise a report indicator indicating L1-RSRP transmission is allowed when a UE is in an Active Time. As shown in FIG. 39, the UE may transmit L1-RSRP on PUCCH/PUSCH at subframe/slot n, when the UE is in the Active Time. In an example, in response to the L1-RSRP report indicator indicating L1-RSRP transmission is limited to when the UE is in the Active Time, the UE may not transmit the L1-RSRP on PUCCH/PUSCH at subframe n+k, when the UE is not in the Active Time. Allowing the L1-RSRP report transmission in the Active time may enable a base station to obtain latest and timing L1-RSRP report for retuning transmission beams. The Active time may comprise not only a time period when a drx-onDurationTimer is running, but also other occasions (for example, a time period when a Scheduling Request is sent on PUCCH and is pending; a time period while an uplink grant for a pending HARQ retransmission can occur and there is data in the corresponding HARQ buffer for synchronous HARQ process; a time period while a PDCCH indicating a new transmission addressed to the C-RNTI of the MAC entity has not been received after successful reception of a Random Access Response for the preamble not selected by the MAC entity; and/or one or more time period while drx-InactivityTimer or drx-RetransmissionTimer or drx-ULRetransmissionTimer or mac-ContentionResolutionTimer is running).

Figure 40:
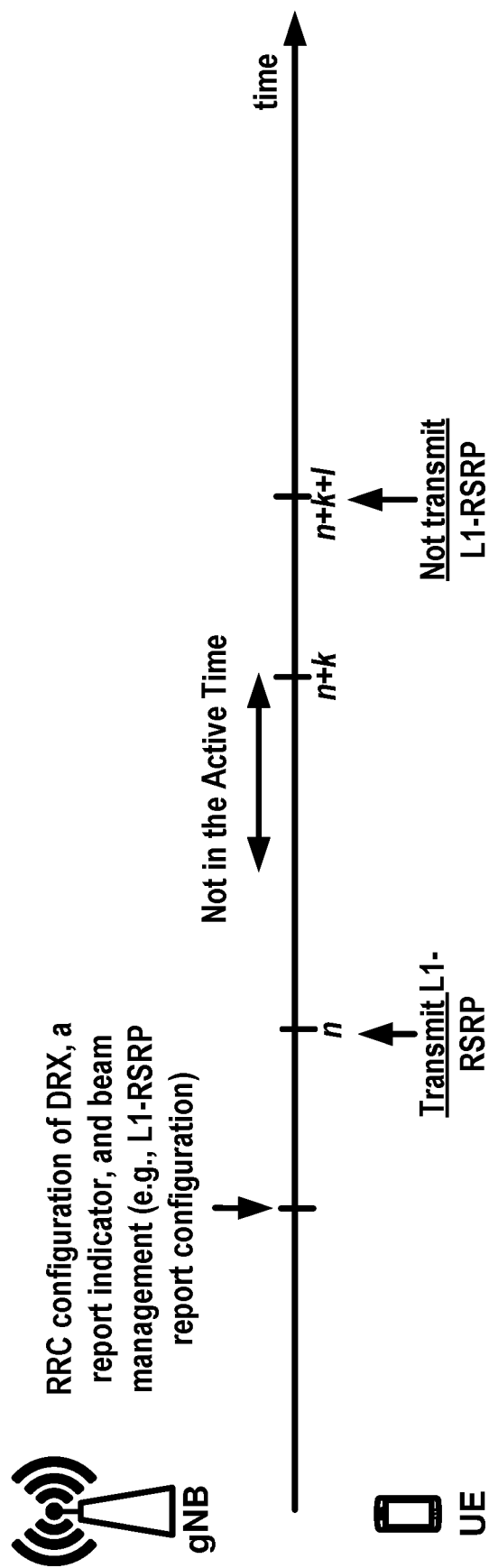
FIG. 40 is an example diagram of beam management when DRX is configured as per an aspect of an embodiment of the present disclosure.

FIG. 40 shows improved DRX operation with beam management, e.g., when there is switching ambiguity between DRX off and on mode. A wireless device (e.g., UE in FIG. 40) may receive from a base station (e.g., gNB in FIG. 40), one or more RRC messages comprising at least one of: one or more first parameters controlling a DRX operation, the one or more first parameters comprising one or more timer values of one or more DRX timers; and one or more second parameters of a beam management procedure. The one or more RRC messages may further comprise a report indicator indicating L1-RSRP transmission is allowed when a UE is in an Active Time. As shown in FIG. 40, the UE may transmit L1-RSRP on PUCCH/PUSCH at subframe/slot n. In the example, in response to the report indicator indicating L1-RSRP transmission is limited to when the UE is in the Active Time, the UE may not transmit L1-RSRP at subframe n+k+l, if the UE is not in the Active Time until and/or including subframe n+k. The value l may be configured by the gNB, or a predefined value.

Figure 41:
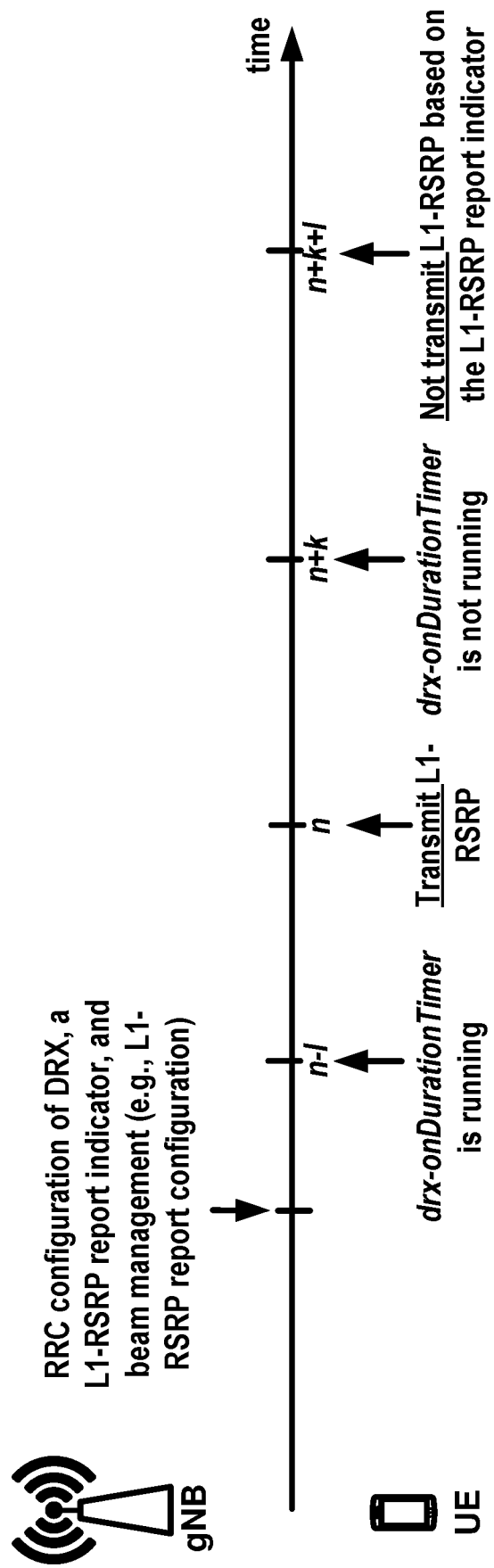
FIG. 41 is an example diagram of beam management when DRX is configured as per an aspect of an embodiment of the present disclosure.

FIG. 41 shows an improved DRX operation with beam management. A wireless device (e.g., UE in FIG. 41) may receive from a base station (e.g., gNB in FIG. 41), one or more RRC messages comprising at least one of: one or more first parameters controlling a DRX operation, the one or more first parameters comprising one or more timer values of one or more DRX timers; and one or more second parameters of a beam management procedure. The one or more RRC messages may further comprise a L1-RSRP report indicator indicating L1-RSRP transmission is limited to a timer period when a DRX timer (e.g., drx-onDurationTimer or onDurationTimer as shown in FIG. 41) is running. As shown in FIG. 41, the UE may transmit L1-RSRP on PUCCH/PUSCH at subframe/slot n, when the DRX timer (e.g., onDurationTimer as shown in FIG. 41) is running at subframe/slot n−l. l may be a predefined value (e.g., 2, 3, 4, 5, or any other number greater than 0) or configured by an RRC message. As shown in FIG. 41, in response to the L1-RSRP report indicator indicating L1-RSRP transmission is limited to when the DRX timer is running, the UE may skip (or not transmit) the L1-RSRP on PUCCH/PUSCH at subframe/slot n+k+l, when the DRX timer (e.g., onDurationTimer as shown in FIG. 41) is not running at subframe/slot n+k. By one or more of the example embodiments, a base station may control a wireless device to transmit L1-RSRP report based on a report indicator and DRX operation, wherein the report indicator may indicate whether the L1-RSRP report is allowed (or limited) to a time period when a DRX timer (e.g., drx-onDurationTimer) is running. Example embodiments may improve power consumption of a wireless device and/or a base station, uplink resource spectrum efficiency, and/or reduce uplink interferences to other wireless devices. Example embodiments may enable a base station to obtain timely accurate L1-RSRP report from a wireless device when DRX operation is configured, therefore improve downlink spectrum efficiency, data transmission latency.

In an example, a wireless device may receive from a base station, one or more RRC messages comprising at least one of: one or more first parameters controlling a Discontinuous Reception (DRX) operation, the one or more first parameters comprising one or more timer values of one or more DRX timers; and one or more second parameters of a beam failure recovery procedure comprising one or more PRACH resource configuration parameters associated with one or more reference signals. In an example, the one or more PRACH resource configuration parameters may comprise at least one of: one or more preambles; and/or one or more time/frequency resources. The wireless device may transmit at least a first preamble indicating a beam failure associated with the beam failure recovery procedure. The wireless device may receive a first DCI via a PDCCH, wherein the first DCI comprises indication of a reference signal associated with the at least first preamble. The wireless device may determine the DRX operation being in an Active Time, during a second DCI indicating a new transmission addressed to the wireless device not being received after successful reception of the first DCI. The wireless device may monitor a PDCCH for the second DCI during at least a portion of the Active Time. In an example, the wireless device may receive a new transmission block in response to successful reception of the second DCI.

In an example, a wireless device may receive from a base station, one or more messages. The one or more messages may comprise: a timer value of a discontinuous reception (DRX) on duration timer for a DRX operation; radio resources of synchronization signal blocks (SSBs) for a periodic transmission of a layer 1-reference signal received power (L1-RSRP) report; and a report indicator indicating the periodic transmission of the L1-RSRP report is limited to when the DRX on duration timer is running. The wireless device may transmit, at a first time, the periodic L1-RSRP report based on the DRX on duration timer running at a predefined time period before the first time, wherein the periodic L1-RSRP report comprises a L1-RSRP value and an SSB index associated with one of the SSBs. The wireless device may skip (or not transmit), based on the report indicator, the periodic L1-RSRP report, at a second time in response to the DRX on duration timer being not running at the predefined time period before the second time.

According to various embodiments, a device such as, for example, a wireless device, off-network wireless device, a base station, a core network device, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 42:
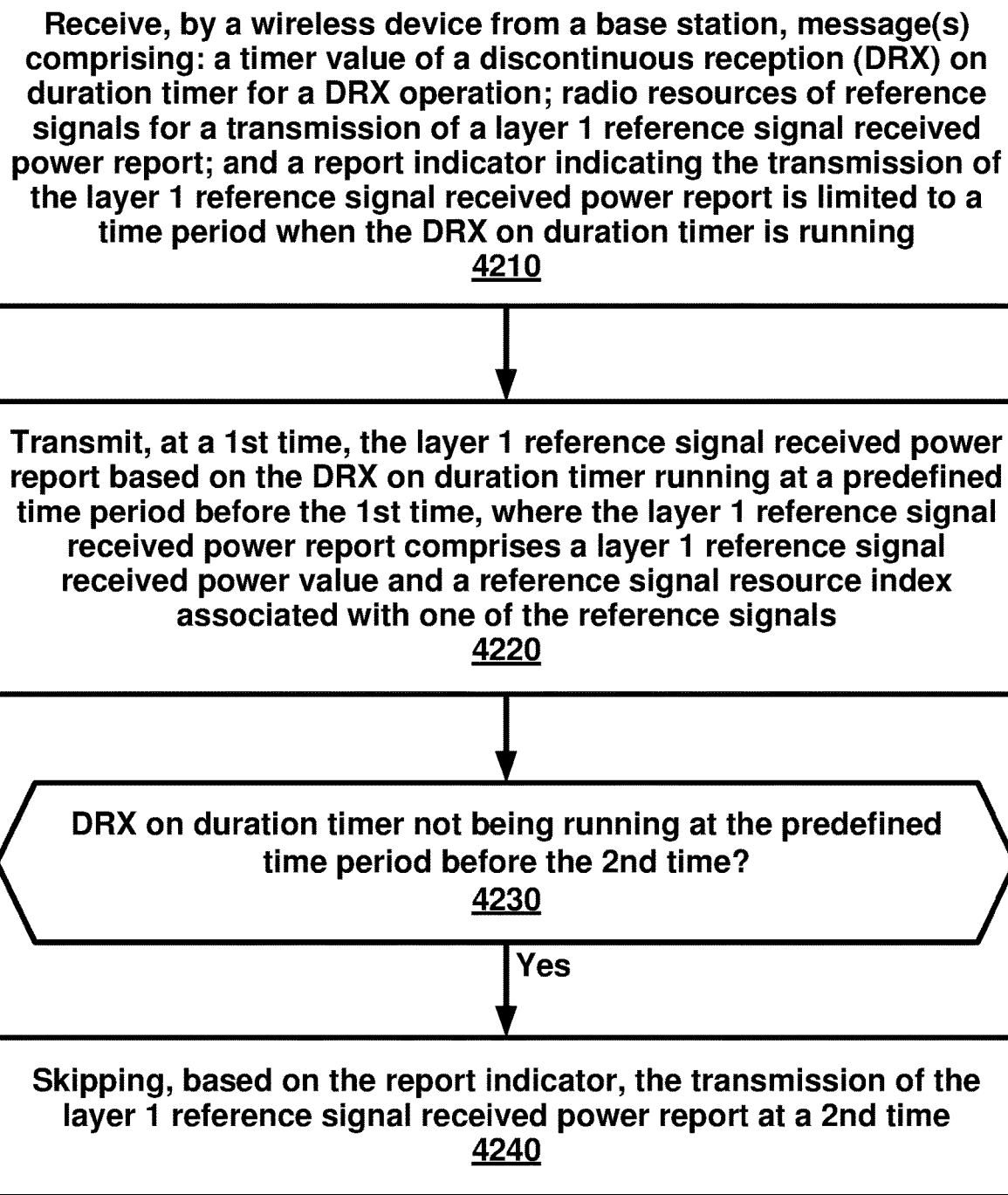
FIG. 42 is a flow diagram of an aspect of an embodiment of the present disclosure.

FIG. 42 is a flow diagram of an aspect of an embodiment of the present disclosure. At 4210, a wireless device may receive one or more messages from a base station. The one or more messages may comprise a timer value of a discontinuous reception (DRX) on duration timer for a DRX operation. The one or more messages may comprise radio resources of a plurality of reference signals for a transmission of a layer 1 reference signal received power report. The one or more messages may comprise a report indicator indicating the transmission of the layer 1 reference signal received power report is limited to a time period when the DRX on duration timer is running. At 4220, the wireless device may transmit, at a first time, the layer 1 reference signal received power report based on the DRX on duration timer running at a predefined time period before the first time. The layer 1 reference signal received power report may comprise a layer 1 reference signal received power value. The layer 1 reference signal received power report may comprise a reference signal resource index associated with one of the plurality of reference signals. At 4240, the transmitting of the layer 1 reference signal received power report at a second time may be skipped, based on the report indicator, in response to (4230) the DRX on duration timer not running at the predefined time period before the second time.

According to an example embodiment, the one or more messages may indicate first uplink control resources for the layer 1 reference signal received power report. According to an example embodiment, the plurality of reference signals may comprise a first plurality of channel state information reference signals. The plurality of reference signals may comprise a second plurality of synchronization signal blocks. According to an example embodiment, the report indicator may indicate transmission is limited to the time period when the DRX on duration timer is running. The transmission may comprise a channel quality indicator (CQI). The transmission may comprise a precoding matrix indicator (PMI). The transmission may comprise a channel state information reference signal resource indicator (CRI). The transmission may comprise a rank indicator (RI) report. According to an example embodiment, the reference signal resource index may be selected with a largest layer 1 reference signal received power value of a reference signal among layer 1 reference signal received power values of the plurality of reference signals. According to an example embodiment, the layer 1 reference signal received power report may comprise at least a second layer 1 reference signal received power value and at least a second reference signal resource index.

According to an example embodiment, a medium access control entity of the wireless device may be in active time at the predefined time period before the second time. According to an example embodiment, the active time may comprise a time while one or more DRX timers are running. The active time may comprise a time while a scheduling request is sent on uplink control channel and is pending. The active time may comprise a time while an uplink grant for a pending hybrid automatic repeat request (HARQ) retransmission can occur and there is data in corresponding HARQ buffer. The active time may comprise a time while a downlink control channel indicating a new transmission addressed to an identifier of the wireless device has not been received after successful reception of a random access response for a preamble not selected by the medium access control entity of the wireless device.

According to an example embodiment, the one or more messages may indicate a short DRX cycle for the DRX operation. According to an example embodiment, the wireless device may start the DRX on duration timer based on the timer value in response to the short DRX cycle being used. According to an example embodiment, the wireless device may use the short DRX cycle in response to expiry of one or more DRX timers. The wireless device may use the short DRX cycle in response to receiving one or more DRX command medium access control control elements. According to an example embodiment, the one or more DRX timers may comprise the DRX on duration timer. The one or more DRX timers may comprise a DRX inactivity timer. The one or more DRX timers may comprise a DRX retransmission timer. The one or more DRX timers may comprise a medium access control contention resolution timer.

According to an example embodiment, the one or more messages may indicate a long DRX cycle for the DRX operation. According to an example embodiment, the wireless device may start the DRX on duration timer based on the timer value in response to the long DRX cycle being used. According to an example embodiment, the wireless device may use the long DRX cycle in response to expiry of one or more DRX timers. The wireless device may use the long DRX cycle in response to receiving one or more DRX command medium access control control elements.

According to an example embodiment, the one or more DRX timers may comprise the DRX on duration timer. The one or more DRX timers may comprise a DRX inactivity timer. The one or more DRX timers may comprise a DRX retransmission timer. The one or more DRX timers may comprise a medium access control contention resolution timer.

According to an example embodiment, the wireless device may transmit the layer 1 reference signal received power report via a first uplink control resource. According to an example embodiment, a CQI may be transmitted at the first time. A PMI may be transmitted at the first time. A CRI may be transmitted at the first time. An RI report may be transmitted at the first time. According to an example embodiment, at the second time, based on the report indicator, the CQI may not transmitted. At the second time, based on the report indicator, the PMI may not transmitted. At the second time, based on the report indicator, the CRI may not transmitted. At the second time, based on the report indicator, the RI report may not transmitted. According to an example embodiment, the transmitting at the first time may have a different transmission periodicity than the transmission of the layer 1 reference signal received power report. According to an example embodiment, the one or more messages may indicate radio resources of a second uplink control channel for a CQI. The one or more messages may indicate radio resources of a second uplink control channel for a PMI. The one or more messages may indicate radio resources of a second uplink control channel for a CRI. The one or more messages may indicate radio resources of a second uplink control channel for a RI report.

FIG. 43 is a flow diagram of an aspect of an embodiment of the present disclosure. At 4310, a wireless device may receive one or more messages from a base station. The one or more messages may comprise a timer value of a discontinuous reception (DRX) on duration timer for a DRX operation. The one or more messages may comprise a report indicator indicating whether a transmission of a beam report is limited to when the DRX on duration timer is running. At 4350, the beam report may be transmitted at a first time, in response to: the report indicator indicating the transmission of the beam report is not limited to when the DRX on duration timer is running (4320), the DRX on duration timer not running at a predefined time period before the first time (4330), and a medium access control entity of the wireless device being in active time of the DRX operation at a predefined time period before the first time (4340). According to an example embodiment, the beam report may comprise at least a layer 1 reference signal received power report. According to an example embodiment, the transmission of the beam report may be skipped at the first time, in response to the report indicator indicating the transmission of the beam report is limited to when the DRX on duration timer is running, and/or the DRX on duration timer not being running at the predefined time period before the first time.

FIG. 44 is a flow diagram of an aspect of an embodiment of the present disclosure. At 4410, a wireless device may receive one or more messages from a base station. The one or more messages may comprise: a timer value of a discontinuous reception (DRX) on duration timer for a DRX operation, and/or a report indicator indicating whether a transmission of a beam report is limited to when the DRX on duration timer is running. At 4440, the beam report may be transmitted at a first time, in response to the report indicator indicating the transmission of the beam report is not limited to when the DRX on duration timer is running (4420), and/or the DRX on duration timer not being running at a predefined time period before the first time (4430). In response to the report indicator indicating the transmission of the beam report is limited to when the DRX on duration timer is running (4450), the transmission of the beam report may be skipped at the first time, in response to the DRX on duration timer not being running at a predefined time period before the first time (4460). In an example, 4420, 4430 and/or 4440 may be skipped, e.g., when the report indicator indicates that a transmission of a beam report is limited to when the DRX on duration timer is running. In an example, 4450, 4460 and/or 4470 may be skipped, e.g., when the report indicator indicates that a transmission of a beam report is not limited to when the DRX on duration timer is running. According to an example embodiment, a medium access control entity of the wireless device may be in active time at the predefined time period before the first time.

Figure 45:
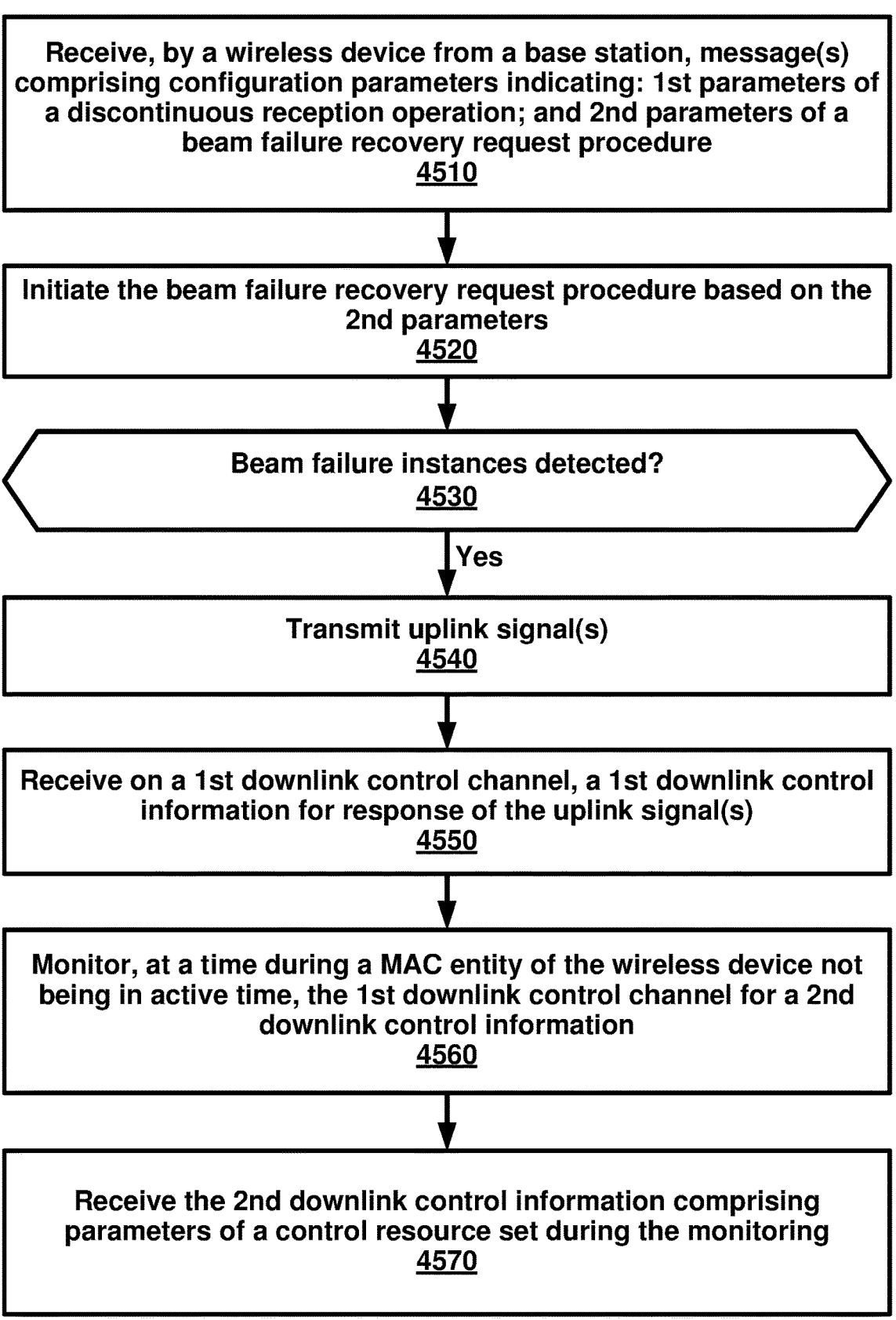
FIG. 45 is a flow diagram of an aspect of an embodiment of the present disclosure.

FIG. 45 is a flow diagram of an aspect of an embodiment of the present disclosure. At 4510, a wireless device may receive one or more messages from a base station. The one or more messages may comprise configuration parameters indicating: first parameters of a discontinuous reception operation, and/or second parameters of a beam failure recovery request procedure. At 4520, the beam failure recovery request procedure may be initiated based on the second parameters. At 4540, one or more uplink signals may be transmitted in response to detecting beam failure instances (4530). At 4550, a first downlink control information for response of the one or more uplink signals may be received on a first downlink control channel. At 4560, at a time during a medium access control entity of the wireless device not being in active time, the first downlink control channel may be monitored for a second downlink control information. At 4570, the second downlink control information may be received. The second downlink control information may comprise parameters of a control resource set during the monitoring. According to an example embodiment, the one or more uplink signals may comprise one or more preambles. The one or more uplink signals may comprise one or more PUCCH/SRs. The one or more uplink signals may comprise one or SRSs. According to an example embodiment, the wireless device may detect a beam failure instance in response to a radio link quality of at least a reference signal being worse than a threshold. According to an example embodiment, a second downlink control channel in the control resource set may monitor, for at least a third downlink control information, in response to the second downlink control information. According to an example embodiment, a transport block may be received or transmitted in a transport block according to the at least third downlink control information.

Figure 46:
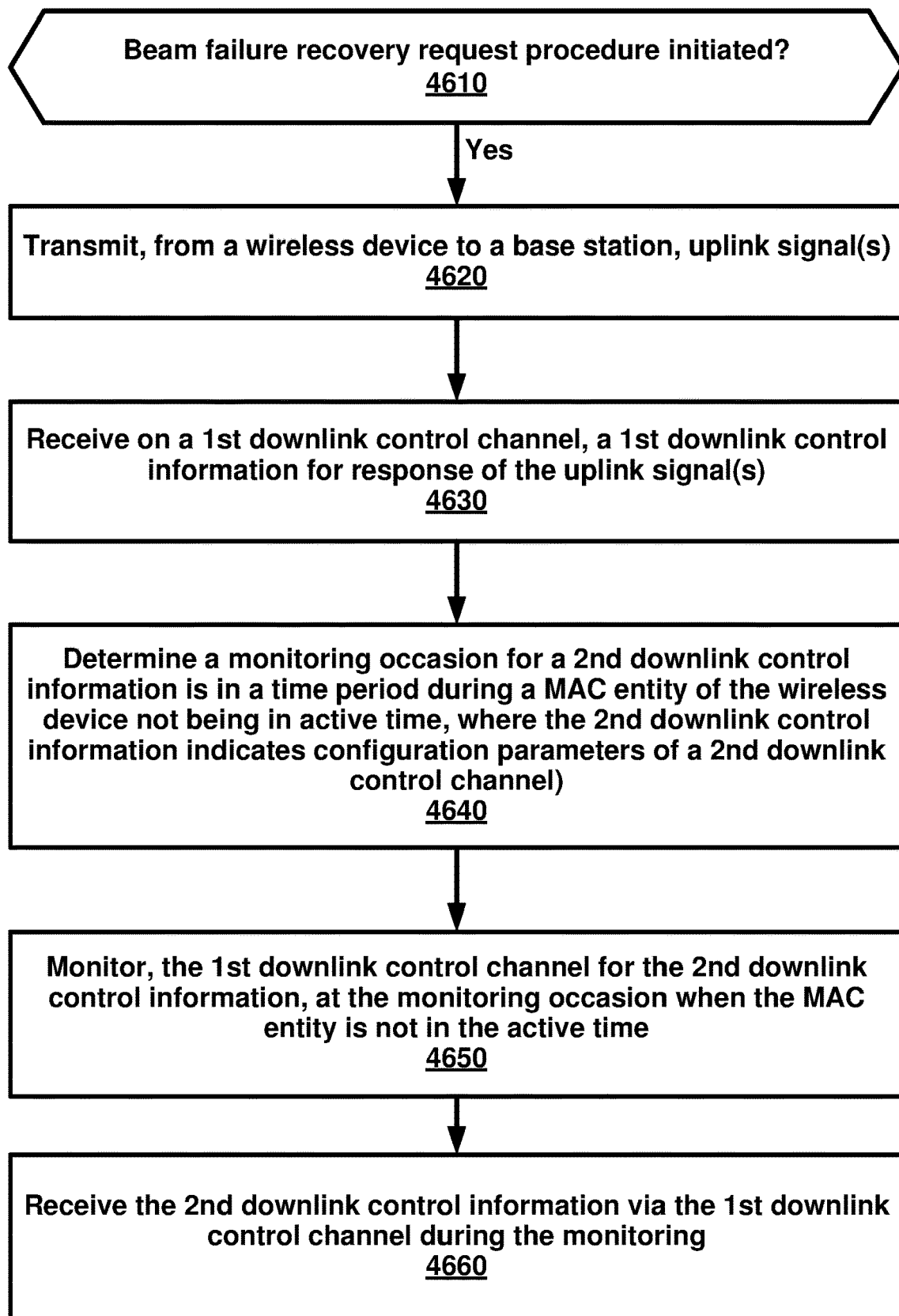
FIG. 46 is a flow diagram of an aspect of an embodiment of the present disclosure.

FIG. 46 is a flow diagram of an aspect of an embodiment of the present disclosure. At 4620, a wireless device may transmit one or more uplink signals to a base station in response to initiating a beam failure recovery request procedure (4620). At 4630, a first downlink control information for response of the one or more uplink signals may be received on a first downlink control channel. At 4640, a monitoring occasion for a second downlink control information may be determined to be in a time period during a medium access control entity of the wireless device not being in active time. The second downlink control information may indicate configuration parameters of a second downlink control channel. At 4650, in response to the determining, the first downlink control channel may be monitored for the second downlink control information at the monitoring occasion when the medium access control entity is not in the active time. At 4660, the second downlink control information may be received via the first downlink control channel during the monitoring.

According to an example embodiment, the active time may comprise a time while one or more DRX timers are running. The active time may comprise a time while a scheduling request is sent on uplink control channel and is pending. The active time may comprise a time while an uplink grant for a pending hybrid automatic repeat request (HARQ) retransmission can occur and there is data in corresponding HARQ buffer. The active time may comprise a time while a downlink control channel indicating a new transmission addressed to an identifier of the wireless device has not been received after successful reception of a random access response for a preamble not selected by the medium access control entity of the wireless device.

According to an example embodiment, in response to the second downlink control information and for at least a third downlink control information, a second downlink control channel may be monitored based on the configuration parameters of the second downlink control channel. According to an example embodiment, a transport block may be received and/or transmitted according to the at least third downlink control information.

In this disclosure, "a" and "an" and similar phrases are to be interpreted as "at least one" or "one or more." Similarly, any term that ends with the suffix "(s)" is to be interpreted as "at least one" or "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" is indicative that the phrase following the term "based on" is an example of one of a multitude of suitable possibilities that may, or may not, be employed to one or more of the various embodiments. The phrase "in response to" is indicative that the phrase following the phrase "in response to" is an example of one of a multitude of suitable possibilities that may, or may not, be employed to one or more of the various embodiments. The terms "including" and "comprising" should be interpreted as meaning "including, but not limited to."

In this disclosure and the claims, differentiating terms like "first," "second," "third," identify separate elements without implying an ordering of the elements or functionality of the elements. Differentiating terms may be replaced with other differentiating terms when describing an embodiment.

In this disclosure, various embodiments are disclosed. Limitations, features, and/or elements from the disclosed example embodiments may be combined to create further embodiments within the scope of the disclosure.

In this disclosure, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
 receiving, by a wireless device from a base station, one or more messages comprising:
  a timer value of a discontinuous reception (DRX) on duration timer for a DRX operation;
  radio resources of a plurality of reference signals for a transmission of a layer 1 reference signal received power (L1-RSRP) report; and
  a report mask indicating the transmission of the L1-RSRP report is limited to a time period when the DRX on duration timer is running;

transmitting, at a first time, the L1-RSRP report based on the DRX on duration timer running at a predefined time period before the first time, wherein the L1-RSRP report comprises:
  a L1-RSRP value; and
  a reference signal resource index associated with one of the plurality of reference signals; and
skipping based on the report mask, a configured transmission, at a second time, of the L1-RSRP in response to the DRX on duration timer not running at the predefined time period before the second time.

2. The method of claim 1, wherein the one or more messages further indicate first uplink control resources for the L1-RSRP report.

3. The method of claim 1, wherein the plurality of reference signals comprise at least one of:
  a first plurality of channel state information reference signals; and
  a second plurality of synchronization signal blocks.

4. The method of claim 1, wherein the report mask further indicates a transmission is limited to the time period when the DRX on duration timer is running, wherein the transmission comprises at least one of: a channel quality indicator (CQI); a precoding matrix indicator (PMI); a channel state information reference signal resource indicator (CRI); and a rank indicator (RI) report.

5. The method of claim 1, wherein the reference signal resource index is selected with a largest L1-RSRP value of a reference signal among L1-RSRP values of the plurality of reference signals.

6. The method of claim 1, wherein the L1-RSRP report further comprises at least a second L1-RSRP value and at least a second reference signal resource index.

7. The method of claim 1, wherein a medium access control entity of the wireless device is in active time at the predefined time period before the second time.

8. The method of claim 7, wherein the active time comprises at least one of:
  a time while one or more DRX timers are running;
  a time while a scheduling request is sent on uplink control channel and is pending;
  a time while an uplink grant for a pending hybrid automatic repeat request (HARQ) retransmission can occur and there is data in corresponding HARQ buffer; and
  a time while a downlink control channel indicating a new transmission addressed to an identifier of the wireless device has not been received after successful reception of a random access response for a preamble not selected by the medium access control entity of the wireless device.

9. The method of claim 1, wherein the one or more messages further indicate a short DRX cycle for the DRX operation.

10. The method of claim 9, wherein the wireless device starts the DRX on duration timer based on the timer value in response to the short DRX cycle being used.

11. The method of claim 10, wherein the wireless device uses the short DRX cycle in response to at least one of:
  expiry of one or more DRX timers; or
  receiving one or more DRX command medium access control control elements.

12. The method of claim 11, wherein the one or more DRX timers comprise at least one of:
  the DRX on duration timer;
  a DRX inactivity timer;
  a DRX retransmission timer; and
  a medium access control contention resolution timer.

13. The method of claim 1, wherein the one or more messages further indicate a long DRX cycle for the DRX operation.

14. The method of claim 13, wherein the wireless device starts the DRX on duration timer based on the timer value in response to the long DRX cycle being used.

15. The method of claim 14, wherein the wireless device uses the long DRX cycle in response to at least one of:
  expiry of one or more DRX timers; or
  receiving one or more DRX command medium access control control elements.

16. The method of claim 15, wherein the one or more DRX timers comprise at least one of:
  the DRX on duration timer;
  a DRX inactivity timer;
  a DRX retransmission timer; and
  a medium access control contention resolution timer.

17. The method of claim 1, wherein the wireless device transmits the L1-RSRP report via a first uplink control resource.

18. The method of claim 17, further comprising:
  transmitting at the first time, at least one of:
    a CQI;
    a PMI;
    a CRI; and
    a RI report; and
  not transmitting at the second time, based on the report indicator, at least one of:
    the CQI;
    the PMI;
    the CRI; and
    the RI report.

19. The method of claim 18, wherein the transmitting at the first time has a different transmission periodicity than the transmission of the L1-RSRP report.

20. The method of claim 17, wherein the one or more messages further indicate radio resources of a second uplink control channel for at least one of:
  a CQI;
  a PMI;
  a CRI; and
  a RI report.

* * * * *